US011303130B2

(12) United States Patent
Inoue

(10) Patent No.: US 11,303,130 B2
(45) Date of Patent: Apr. 12, 2022

(54) POWER MANAGEMENT SYSTEM

(71) Applicant: Mitsubishi Electric Corporation, Tokyo (JP)

(72) Inventor: Sadayuki Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/734,560

(22) PCT Filed: Mar. 18, 2019

(86) PCT No.: PCT/JP2019/011085
§ 371 (c)(1),
(2) Date: Dec. 3, 2020

(87) PCT Pub. No.: WO2019/239664
PCT Pub. Date: Dec. 19, 2019

(65) Prior Publication Data
US 2021/0234372 A1  Jul. 29, 2021

(30) Foreign Application Priority Data
Jun. 14, 2018  (JP) .............................. JP2018-113536

(51) Int. Cl.
*H02J 3/38* (2006.01)
*H02J 13/00* (2006.01)
(Continued)

(52) U.S. Cl.
CPC ............ *H02J 3/381* (2013.01); *G05B 19/042* (2013.01); *H02J 3/003* (2020.01); *H02J 3/004* (2020.01);
(Continued)

(58) Field of Classification Search
CPC .. H02J 3/381; H02J 3/003; H02J 3/004; H02J 3/32; H02J 13/00002; H02J 13/00006;
(Continued)

(56) References Cited

U.S. PATENT DOCUMENTS

2014/0358316 A1* 12/2014 Shichiri .................. H02S 10/20
  700/297
2019/0324431 A1* 10/2019 Celia ..................... G06N 3/0454
(Continued)

FOREIGN PATENT DOCUMENTS

| JP | 2009-240080 A | 10/2009 |
| JP | 2015-126554 A | 7/2015 |

OTHER PUBLICATIONS

Indian Office Action dated Mar. 25, 2021 in Indian Patent Application No. 202027052195.
(Continued)

*Primary Examiner* — Ziaul Karim
(74) *Attorney, Agent, or Firm* — Xsensus LLP

(57) ABSTRACT

A town storage battery power conversion device outputs an AC voltage to a distribution system during a power failure. Electric power generated by a solar cell installed in each consumer house is converted into an AC voltage by a solar cell power conversion device and output to a consumer premises distribution system to which a load is connected. In an autonomous operation during a power failure, an operation plan for a distributed power supply is updated in a cycle longer than a cycle of an operation plan for a town storage battery. In the autonomous operation, the town storage battery power conversion device changes an AC voltage frequency according to a difference between electric power output from the town storage battery and the operation plan.
(Continued)

The solar cell power conversion device has a function of modifying a control target value for the solar cell according to the AC voltage frequency.

18 Claims, 28 Drawing Sheets

(51) Int. Cl.
*H02J 3/00* (2006.01)
*G05B 19/042* (2006.01)
*H02J 3/32* (2006.01)

(52) U.S. Cl.
CPC .......... *H02J 3/32* (2013.01); *H02J 13/00002* (2020.01); *H02J 13/00006* (2020.01); *G05B 2219/2639* (2013.01); *H02J 2300/26* (2020.01)

(58) Field of Classification Search
CPC .......... H02J 2300/26; H02J 3/38; H02J 13/00; G05B 19/042; G05B 2219/2639; Y02B 10/10; Y02B 90/20; Y02E 10/56; Y02E 70/30; Y04S 20/12; Y04S 40/12
See application file for complete search history.

(56) References Cited

U.S. PATENT DOCUMENTS

2019/0364492 A1* 11/2019 Azizi .................... H04W 48/16
2020/0096993 A1* 3/2020 Celia .................... G06Q 50/00

OTHER PUBLICATIONS

International Search Report and Written Opinion dated Jun. 4, 2019, received for PCT Application No. PCT/JP2019/011085 filed on Mar. 18, 2019, 8 Pages including English Translation.

* cited by examiner

POWER MANAGEMENT SYSTEM

CROSS-REFERENCE TO RELATED APPLICATION

The present application is based on PCT filing PCT/JP2019/011085, filed Mar. 18, 2019, which claims priority to JP 2018-113536, filed Jun. 14, 2018, the entire contents of each are incorporated herein by reference.

TECHNICAL FIELD

The present disclosure relates to a power management system, and more particularly to an autonomous operation at the time of a power failure in a microgrid in which a plurality of distributed power supplies cooperate with one another with an alternating current, which include an energy creating device (hereinafter also referred to as an "energy creation device") such as a solar cell that harnesses renewable energy.

BACKGROUND ART

In recent years, for reducing environmental burdens, a power generation system that harnesses natural energy, such as a solar cell not emitting carbon dioxide, has come into widespread use in houses. Furthermore, in order to address power shortage and the like since the Great East Japan Earthquake, product commercialization has been underway for a system including an energy storing device (hereinafter also referred to as an "energy storage device") such as a storage battery, a system utilizing an electric vehicle as a storage battery, a system formed of a combination of a solar cell (an energy creation device) and a storage battery (an energy storage device), and the like. Furthermore, in order to significantly reduce emission of carbon dioxide, the Japanese government has promoted widespread use of a zero-emission house (hereinafter also referred to as a "ZEH house" or simply as "ZEH") as a house that is improved in heat insulation performance, equipped with an energy creation device such as a solar cell that harnesses renewable energy, and allows zero balance of power generation and consumption in one year.

In recent years, a large-scale town development called vacant lot development has been underway, which utilizes the sites of factories and schools (e.g., vacant lot development in the Sustainable Smart Town in Fujisawa City, Kanagawa Prefecture, Kyushu University, etc.). Such developments include the case where a solar cell is installed in each house. Also, according to the above-mentioned guidelines of the Japanese government, the future town development is expected to proceed on the precondition that ZEH houses (each equipped with an energy creation device (a solar cell and the like) of several kW) are built. Moreover, in Sustainable Smart Town in Fujisawa City, Kanagawa Prefecture, at occurrence of a power failure, solar cells and storage batteries installed in a house are used to supply electric power to essential loads (for example, a refrigerator) in the house for 72 hours, so that the life continuity performance (LCP) can be ensured. However, ensuring the LCP for 72 hours requires a storage battery of 6 kWh or more that is installed in each consumer house, for example, when the amount of electric power supplied to each essential load is 2 kWh/day. This increases the cost of storage batteries, which causes a concern that the cost borne by each consumer (house purchase cost) may increase.

Moreover, in the case of a large-scale vacant lot development, installation of a solar cell of 4 kW for each house in a town scale of approximately 300 houses leads to formation of a mega-solar system. Thus, for stabilization of the distribution system voltage, distribution system stabilization facilities such as a storage battery and SVC may be installed in a town as countermeasures. In this case, consumers may also need to bear part of the costs for introduction of these facilities. Conventionally, when a power failure occurs, as in Sustainable Smart Town in Fujisawa City, Kanagawa Prefecture, each consumer is separated at a system interconnection point from a distribution system, and electric power is supplied to an essential load (for example, a refrigerator) from the distributed power supply in each consumer house. In this case, when the storage batteries in each consumer house are used for peak-cut etc., during daytime and almost no storage power remains, there occur problems that: electric power cannot be supplied to an essential load though a storage battery is installed; an expensive storage battery of 6 kWh or more needs to be purchased for ensuring the LCP for 72 hours as described above; or the like.

Japanese Patent Laying-Open 2015-126554 (PTL 1) discloses a power management system configured such that, during an interconnection operation, a plurality of consumer facilities (hereinafter also referred to as a "town") including a consumer facility equipped with: a power generation facility harnessing renewable energy: and a storage battery are connected to a common system power supply. The power management system in PTL 1 includes: a common power storage device (a town storage battery) connected to a system power supply; a consumer facility-capable power management unit that performs a prescribed power management in the power management system; and a differential power calculation unit. The differential power calculation unit calculates differential power corresponding to: an excess of charge power for each storage battery in the power management system; or a shortage of electric power to be supplied from each storage battery to a load, in the state where the consumer facility-capable power management unit manages electric power. Then, charging or discharging of the common power storage device is controlled based on the calculated differential power, thereby facilitating effective use of the electric power generated by a power generation device in each of the consumer facilities.

CITATION LIST

Patent Literature

PTL 1: Japanese Patent Laying-Open No. 2015-126554

SUMMARY OF INVENTION

Technical Problem

It has been contemplated that, in a microgrid in which the above-mentioned distribution system stabilization facilities (a town storage battery, SVC, and the like) are installed in a town, the distribution system voltage stabilization facility including a town storage battery and the consumer-side distributed power supply are cooperated and coordinated with each other so as to stabilize the system voltage during an interconnection operation and so as to utilize a town storage battery to supply electric power to each consumer during a power failure, thereby allowing reduction of the installation capacity of the distribution system stabilization facility and reduction of the battery capacity in each consumer house.

Accordingly, the power management system in PTL 1 may also allow an autonomous operation during a power failure to be performed utilizing the energy stored in the town storage battery. In the power management system disclosed in PTL 1, an excess or a shortage of electric power in the entire town is calculated based on the result of predicting the electric power generated by an energy creation device such as a solar cell and the result of predicting the electric power consumed by a load in each consumer house. Then, based on the calculation results and the efficiency characteristics of the storage battery disposed in the town, a storage battery as a target to be charged and discharged is selected to thereby create an operation plan for performing efficient charging and discharging.

However, when the control disclosed in PTL 1 is applied to an autonomous operation during a power failure, there is a problem that an error occurs in the above-mentioned prediction about the generated electric power or prediction about the consumed electric power by the load. For example, when the prediction of the electric power generated by a solar cell is incorrect and excessive electric power exceeding the prediction is generated, the amount of electric power generated by the solar cell may be suppressed despite that the storage battery still has a chargeable capacity, or the town storage battery and the consumer's storage battery may be unnecessarily discharged despite that excessive electric power still remains.

Also, the autonomous operation during a power failure requires absorption of an excess or a shortage of the electric power (power amount) (i.e., "averaging of the total power generation amount") resulting from an incorrect prediction about the power generation amount or the power consumption amount in a microgrid. In general, an excess or a shortage can be absorbed using a town storage battery. However, when the prediction error exceeds the capacity of the town storage battery, the distribution system may not be able to be maintained. For example, when the electric power consumed by a load at nighttime increases significantly exceeding the prediction, balancing of electric power cannot be ensured, so that the distribution system may not be able to be maintained.

Thus, for example, it is conceivable to increase the capacity for the autonomous operation at occurrence of a power failure by cooperative and coordinative control of a town storage battery and a consumer-side distributed power supply (a solar cell and the like) for the purpose of ensuring the above-mentioned LCP for 72 hours.

Specifically, a community energy management system (CEMS) that manages the entire town (microgrid) predicts the amount of electric power generated by a solar cell installed in each consumer and the amount of electric power consumed by a load. Furthermore, based on these prediction results and the amount of electric power stored in a storage battery (a town storage battery and a storage battery installed in a consumer), an operation plan for the town storage battery, the consumer's storage battery, and the load is created, and CEMS notifies a home energy management system (HEMS) in each consumer about the created operation plan, with the result that the above-mentioned cooperative and coordinative control can be implemented.

In this case, the cycle of revising the operation plan is shortened to increase the frequency of prediction correction, thereby suppressing errors in the prediction result, so that the continuity of the autonomous operation can be improved.

On the other hand, since the CEMS manages 300 consumers, the operation plan is generally created and transmitted in the cycle of about 30 minutes. It is difficult to shorten this cycle from the viewpoint of calculation load. Thus, the operation plan is revised only in a 30-minute cycle, which causes a problem, for example, that the electric power generated by a solar cell is incorrectly predicted, thereby suppressing power generation despite that excessive electric power actually remains, with the result that unnecessary electric power is discharged from the town storage battery.

The present disclosure has been made to solve the above-described problems. An object of the present disclosure is to ensure balancing of electric power in an autonomous operation during a power failure in a management section (for example, a microgrid including factories, commercial facilities, leisure facilities or the like) equipped with a plurality of distributed power supplies including an energy creation device, without excessively increasing computation load for creating an operation plan for the plurality of distributed power supplies, and without unnecessarily suppressing an output from the energy creation device even if an error occurs in the operation plan.

Solution to Problem

In an aspect of the present disclosure, a power management system for a management section equipped with: a main distributed power supply to supply an alternating-current (AC) voltage to a first distribution system during a power failure; and a plurality of distributed power supplies including an energy creation device. The power management system includes a measuring instrument, a communication unit, an information collection unit, a power generation prediction unit, a power consumption prediction unit, an operation plan creation unit, and a transmission management unit. The measuring instrument measures electric power consumed by a load electrically connected to each of the distributed power supplies through a second distribution system that is connected through a transformer to the first distribution system. The communication unit communicates with the main distributed power supply, each of the distributed power supplies, and the measuring instrument. The information collection unit collects, through the communication unit, the consumed electric power that is measured by the measuring instrument and status information about each of the main distributed power supply and the distributed power supplies. The power generation prediction unit predicts electric power generated by the energy creation device in the distributed power supplies. The power consumption prediction unit predicts the electric power consumed by the load during a power failure. The operation plan creation unit creates a first operation plan for controlling the main distributed power supply and a second operation plan for controlling the distributed power supplies. The first operation plan and the second operation plan are applied in an autonomous operation for addressing a power failure, and created based on a power generation prediction result by the power generation prediction unit, a power consumption prediction result by the power consumption prediction unit, the status information, and a power consumption actual result by the measuring instrument that are collected by the information collection unit. The transmission management unit transmits the first operation plan to the main distributed power supply through the communication unit in the autonomous operation, and transmits the second operation plan to each of the distributed power supplies through the communication unit in the autonomous operation. In the autonomous operation, the first operation plan is updated in each a first cycle set to be equal to or greater than an information collection cycle by the information collection unit, and transmitted to the main distributed power supply, and the second operation plan is updated in each a second cycle longer than the first cycle and transmitted to each of the distributed power supplies. The main distributed power supply includes a first controller. The first controller changes an AC voltage frequency output from the main distributed power supply to the first distribution system in accordance with an excess or a shortage of electric power with respect to a power trade balance that follows the first operation plan in the main distributed power supply. Each of the distributed power supplies includes a second controller. The second controller controls an output from each of the distributed power supplies in accordance with a control target value obtained by adding, to the second operation plan, a modification value according to an AC voltage frequency of the second distribution system.

In another aspect of the present disclosure, a power management system for a management section equipped with: a main distributed power supply to supply an AC voltage to a first distribution system during a power failure; and a plurality of distributed power supplies including an energy creation device. The power management system includes an information collection unit, a power generation prediction unit, a power consumption prediction unit, and an operation plan creation unit. The information collection unit collects electric power consumed by a load electrically connected to each of the distributed power supplies through a second distribution system that is connected to the first distribution system, and status information about each of the main distributed power supply and the distributed power supplies. The power generation prediction unit predicts electric power generated by the energy creation device in the distributed power supplies. The power consumption prediction unit predicts the electric power consumed by the load during a power failure. The operation plan creation unit creates a first operation plan for controlling the main distributed power supply and a second operation plan for controlling the distributed power supplies. The first operation plan and the second operation plan are applied in an autonomous operation for addressing a power failure, and created based on a power generation prediction result by the power generation prediction unit, a power consumption prediction result by the power consumption prediction unit, the status information, and a power consumption actual result of the load that are collected by the information collection unit. In the autonomous operation, the first operation plan is updated in each a first cycle set to be equal to or greater than an information collection cycle by the information collection unit, and transmitted to the main distributed power supply, and the second operation plan is updated in each a second cycle longer than the first cycle and transmitted to each of the distributed power supplies. The main distributed power supply includes a first controller. The first controller changes an AC voltage frequency output from the main distributed power supply to the first distribution system in accordance with an excess or a shortage of electric power with respect to a power trade balance that follows the first operation plan in the main distributed power supply. Each of the distributed power supplies includes a second controller. The second controller controls an output from each of the distributed power supplies in accordance with a control target value obtained by adding, to the second operation plan, a modification value according to an AC voltage frequency of the second distribution system.

Advantageous Effects of Invention

According to the present disclosure, in a management section (a microgrid) in which a plurality of distributed power supplies including an energy creation device are installed, when electric power generated by the energy creation device changes to deviate from the second operation plan to thereby disturb a power trade balance in the management section, the AC voltage frequency (system frequency) shared among a main distributed power supply and a plurality of distributed power supplies through first and second distribution systems is changed in accordance with an error (an excess or a shortage of electric power) from the first operation plan that is created in a shorter cycle than that of the second operation plan, and thereby, a control target value for each distributed power supply can be modified without re-creating the second operation plan. As a result, balancing of electric power can be ensured without excessively increasing computation load for creating an operation plan for the plurality of distributed power supplies, and without unnecessarily suppressing an output from the energy creation device even if an error occurs in the operation plan.

DESCRIPTION OF EMBODIMENTS

Figure 1:
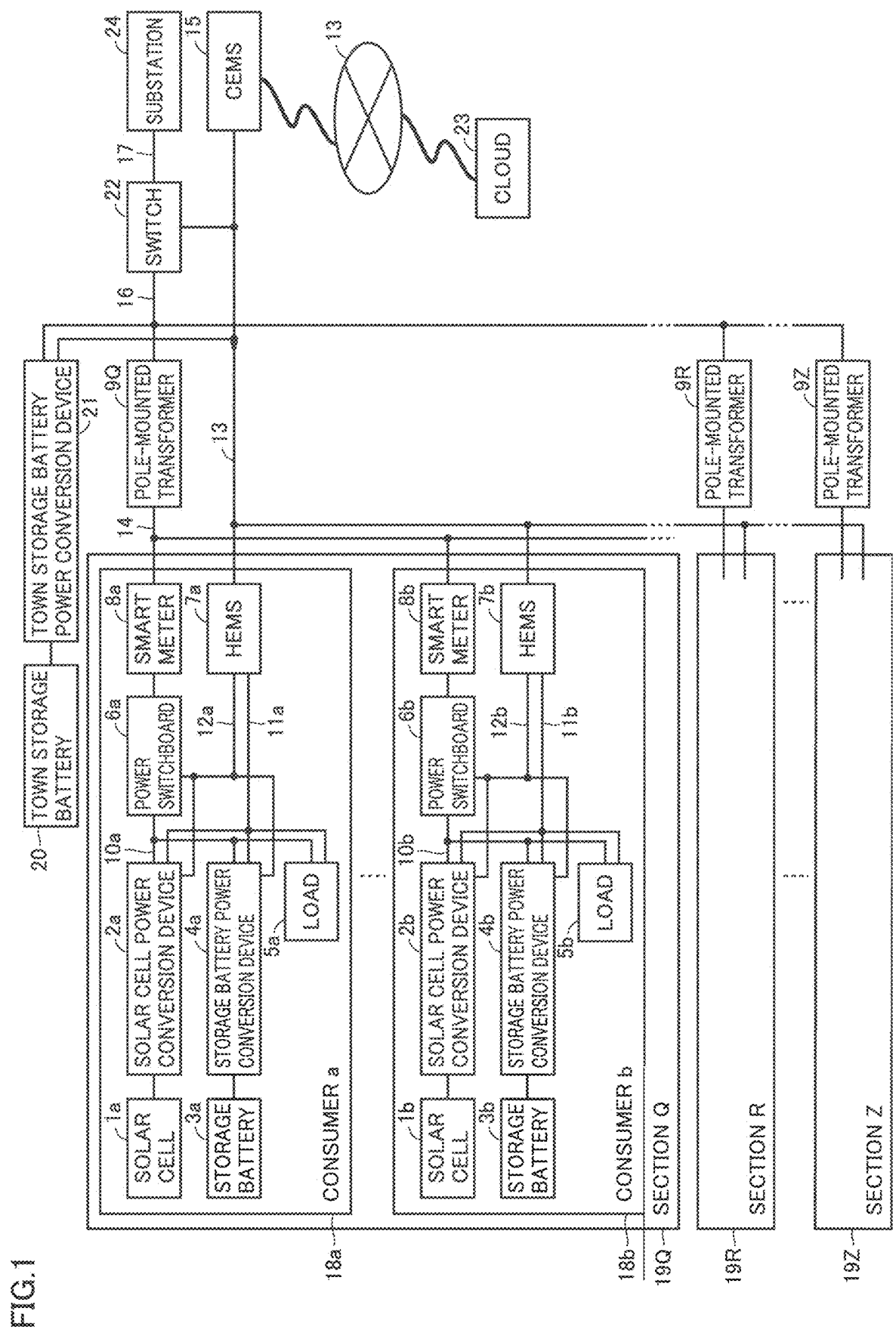
FIG. 1 is a block diagram showing a configuration of a distributed power supply system disposed in a smart town as an example of a microgrid to which a power management system according to the present embodiment is applied.

The embodiments of the present disclosure will be hereinafter described in detail with reference to the accompanying drawings. In the following description, the same or corresponding portions will be designated by the same reference characters, and description thereof will not be basically repeated.

(System Configuration)

FIG. 1 is a block diagram showing a configuration of a distributed power supply system disposed in a smart town as an example of a microgrid to which a power management system according to an embodiment of the present disclosure is applied. Specifically, the smart town corresponds to one example of a "management section".

Referring to FIG. 1, the distributed power supply system is disposed in a smart town formed of a collection of a plurality of sections (for example, about 30 sections). Each of the sections forming such a smart town is constituted of a plurality of (for example, about ten) consumers connected to a common pole-mounted transformer 9. FIG. 1 shows sections 19Q, 19R and 19Z, and pole-mounted transformers 9Q, 9R and 9Z that correspond to sections 19Q, 19R and 19Z, respectively, but any number of sections may be provided. Furthermore, a consumer a and a consumer b are shown in section 19Q, but any number of consumers may exist in one section.

Each consumer house 18 includes a solar cell 1, a solar cell power conversion device 2, a storage battery 3, a storage battery power conversion device 4, a load 5 in a consumer house, a power switchboard 6, a HEMS 7, a smart meter 8, a consumer premises distribution system 10, a consumer premises communication network 11, and a signal line 12. Consumer premises communication network 11 connects HEMS 7 to devices installed in each house. Through signal line 12, consumed power and the like of each device measured by power switchboard 6 are transmitted to HEMS 7.

FIG. 1 shows the configurations of consumer houses 18a and 18b of respective consumers "a" and "b" in section 19Q with suffixes a and b added to reference numerals of the respective elements, whereas the elements are denoted by reference numerals without suffixes a and b when the description is common to the consumers since the configurations of the systems in the consumer houses are the same. Similarly, the pole-mounted transformers will be denoted simply as a pole-mounted transformer 9 without suffixes Q, R and Z when the description is common to the sections.

Furthermore, a smart town shared among the consumers and the sections has a configuration including: a distribution system 17 connected to a substation 24; a distribution system 16 connected to the pole-mounted transformer's primary side between pole-mounted transformers 9; a distribution system 14 on the pole-mounted transformer's secondary side between pole-mounted transformer 9 and each consumer; an outside premises communication network 13; a CEMS 15; a town storage battery 20; a town storage battery power conversion device 21; a switch 22; and a cloud 23.

CEMS 15 manages demand and supply of electric power in a city section constituted of sections 19Q to 19Z. Outside premises communication network 13 connects communication between HEMS 7 of each consumer and CEMS 15. Cloud 23 distributes weather forecast information and the like. Through outside premises communication network 13, CEMS 15 can acquire the information distributed from cloud 23. Town storage battery power conversion device 21 performs DC/AC power conversion between town storage battery 20 and distribution system 16. Switch 22 is provided between distribution system 16 and distribution system 17 that is connected to substation 24. Switch 22 can provide electrical disconnection between substation 24 and distribution systems 14, 16 in a smart town.

The following is an explanation about the present embodiment in the case where each consumer house 18 is configured as a ZEH house equipped with solar cell 1 (having a capacity of about 4 to 6 (kW)), and a mega-solar system is formed in the entire smart town. In other words, in the present embodiment, an explanation will be hereinafter given with regard to the configuration in which solar cell 1 and storage battery 3 are installed as "distributed power supplies" in each of consumer houses 18. Solar cell 1 corresponds to one example of an "energy creation device". Storage battery 3 corresponds to one example of an "energy storage device".

Moreover, storage battery 3 is illustrated to have a configuration employing one fixed-type battery, but an "energy storage device" can also be formed in cooperation with two or more storage batteries or other distributed power supply devices. In particular, an on-vehicle storage battery in an electric vehicle (EV), a plug-in hybrid electric vehicle (PHEV), or a fuel cell vehicle (FCV) can also be used. Furthermore, storage battery 3 can also be formed by combining a fixed-type storage battery with an on-vehicle storage battery.

Similarly, other energy creation devices (for example, a fuel cell, and a wind power generation facility) may be disposed in place of solar cell 1. Alternatively, in addition to solar cell 1, other energy creation devices may further be disposed. Moreover, the present embodiment is described with regard to an example of a configuration in which both solar cell 1 (an energy creation device) and a storage battery (an energy storage device) are disposed in each consumer house 18, but some of consumer houses 18 may include only one of solar cell 1 and storage battery 3.

Figure 2:
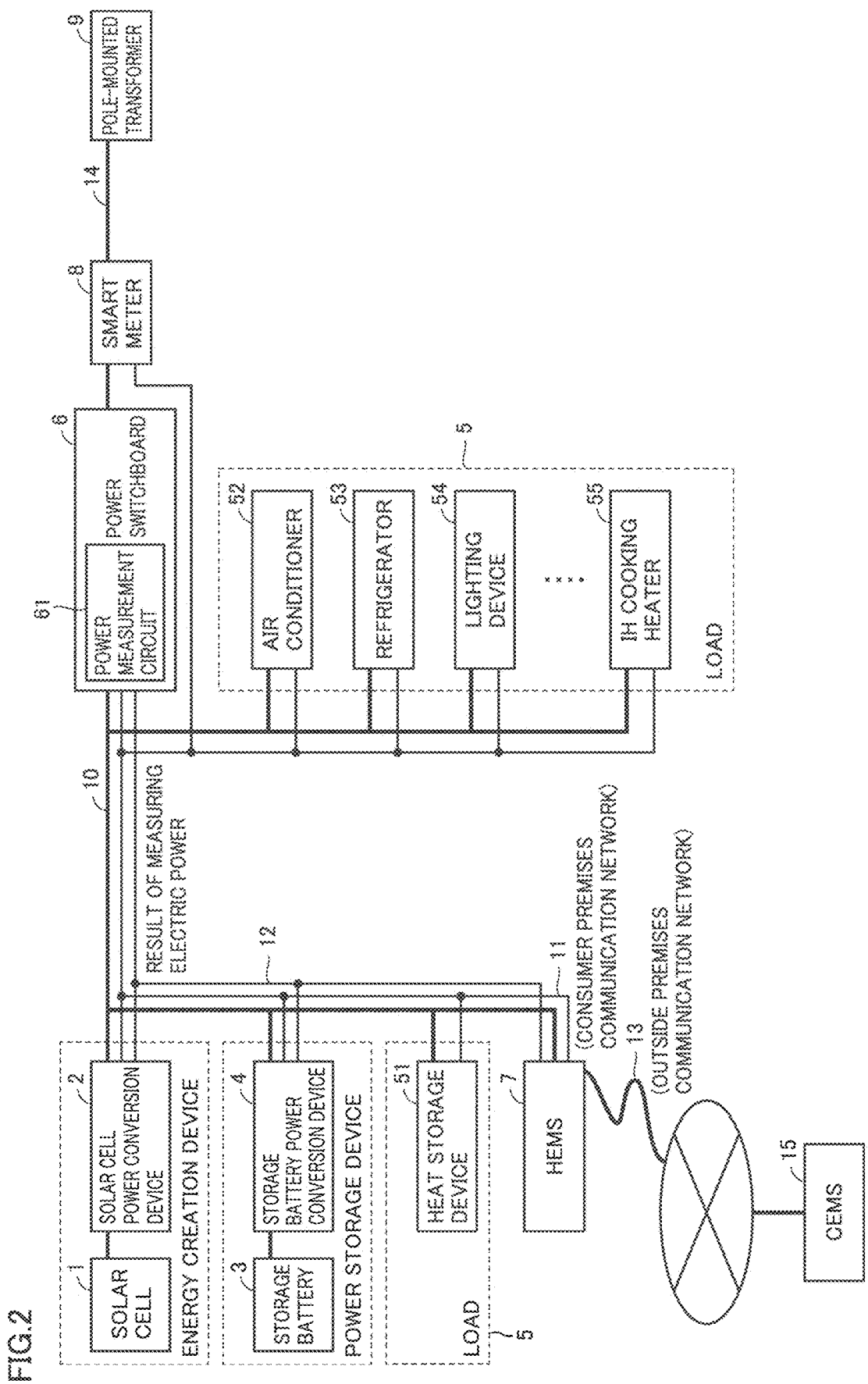
FIG. 2 is a block diagram for further illustrating configurations of various devices in a consumer house shown in FIG. 1.

FIG. 2 shows a block diagram for further illustrating configurations of various devices in consumer house 18 shown in FIG. 1.

Referring to FIG. 2, solar cell 1 and solar cell power conversion device 2 constitute a distributed power supply by an energy creation device while storage battery 3 and storage battery power conversion device 4 constitute a distributed power supply by an energy storage device. As described above, the power supply system in each consumer house may be provided with only one of a distributed power supply by an energy creation device and a distributed power supply by an energy storage device.

Load 5 includes a heat storage device 51 such as Eco Cute (registered trademark), an air conditioner 52, a refrigerator 53, a lighting device 54, and an IH cooking heater 55, for example. Load 5 operates with electric power supplied from consumer premises distribution system 10. Power switchboard 6 is equipped inside with a power measurement circuit 61 for measuring consumed electric power per breaker. The measured value by power measurement circuit 61 is transmitted to HEMS 7 through signal line 12. HEMS 7 is capable of transmitting and receiving data to and from each device of load 5 and smart meter 8 through consumer premises communication network 11.

For each consumer house 18, electric power is supplied from pole-mounted transformer 9 through smart meter 8 to consumer premises distribution system 10. Furthermore, CEMS 15 is connected to HEMS 7 through outside premises communication network 13. HEMS 7 is capable of transmitting and receiving data to and from CEMS 15 through outside premises communication network 13.

CEMS 15 periodically creates an operation plan for the distributed power supply system described with reference to FIGS. 1 and 2. It should be noted that creation of the operation plan in the present embodiment means both: newly creating an operation plan at a certain time; and re-creating an operation plan by modifying or correcting the operation plan at the time when it has already been created.

Figure 3:
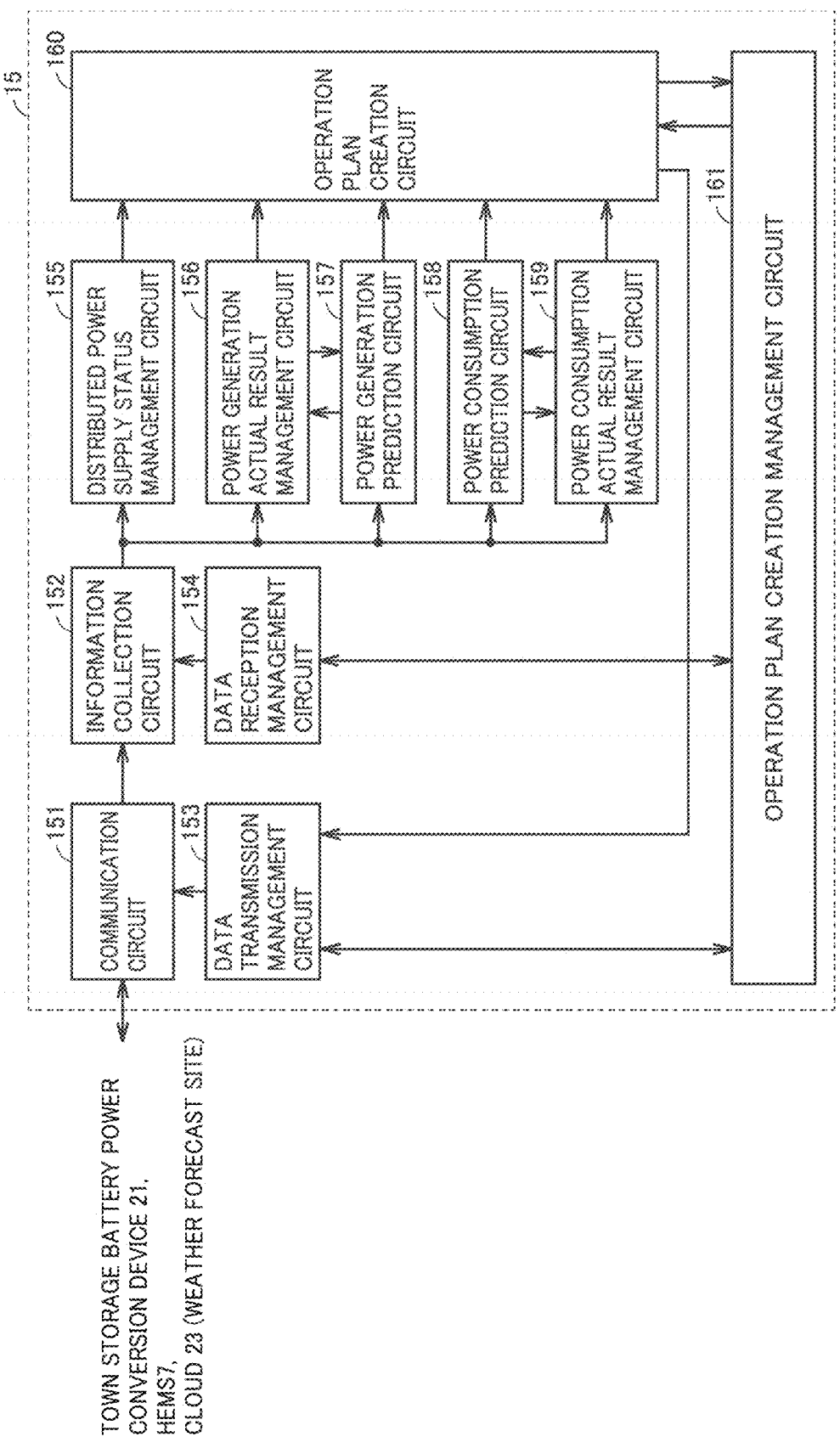
FIG. 3 is a block diagram illustrating an operation plan creation function by a CEMS in the present embodiment.

FIG. 3 is a block diagram illustrating an operation plan creation function by CEMS 15 in the present embodiment.

Referring to FIG. 3, CEMS 15 includes a communication circuit 151, an information collection circuit 152, a data transmission management circuit 153, a data reception management circuit 154, a distributed power supply status management circuit 155, a power generation actual result management circuit 156, a power generation prediction circuit 157, a power consumption prediction circuit 158, a power consumption actual result management circuit 159, an operation plan creation circuit 160, and an operation plan creation management circuit 161.

Via outside premises communication network 13, communication circuit 151 transmits and receives information through communication among HEMS 7 installed in each consumer house 18, town storage battery power conversion device 21, and cloud 23.

Information collection circuit 152 collects and manages the power consumption amount of each consumer house 18, the status information about solar cell 1 and storage battery 3, the status information about town storage battery 20, and the weather forecast information obtained through cloud 23, each of which has been obtained through communication circuit 151.

Through communication circuit 151, data transmission management circuit 153 manages transmission of the operation plan created by CEMS 15, transmission of a request for transmission of a power consumption amount and the like measured in each consumer house 18, or the like. Data reception management circuit 154 manages the data received through communication circuit 151.

Distributed power supply status management circuit 155 manages the status information about the distributed power supply that is output from information collection circuit 152 (the amount of electric power generated by solar cell 1 that has been received from solar cell power conversion device 2 in consumer house 18, and the control mode of solar cell 1 (which will be described later in detail)). Furthermore, distributed power supply status management circuit 155 manages the charge/discharge power amount, the state of charge (SOC) and the state of health (SOH) of storage battery 3, which are output from storage battery power conversion device 4. Distributed power supply status management circuit 155 also manages the charge/discharge power amount, the SOC and the SOH of town storage battery 20, which are output from town storage battery power conversion device 21.

Power generation actual result management circuit 156 manages the amount of electric power generated by solar cell 1 in each consumer house 18, which is output from information collection circuit 152. Based on the power generation amount actual result value of which each consumer house 18 notifies power generation actual result management circuit 156, this power generation actual result management circuit 156 constructs a database at each date, at each time (for example, in each 30 minutes), and for each actual result of weathers.

Power generation prediction circuit 157 predicts the electric power generated by solar cell 1 in each consumer house 18 based on the weather forecast information output from information collection circuit 152 and the power generation amount actual result database constructed by power generation actual result management circuit 156.

Power consumption actual result management circuit 159 manages the power consumption actual result value of load 5 in each consumer house 18 that is output from information collection circuit 152. In an interconnection operation, based on the power consumption actual result value of which each consumer house 18 notifies power consumption actual result management circuit 159, this power consumption actual result management circuit 159 constructs a database in each month, on the same day each week, at each time (for example, in each 30 minutes), and for each actual result of weathers (including the actual result of outside temperatures).

Power consumption prediction circuit 158 predicts the electric power consumed by load 5 in each consumer house 18 based on the weather forecast information output from information collection circuit 152 (including the prediction information about outside temperatures), and the power consumption actual result database constructed by power consumption actual result management circuit 159.

Based on the data output from distributed power supply status management circuit 155, power generation actual result management circuit 156, power generation prediction circuit 157, power consumption prediction circuit 158, and power consumption actual result management circuit 159, operation plan creation circuit 160 generates a charge/discharge plan for town storage battery 20 (a 5-minute cycle and a 30-minute cycle), a drooping characteristic of town storage battery power conversion device 21, trading electric power at a system interconnection point in each consumer house 18, a drooping characteristic for solar cell power conversion device 2, and a drooping characteristic for storage battery power conversion device 4. Operation plan creation management circuit 161 manages the operation of the entire operation plan creation function of CEMS 15.

In this case, the drooping characteristics used in town storage battery power conversion device 21 and also used in solar cell power conversion device 2 and storage battery power conversion device 4 in each consumer house 18 mean the characteristics by which the system frequency increases (when electric power is excessive) or decreases (when electric power is in shortage) in accordance with an excess or a shortage of the electric power consumed by the load with respect to the electric power generated by a power generator, which is a phenomenon generally occurring in a power system. In the present embodiment, the entire power balance within a microgrid is shared among the conversion devices by the drooping characteristics, as will be apparent in the description below.

Figure 4:
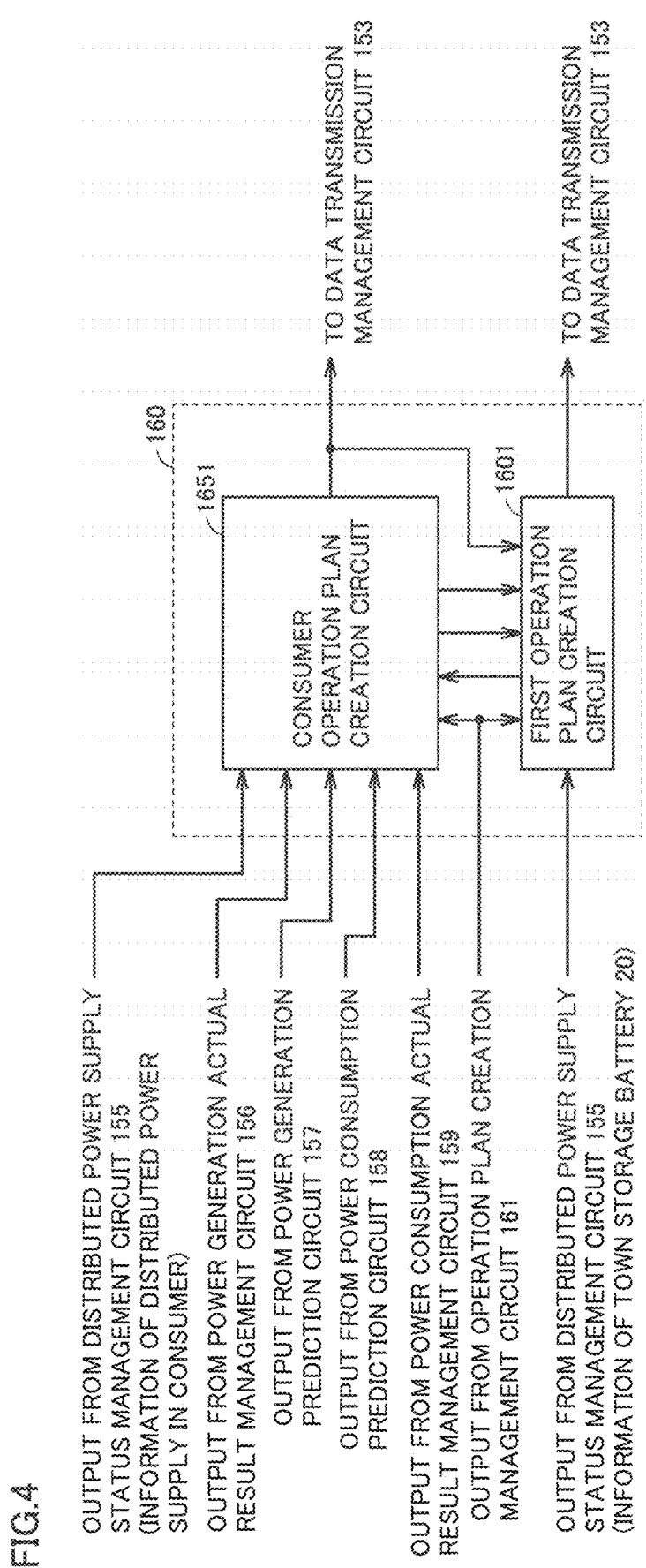
FIG. 4 is a block diagram illustrating a configuration of an operation plan creation circuit shown in FIG. 3.

FIG. 4 is a block diagram illustrating a configuration of operation plan creation circuit 160 shown in FIG. 3.

Referring to FIG. 4, operation plan creation circuit 160 includes a consumer operation plan creation circuit 1651 and a first operation plan creation circuit 1601.

Consumer operation plan creation circuit 1651 generates trading electric power at the system interconnection point in each consumer house 18, a drooping characteristic for solar cell power conversion device 2, and a drooping characteristic for storage battery power conversion device 4. First operation plan creation circuit 1601 generates a charge/discharge plan for town storage battery 20 (in a 5-minute cycle and a 30-minute cycle), and a drooping characteristic of town storage battery power conversion device 21.

Figure 5:
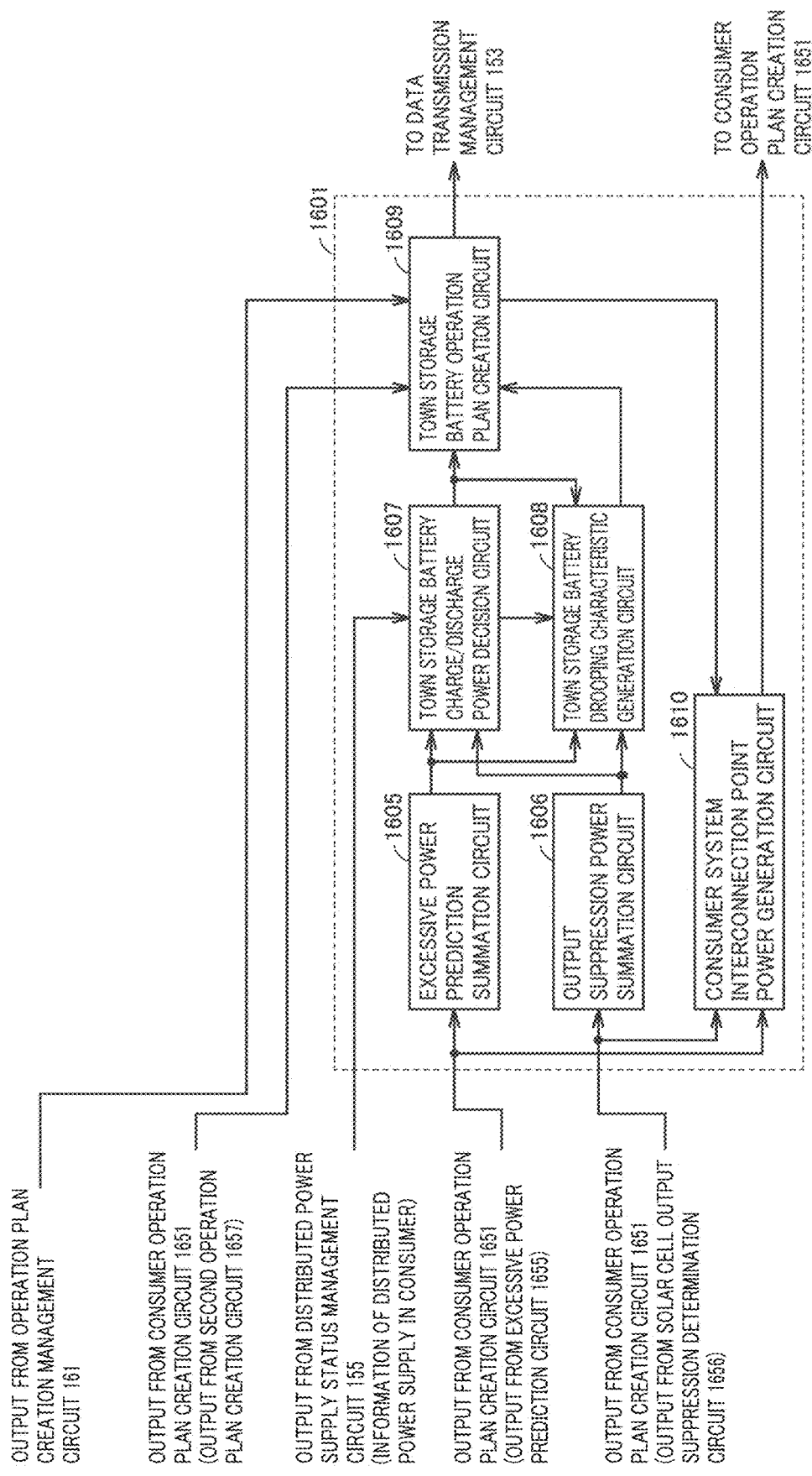
FIG. 5 is a block diagram illustrating a configuration of a first operation plan creation circuit shown in FIG. 4.

FIG. 5 is a block diagram illustrating a configuration of first operation plan creation circuit 1601 shown in FIG. 4.

Referring to FIG. 5, first operation plan creation circuit 1601 includes an excessive power prediction summation circuit 1605, an output suppression power summation circuit 1606, a town storage battery charge/discharge power decision circuit 1607, a town storage battery drooping characteristic generation circuit 1608, a town storage battery operation plan creation circuit 1609, and a consumer system interconnection point power generation circuit 1610.

Excessive power prediction summation circuit 1605 sums the prediction results about the excessive electric power in each consumer house 18 that is output from an excessive power prediction circuit 1655 (described later) in consumer operation plan creation circuit 1651. Output suppression power summation circuit 1606 sums the output suppression power estimation values for solar cells 1 in respective consumer houses 18 that are output from a solar cell output suppression determination circuit 1656 (described later) in consumer operation plan creation circuit 1651. Town storage battery charge/discharge power decision circuit 1607 decides the charge/discharge power from town storage battery 20 based on the outputs from excessive power prediction summation circuit 1605 and output suppression power summation circuit 1606. Town storage battery drooping characteristic generation circuit 1608 generates a drooping characteristic of town storage battery 20 based on the outputs from excessive power prediction summation circuit 1605, output suppression power summation circuit 1606, and town storage battery charge/discharge power decision circuit 1607.

According to a timing signal output from operation plan creation management circuit 161, town storage battery operation plan creation circuit 1609 creates an operation plan for town storage battery 20 based on the information from: town storage battery charge/discharge power decision circuit 1607 and a second operation plan creation circuit 1657 (described later) in consumer operation plan creation circuit 1651. In the present embodiment, operation plan creation management circuit 161 outputs two types of timing signals including a timing signal in a 5-minute cycle, and a timing signal in a 30-minute cycle.

Consumer system interconnection point power generation circuit 1610 generates a trading power target value at the system interconnection point in each consumer house 18 (consumer premises distribution system 10 in FIGS. 1 and 2) based on the outputs from excessive power prediction circuit 1655, solar cell output suppression determination circuit 1656, and town storage battery operation plan creation circuit 1609. A positive value of the trading power target value shows the power selling direction in which electric power is output from a distributed power supply to consumer premises distribution system 10. A negative value of the trading power target value shows the power buying direction opposite to the power selling direction.

Figure 6:
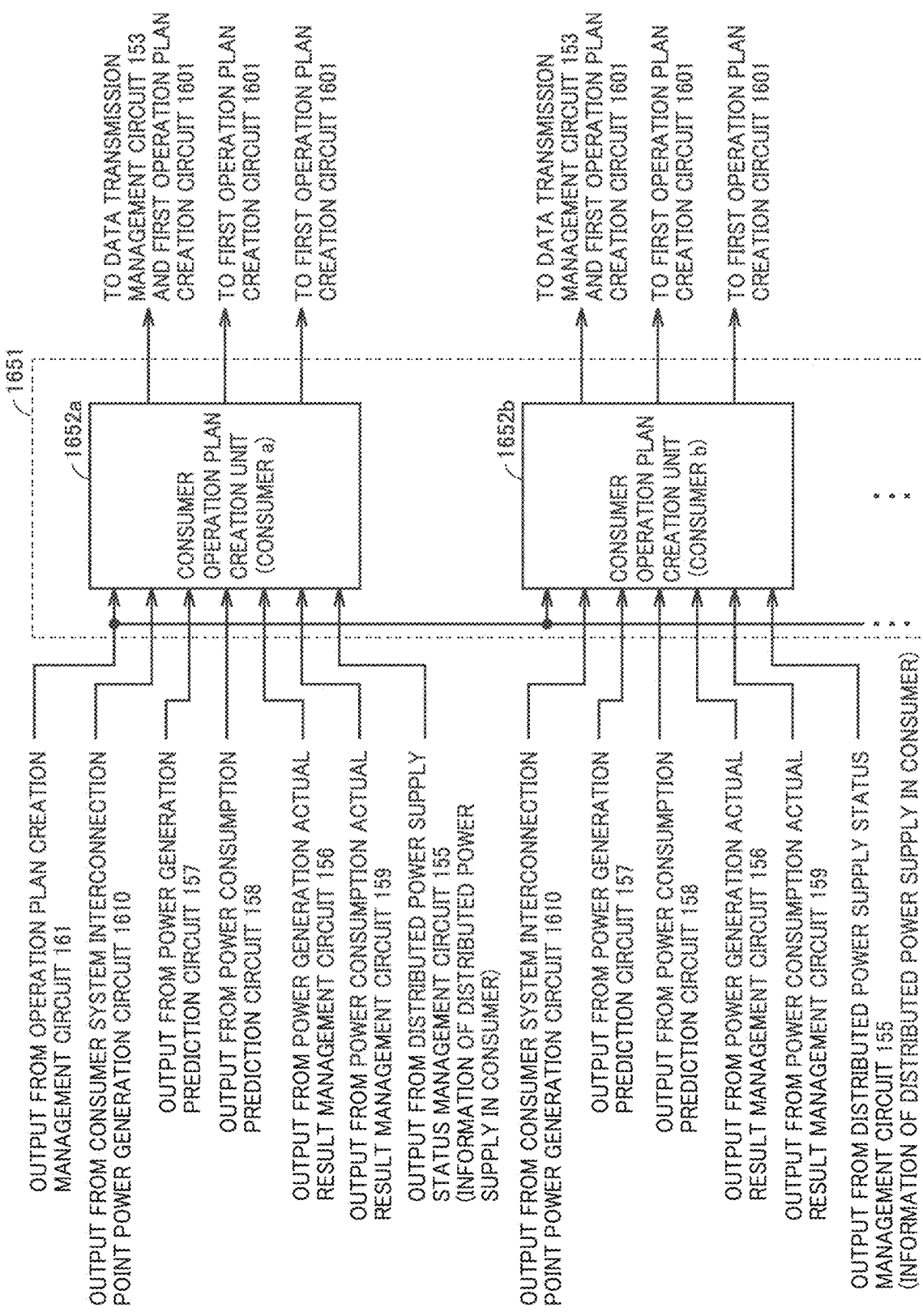
FIG. 6 is a block diagram illustrating a configuration of a consumer operation plan creation circuit shown in FIG. 4.

FIG. 6 is a block diagram illustrating a configuration of consumer operation plan creation circuit 1651 shown in FIG. 4.

Referring to FIG. 6, consumer operation plan creation circuit 1651 includes a consumer operation plan creation unit 1652 provided in each consumer house 18. FIG. 6 illustrates consumer operation plan creation units 1652*a* and 1652*b* for creating operation plans for consumer houses 18*a* and 18*b*, respectively, in FIG. 1. In fact, the same number of consumer operation plan creation units 1652 as consumers managed by CEMS 15 are mounted in consumer operation plan creation circuit 1651.

Figure 7:
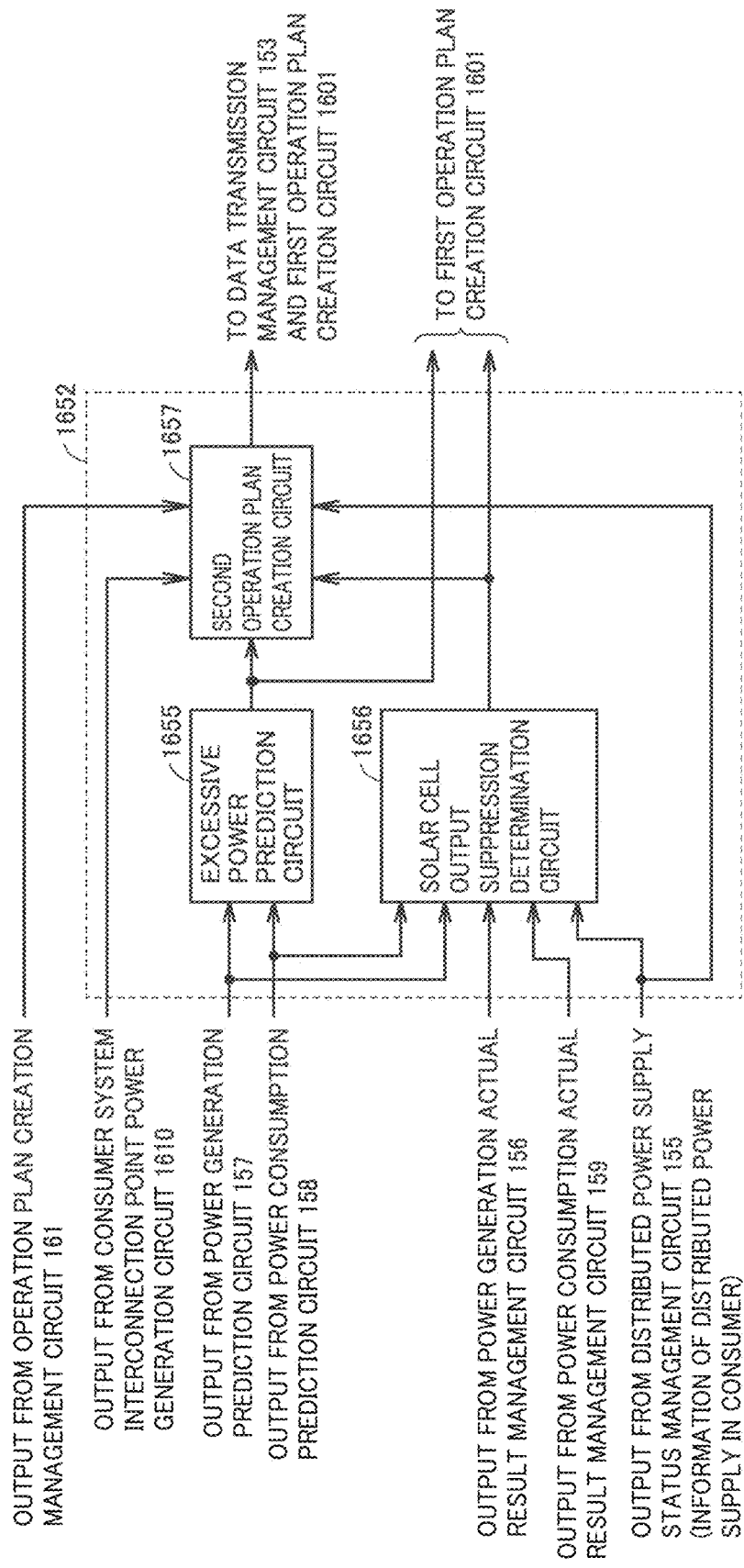
FIG. 7 is a block diagram illustrating a configuration of a consumer operation plan creation unit shown in FIG. 6.

FIG. 7 is a block diagram illustrating each configuration of consumer operation plan creation unit 1652 shown in FIG. 6. Consumer operation plan creation unit 1652 shown in FIG. 6 is assumed to create an operation plan for a consumer house 18x among a plurality of consumer houses 18.

Referring to FIG. 7, consumer operation plan creation unit 1652 includes excessive power prediction circuit 1655, solar cell output suppression determination circuit 1656, and second operation plan creation circuit 1657.

Excessive power prediction circuit 1655 predicts excessive electric power in consumer house 18x from power generation prediction circuit 157 and power consumption prediction circuit 158. Solar cell output suppression determination circuit 1656 determines whether solar cell 1 suppresses output or not, based on the power generation amount prediction result about solar cell 1 installed in consumer house 18x, the power consumption prediction result, the power generation amount actual result, the power consumption actual result, and the status information from solar cell power conversion device 2 and storage battery power conversion device 4 in consumer house 18x. When solar cell output suppression determination circuit 1656 determines that output is suppressed, it further predicts a power value obtained as a result of output suppression.

In response to reception of the timing signal output from operation plan creation management circuit 161 (assuming that the timing signal is output in a 30-minute cycle), second operation plan creation circuit 1657 generates a trading power target value and a drooping characteristic at a system interconnection point in consumer house 18x, based on the outputs from excessive power prediction circuit 1655, solar cell output suppression determination circuit 1656, and consumer system interconnection point power generation circuit 1610, and the status information from storage battery power conversion device 4. As a result, by consumer operation plan creation circuit 1651 in FIG. 6, the trading power target value and the drooping characteristic at a system interconnection point are generated separately for each consumer house 18.

Figure 8:
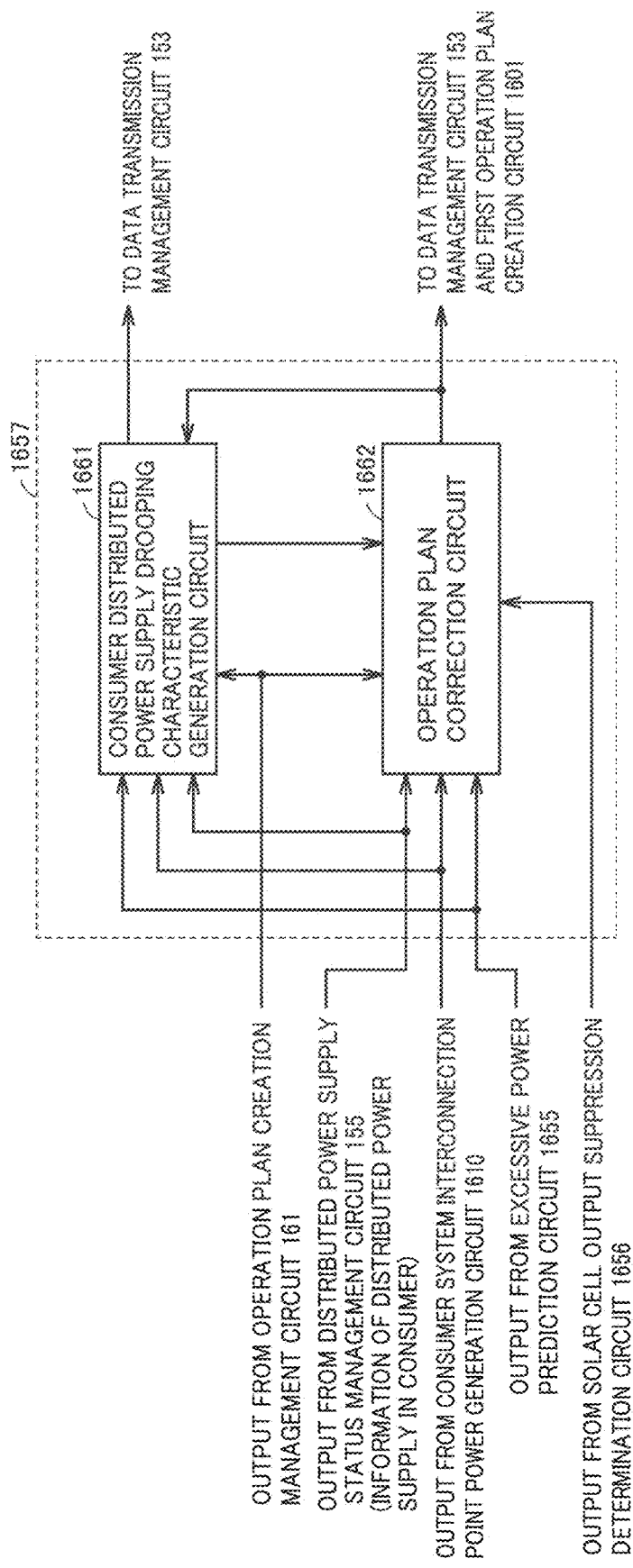
FIG. 8 is a block diagram illustrating a configuration of a second operation plan creation circuit shown in FIG. 7.

FIG. 8 is a block diagram illustrating a configuration of second operation plan creation circuit 1657 shown in FIG. 7. Consumer operation plan creation unit 1652 shown in FIG. 7 is also intended to create an operation plan for consumer house 18x among the plurality of consumer houses 18.

Referring to FIG. 8, second operation plan creation circuit 1657 includes a consumer distributed power supply drooping characteristic generation circuit 1661, and an operation plan correction circuit 1662.

In response to reception of the timing signal output from operation plan creation management circuit 161 (assuming that the timing signal is output in a 30-minute cycle), operation plan correction circuit 1662 corrects the operation plan based on the outputs from distributed power supply status management circuit 155, consumer system interconnection point power generation circuit 1610, and excessive power prediction circuit 1655. In response to reception of the timing signal output from operation plan creation management circuit 161 (assuming that the timing signal is output in a 30-minute cycle), consumer distributed power supply drooping characteristic generation circuit 1661 generates a drooping characteristic in consumer house 18x based on the outputs from excessive power prediction circuit 1655, distributed power supply status management circuit 155, and operation plan correction circuit 1662.

Then, referring to FIGS. 9 to 16, the configurations of solar cell power conversion device 2, storage battery power conversion device 4, and town storage battery power conversion device 21 in FIG. 1 will be described in detail.

Figure 9:
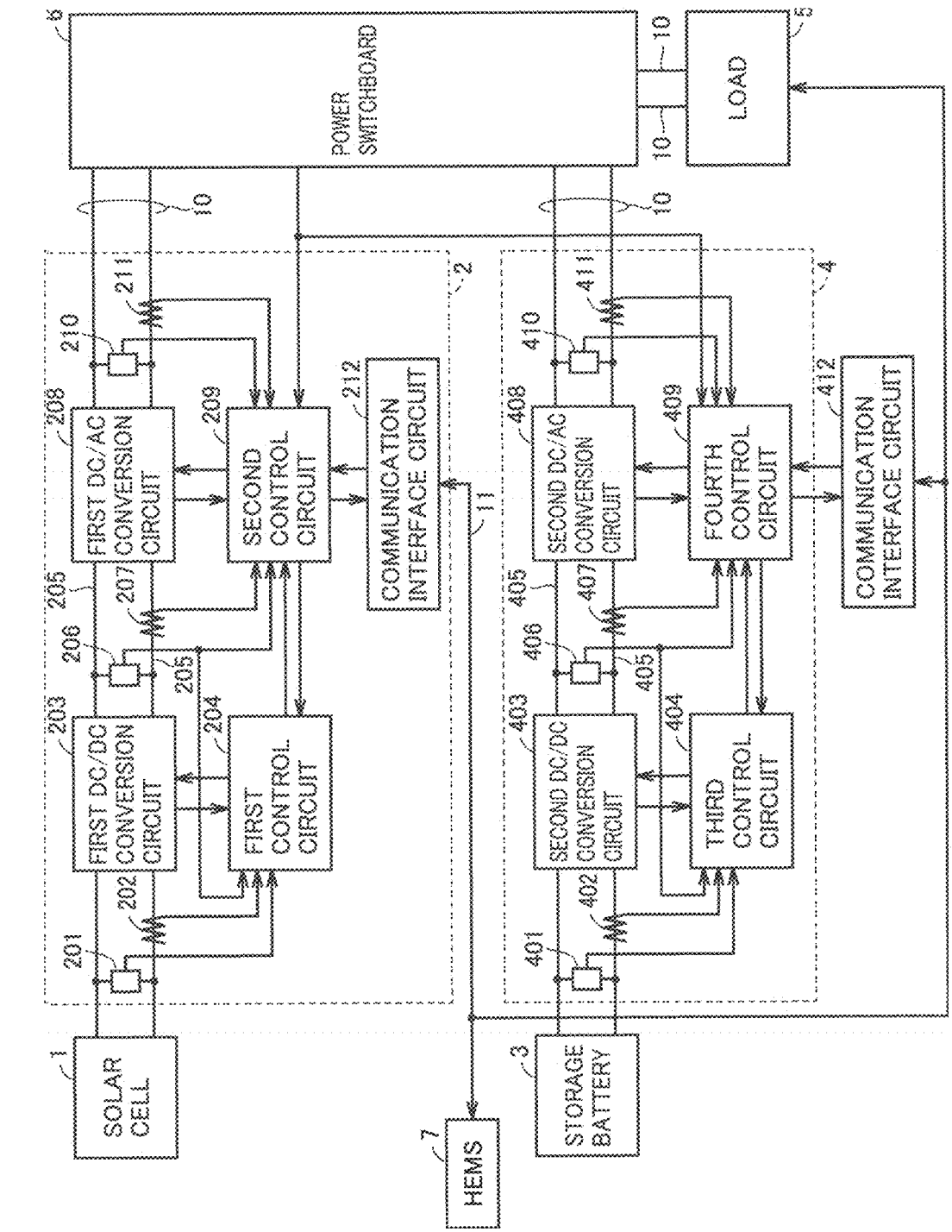
FIG. 9 is a block diagram illustrating configurations of a solar cell power conversion device and a storage battery power conversion device shown in FIG. 1.

FIG. 9 is a block diagram illustrating configurations of solar cell power conversion device 2 and storage battery power conversion device 4.

Referring to FIG. 9, solar cell power conversion device 2 includes a voltmeter 201, an ammeter 202, a first DC/DC conversion circuit 203, a first control circuit 204, a DC bus 205, a voltmeter 206, an ammeter 207, a first DC/AC conversion circuit 208, a second control circuit 209, a voltmeter 210, an ammeter 211, and a communication interface circuit 212.

Voltmeter 201 measures the voltage (DC) output from solar cell 1. Ammeter 202 measures the current (DC) output from solar cell 1. A first DC/DC conversion circuit 203 converts the DC power of the first DC voltage output from solar cell 1 into DC power of the second DC voltage. First control circuit 204 controls first DC/DC conversion circuit 203. Through DC bus 205, the second DC voltage output from first DC/DC conversion circuit 203 is supplied to first DC/AC conversion circuit 208. Voltmeter 206 measures the voltage on DC bus 205. Ammeter 207 measures the current (DC) output from first DC/DC conversion circuit 203.

First DC/AC conversion circuit 208 converts the DC power output from first DC/DC conversion circuit 203 into AC power. Second control circuit 209 controls first DC/AC conversion circuit 208. Voltmeter 210 measures the voltage (AC) output from first DC/AC conversion circuit 208. Ammeter 211 measures the current (AC) output from first DC/AC conversion circuit 208. Communication interface circuit 212 establishes communication between solar cell power conversion device 2 (second control circuit 209) and HEMS 7.

Storage battery power conversion device 4 includes a voltmeter 401, an ammeter 402, a second DC/DC conversion circuit 403, a third control circuit 404, a DC bus 405, a voltmeter 406, an ammeter 407, a second DC/AC conversion circuit 408, a fourth control circuit 409, a voltmeter 410, an ammeter 411, and a communication interface circuit 412.

Voltmeter 401 measures the voltage (DC) output from storage battery 3. Ammeter 402 measures the current (DC) output from storage battery 3. Second DC/DC conversion circuit converts the DC power of the third DC voltage output from storage battery 3 into DC power of the fourth DC voltage. Third control circuit 404 controls second DC/DC conversion circuit 403. Through DC bus 405, the fourth DC voltage output from second DC/DC conversion circuit 403 is supplied to second DC/AC conversion circuit 408.

Voltmeter 406 measures the voltage on DC bus 405. Ammeter 407 measures the direct current output from second DC/DC conversion circuit 403. Second DC/AC conversion circuit 408 converts the DC power output from second DC/DC conversion circuit 403 into AC power. Fourth control circuit 409 controls second DC/AC conversion circuit 408. Voltmeter 410 measures the voltage (AC) output from second DC/AC conversion circuit 408. Ammeter 411 measures the current (AC) output from second DC/AC conversion circuit 408. Communication interface circuit 412 establishes communication between storage battery power conversion device 4 (fourth control circuit 409) and HEMS 7.

First DC/DC conversion circuit 203, second DC/DC conversion circuit 403, first DC/AC conversion circuit 208, and second DC/AC conversion circuit 408 can be formed in the configuration of a known DC/DC converter and inverter as appropriate. Moreover, when a lithium-ion battery is used as storage battery 3, a battery management unit (BMU) incorporated on the battery side generally manages the power storage amount, the possibility of charge and discharge, the maximum charge current during charging, and the like, and notifies third control circuit 404 about the management results. However, for simplifying the description, the present embodiment will be described assuming that third control circuit 404 and ninth control circuit 604 collectively manage the power storage amount, the possibility of charge and discharge, the maximum charge current during charging, and the like.

Figure 10:
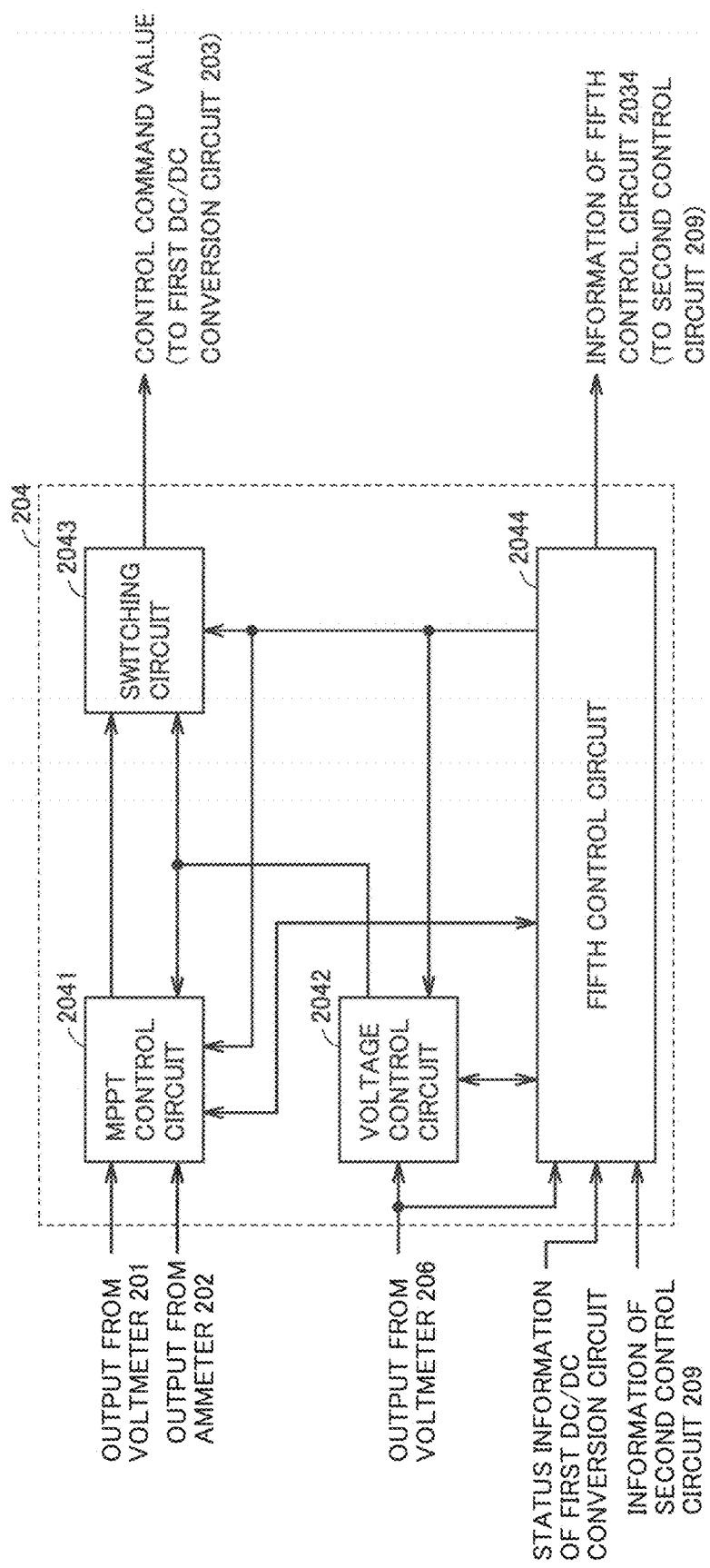
FIG. 10 is a block diagram illustrating a configuration of a first control circuit that controls a first direct-current (DC)/DC conversion circuit in the solar cell power conversion device shown in FIG. 9.

FIG. 10 is a block diagram illustrating the configuration of first control circuit 204 (FIG. 9) that controls first DC/DC conversion circuit 203 (FIG. 9) in solar cell power conversion device 2.

Referring to FIG. 10, first control circuit 204 includes a maximum power point tracking (MPPT) control circuit 2041, a voltage control circuit 2042, a switching circuit 2043, and a fifth control circuit 2044. Based on the measured values by voltmeter 201 and ammeter 202, MPPT control circuit 2041 searches for the maximum power point of solar cell 1 in order to extract, to the extent possible, the electric power generated by solar cell 1 for the so-called maximum power point tracking control. Specifically, MPPT control circuit 2041 generates a control command value for the first DC/DC conversion circuit for controlling the DC voltage measured by voltmeter 201 to be set at a voltage corresponding to the above-mentioned maximum power point.

Based on the measured value by voltmeter 206, voltage control circuit 2042 generates a control command value for first DC/DC conversion circuit 203 for maintaining the DC voltage (the second DC voltage) on DC bus 205 at a predetermined target voltage (for example, 350V).

Fifth control circuit 2044 outputs a control parameter, a control target value and the like to MPPT control circuit 2041 and voltage control circuit 2042, and also manages the power generation state of solar cell 1, and the like. Fifth control circuit 2044 further outputs a control signal for switching circuit 2043.

According to the control signal from fifth control circuit 2044, switching circuit 2043 selectively outputs one of the outputs from MPPT control circuit 2041 and voltage control circuit 2042 as a control command value for first DC/DC conversion circuit 203.

As described below, first DC/DC conversion circuit 203 is controlled in an MPPT mode or a voltage control mode. In the MPPT mode, switching circuit 2043 is controlled to output the control command value generated by MPPT control circuit 2041. In the voltage control mode, switching circuit 2043 is controlled to output the control command value generated by voltage control circuit 2042.

Figure 11:
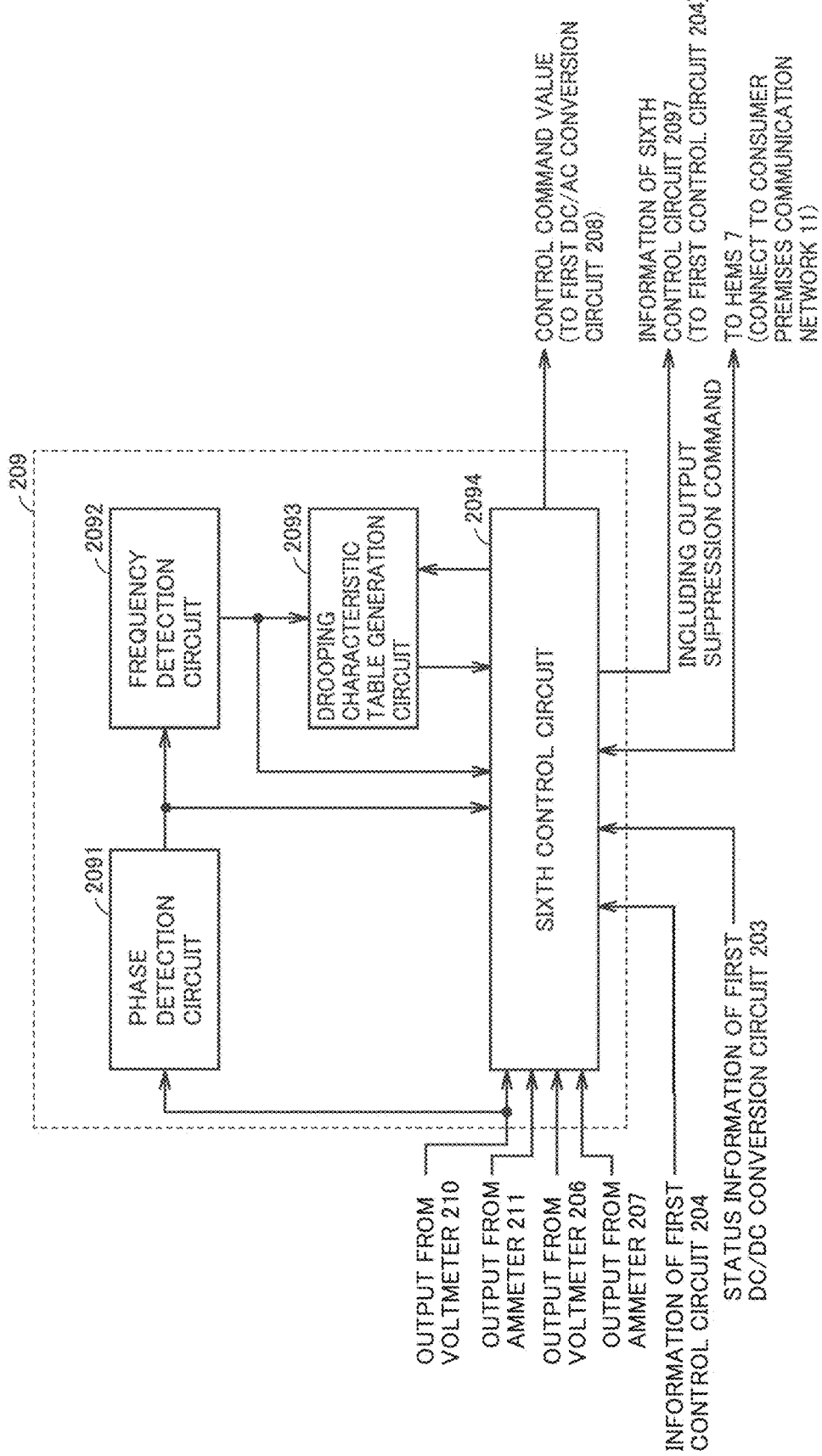
FIG. 11 is a block diagram illustrating a configuration of a second control circuit that controls a first DC/AC conversion circuit in the solar cell power conversion device shown in FIG. 9.

FIG. 11 is a block diagram illustrating the configuration of second control circuit 209 (FIG. 9) that controls the first DC/AC conversion circuit (FIG. 9) in solar cell power conversion device 2.

Referring to FIG. 11, second control circuit 209 includes a phase detection circuit 2091, a frequency detection circuit 2092, a drooping characteristic table generation circuit 2093, and a sixth control circuit 2094.

Phase detection circuit 2091 detects the voltage phase in consumer premises distribution system 10 from the AC voltage waveform measured by voltmeter 210. Frequency detection circuit 2092 detects the frequency of the AC voltage in consumer premises distribution system 10 from the cycle at a zero cross point of the AC voltage waveform detected in phase detection circuit 2091.

Drooping characteristic table generation circuit 2093 develops the drooping characteristic information received through communication interface circuit 212 into table data. Furthermore, according to the developed drooping characteristic table, drooping characteristic table generation circuit 2093 can detect an excess or a shortage of electric power in distribution system 14 (i.e., the power balance in a microgrid) based on the AC voltage frequency information detected in frequency detection circuit 2092. Based on the detection results, drooping characteristic table generation circuit 2093 notifies sixth control circuit 2094 about the excess or the shortage of the electric power generated by solar cell 1.

Based on the information about the excess/shortage of the electric power generated by solar cell 1 obtained from drooping characteristic table generation circuit 2093, sixth control circuit 2094 notifies fifth control circuit 2044 about the control target for the electric power generated by solar cell 1. Furthermore, sixth control circuit 2094 generates a control command value for controlling first DC/AC conversion circuit 208.

Figure 12:
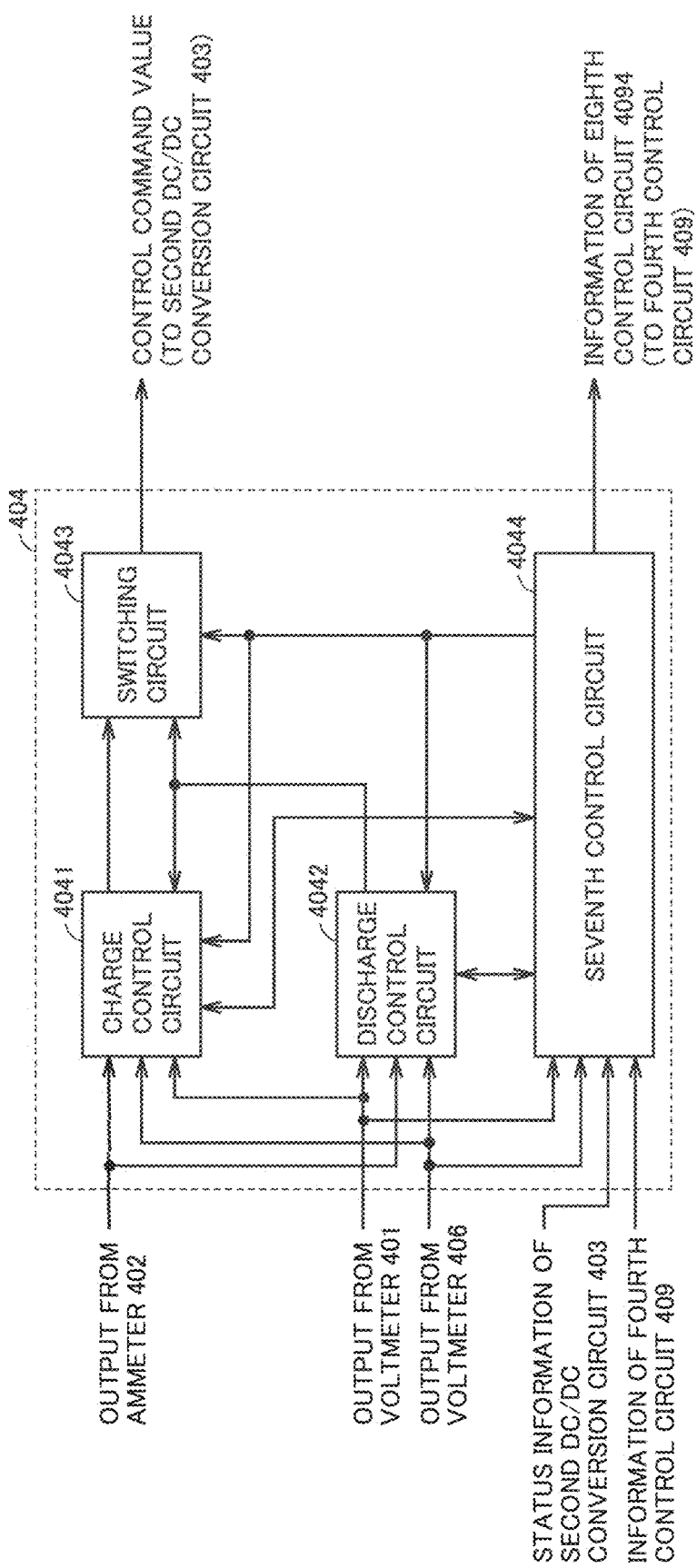
FIG. 12 is a block diagram illustrating a configuration of a third control circuit that controls a second DC/DC conversion circuit in the storage battery power conversion device shown in FIG. 9.

FIG. 12 is a block diagram illustrating a configuration of third control circuit 404 (FIG. 9) that controls second DC/DC conversion circuit 403 (FIG. 9) in storage battery power conversion device 4.

Referring to FIG. 12, third control circuit 404 includes a charge control circuit 4041, a discharge control circuit 4042, a switching circuit 4043, and a seventh control circuit 4044.

Charge control circuit 4041 generates a control command value for second DC/DC conversion circuit 403 that is used when charging of storage battery 3 is controlled. Discharge control circuit 4042 generates a control command value for second DC/DC conversion circuit 403 that is used when discharging of storage battery 3 is controlled. Seventh control circuit 4044 outputs a control parameter, a control target value and the like to charge control circuit 4041 and discharge control circuit 4042, and also, manages the charge amount, the charge current, the discharge power amount and the like of storage battery 3. Seventh control circuit 4044 further outputs a control signal of switching circuit 4043.

According to the control signal from seventh control circuit 4044, switching circuit 4043 selectively outputs one of the outputs from charge control circuit 4041 and discharge control circuit 4042 as a control command value for second DC/DC conversion circuit 403.

Switching circuit 4043 is controlled to output the control command value generated by charge control circuit 4041 when receiving an instruction to charge storage battery 3, and to output the control command value generated by discharge control circuit 4042 when receiving an instruction to discharge storage battery 3.

Figure 13:
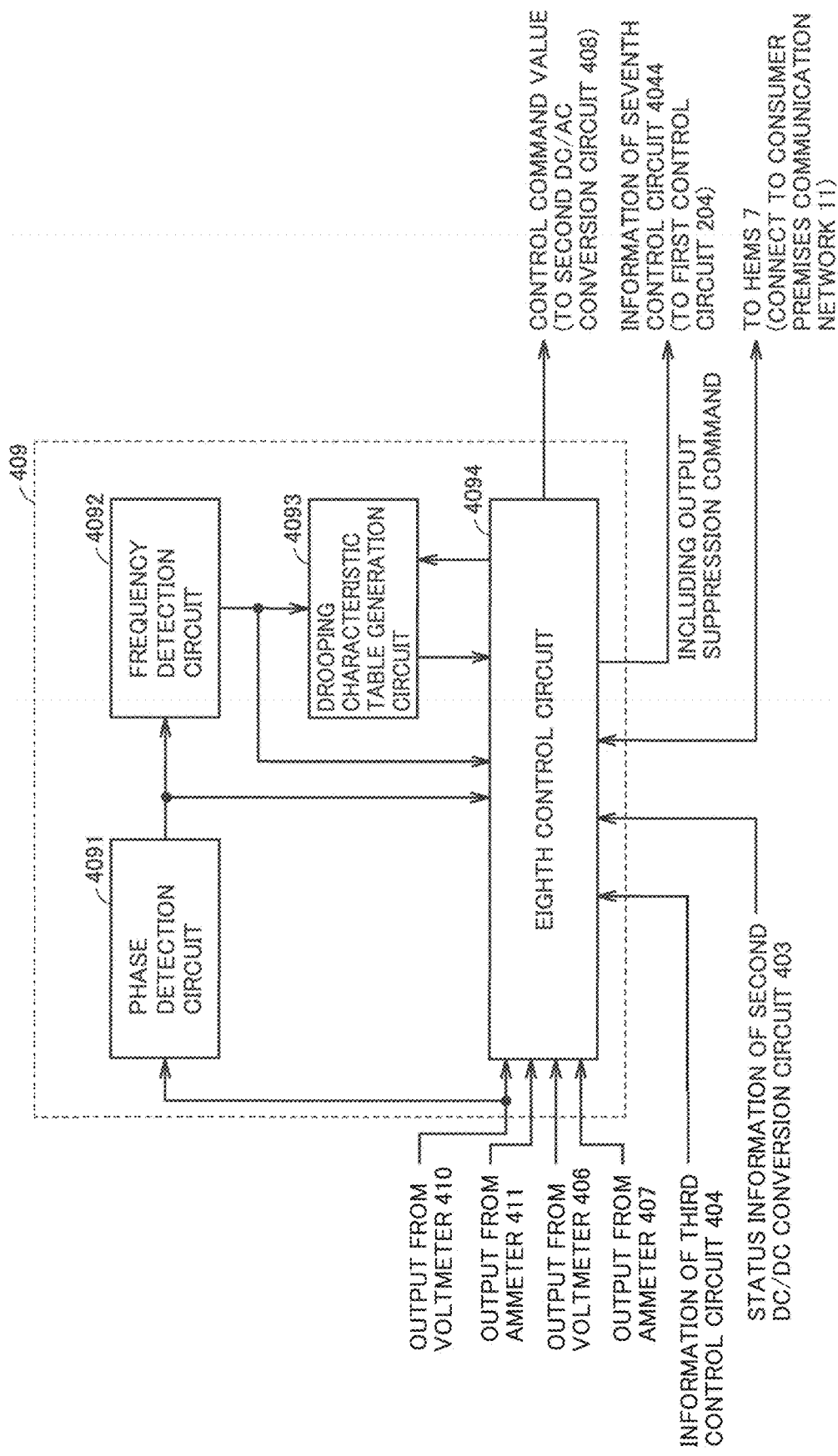
FIG. 13 is a block diagram illustrating a configuration of a fourth control circuit that controls a second DC/AC conversion circuit in the storage battery power conversion device shown in FIG. 9.

FIG. 13 is a block diagram illustrating the configuration of fourth control circuit 409 (FIG. 9) that controls second DC/AC conversion circuit 403 (FIG. 9) in storage battery power conversion device 4.

Referring to FIG. 13, fourth control circuit 409 includes a phase detection circuit 4091, a frequency detection circuit 4092, a drooping characteristic table generation circuit 4093, and an eighth control circuit 4094.

Phase detection circuit 4091 detects the voltage phase in distribution system 10 from the AC voltage waveform measured by voltmeter 410. Frequency detection circuit 4092 detects the frequency of the AC voltage in distribution system 10 from the cycle at a zero cross point of the AC voltage waveform detected in phase detection circuit 4091.

Drooping characteristic table generation circuit 4093 develops the drooping characteristic information received through communication interface circuit 412 into table data. Furthermore, according to the developed drooping characteristic table, drooping characteristic table generation circuit 4093 detects an excess or a shortage of electric power in distribution system 14 (i.e., the power balance in a microgrid) based on the AC voltage frequency information detected in frequency detection circuit 4092. Based on the detection results, drooping characteristic table generation circuit 4093 notifies eighth control circuit 4094 about the excess or the shortage of the charge/discharge power of storage battery 3.

Based on the information about the excess/shortage of the charge/discharge power of storage battery 3 obtained from drooping characteristic table generation circuit 4093, eighth control circuit 4094 notifies seventh control circuit 4044 about the control target for the charge/discharge power of storage battery 3. Furthermore, eighth control circuit 4094 generates a control command value for controlling second DC/AC conversion circuit 408.

Figure 14:
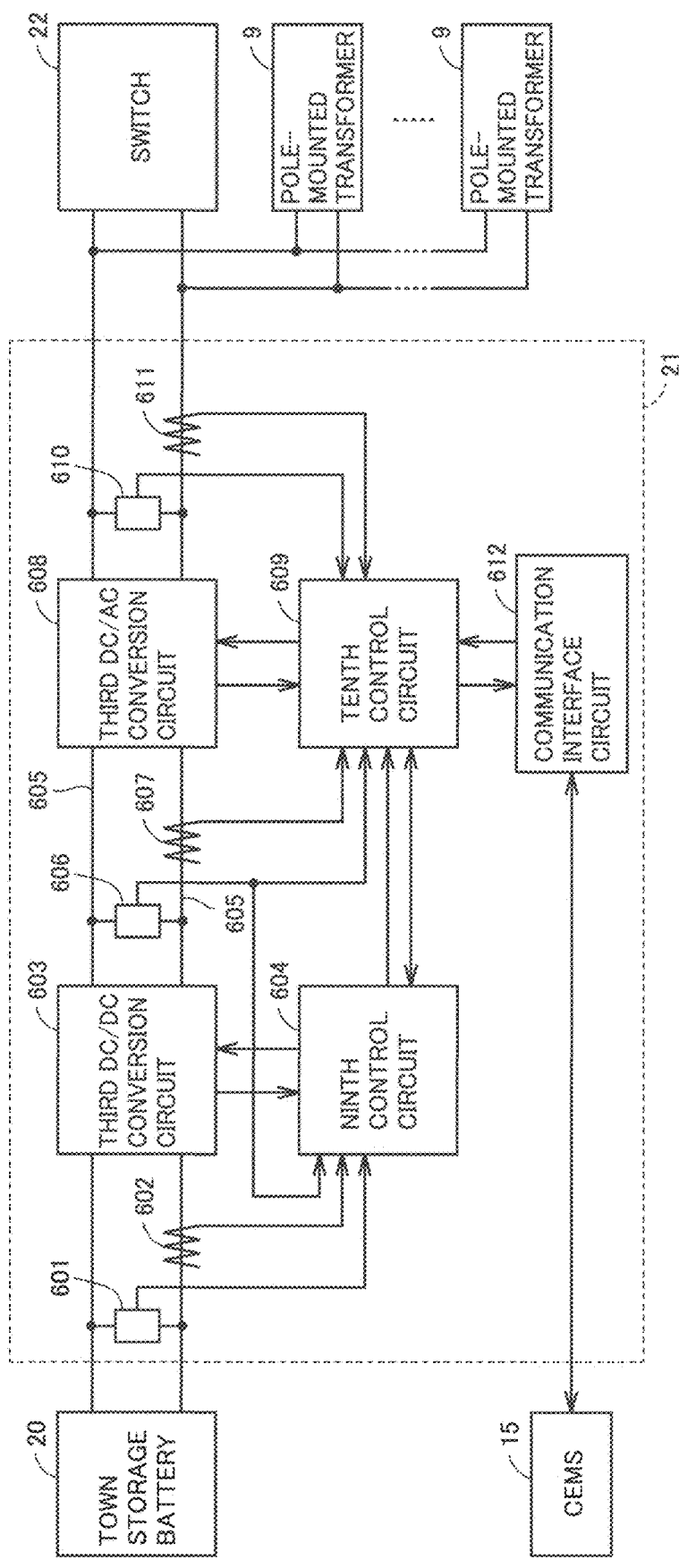
FIG. 14 is a block diagram illustrating a configuration of a town storage battery power conversion device shown in FIG. 1.

FIG. 14 is a block diagram illustrating the configuration of town storage battery power conversion device 21 shown in FIG. 1.

Referring to FIG. 14, town storage battery power conversion device 21 includes a voltmeter 601, an ammeter 602, a third DC/DC conversion circuit 603, a ninth control circuit 604, a DC bus 605, a voltmeter 606, an ammeter 607, a third DC/AC conversion circuit 608, a tenth control circuit 609, a voltmeter 610, an ammeter 611, and a communication interface circuit 612.

Voltmeter 601 measures the voltage (DC) output from town storage battery 20. Ammeter 602 measures the current (DC) output from town storage battery 20. The current value by ammeter 602 is positive during discharging of town storage battery 20 and is negative during charging of town storage battery 20. Third DC/DC conversion circuit 603 converts the fifth DC voltage output from town storage battery 20 into a sixth DC voltage and outputs the converted sixth DC voltage to DC bus 605. Ninth control circuit 604 controls third DC/DC conversion circuit 603. Through DC bus 605, the sixth DC voltage output from third DC/DC conversion circuit 603 is supplied to third DC/AC conversion circuit 608.

Voltmeter 606 measures the voltage on DC bus 605. Ammeter 607 measures the direct current output from third DC/DC conversion circuit 603. Third DC/AC conversion circuit 608 converts the DC power output from third DC/DC conversion circuit 603 into AC power. Tenth control circuit 609 controls third DC/AC conversion circuit 608.

Voltmeter 610 measures the voltage (AC) output from third DC/AC conversion circuit 608. Ammeter 611 measures the current (AC) output from third DC/AC conversion circuit 608. Communication interface circuit 612 establishes communication between town storage battery power conversion device 21 (tenth control circuit 609) and CEMS 15. In addition, third DC/DC conversion circuit 603 and third DC/AC conversion circuit 608 can also be formed in the configuration of a known DC/DC converter and inverter as appropriate.

Figure 15:
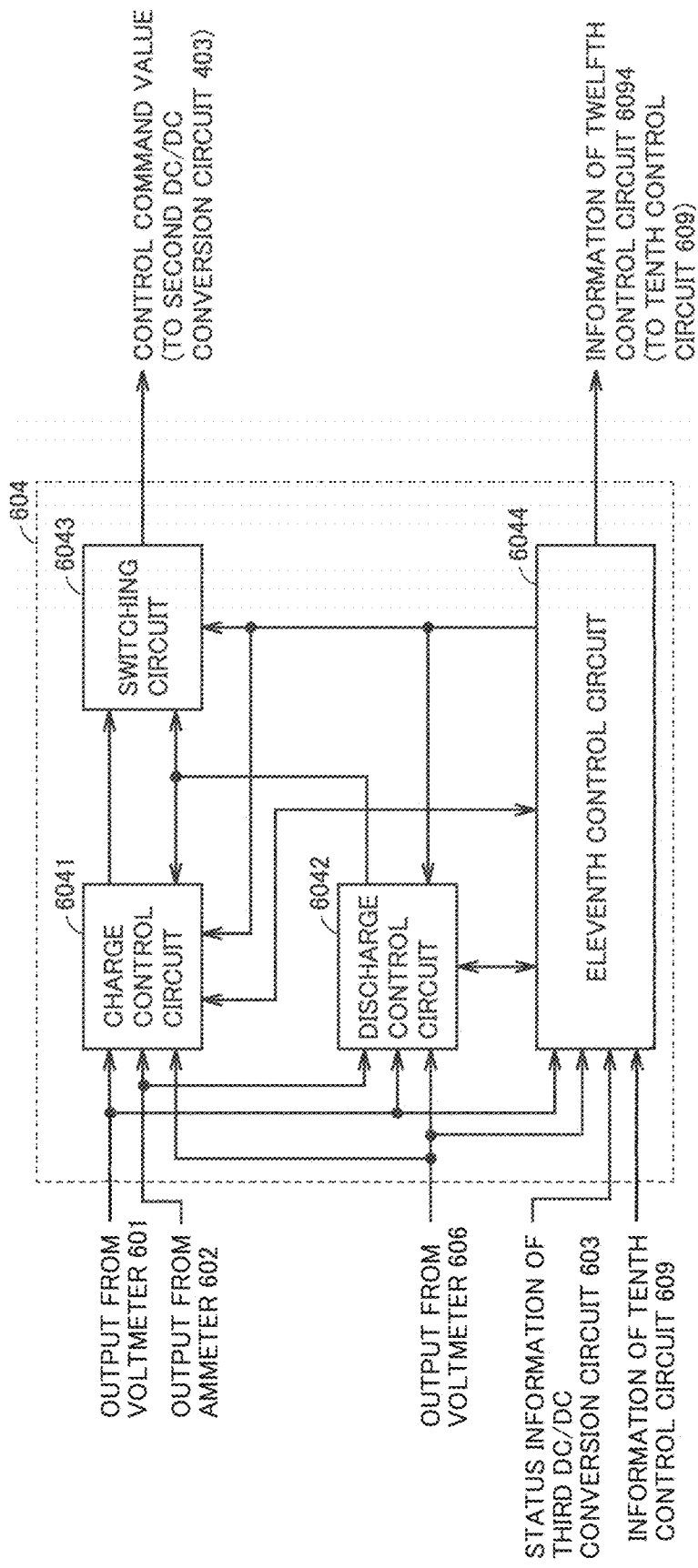
FIG. 15 is a block diagram illustrating a configuration of a ninth control circuit that controls a third DC/DC conversion circuit in the town storage battery power conversion device shown in FIG. 14.

FIG. 15 is a block diagram illustrating the configuration of ninth control circuit 604 (FIG. 14) that controls third DC/DC conversion circuit 603 (FIG. 14) in town storage battery power conversion device 21.

Referring to FIG. 15, ninth control circuit 604 includes a charge control circuit 6041, a discharge control circuit 6042, a switching circuit 6043, and an eleventh control circuit 6044.

Charge control circuit 6041 calculates a command value for third DC/DC conversion circuit 603 that is used for controlling charging of town storage battery 20. Discharge control circuit 6042 calculates a command value for third DC/DC conversion circuit 603 that is used for controlling discharging from town storage battery 20.

Eleventh control circuit 6044 outputs the control parameter, the control target value and the like to charge control circuit 6041 and discharge control circuit 6042, and also manages the charge amount, the charge current, the discharge power amount and the like of town storage battery 20. Eleventh control circuit 6044 further outputs a control signal for switching circuit 6043.

According to the control signal from eleventh control circuit 6044, switching circuit 6043 selectively outputs one of the outputs from charge control circuit 6041 and discharge control circuit 6042 as a control command value for third DC/DC conversion circuit 603. Switching circuit 6043 is controlled to output the control command value generated by charge control circuit 6041 when receiving an instruction to charge town storage battery 20, and controlled to output the control command value generated by discharge control circuit 6042 when receiving an instruction to discharge town storage battery 20.

Figure 16:
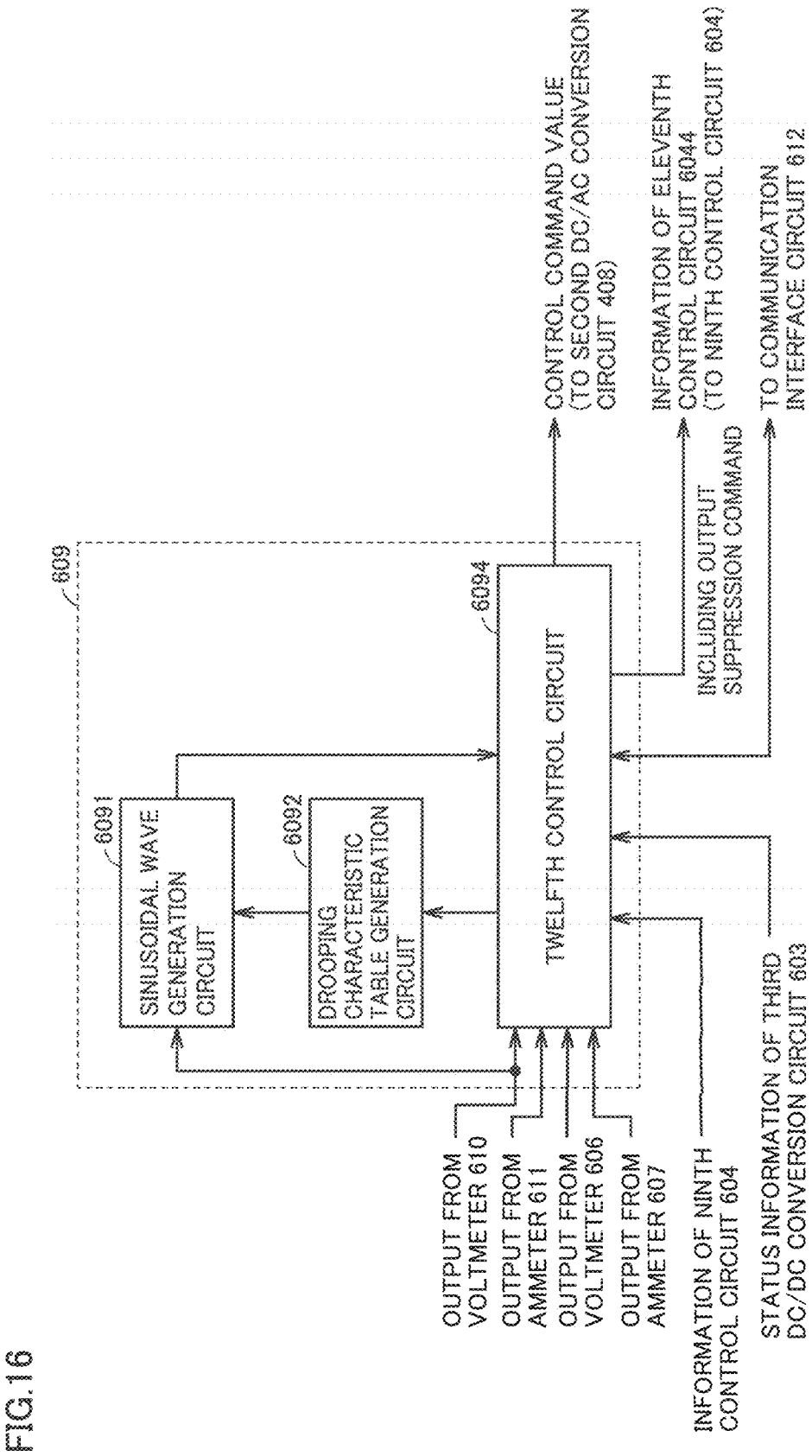
FIG. 16 is a block diagram illustrating a configuration of a tenth control circuit that controls a third DC/AC conversion circuit in the town storage battery power conversion device shown in FIG. 14.

FIG. 16 is a block diagram illustrating the configuration of tenth control circuit 609 (FIG. 14) that controls third DC/AC conversion circuit 608 (FIG. 14) in town storage battery power conversion device 21.

Referring to FIG. 16, tenth control circuit 609 includes a sinusoidal wave generation circuit 6091, a drooping characteristic table generation circuit 6092, and a twelfth control circuit 6094.

Drooping characteristic table generation circuit 6092 develops the drooping characteristic information received through communication interface circuit 612 into table data. Furthermore, according to the developed drooping characteristic table, drooping characteristic table generation circuit 6092 calculates a voltage frequency to be output to distribution system 16, based on the information about the excess/shortage of the electric power in distribution system 16 that is output from twelfth control circuit 6094. The calculated voltage frequency is output to sinusoidal wave generation circuit 6091.

Sinusoidal wave generation circuit 6091 generates a sinusoidal wave as a target value of the AC voltage that is to be output from town storage battery power conversion device 21 to distribution system 16. The sinusoidal wave is generated so as to have a voltage frequency that is transmitted from drooping characteristic table generation circuit 6092. The voltage frequency is set to fall within a range of ±fα (Hz) with respect to a predetermined center frequency fc. For example, fc=60 (Hz) and the voltage frequency is set to be variable within a range of 59.8 to 60.2 (Hz).

Twelfth control circuit 6094 generates information about the excess/shortage of the electric power in distribution system 16 in accordance with comparison between: the actual charge/discharge power of town storage battery 20 based on the detection values of voltmeter 610 and ammeter 611; and the charge/discharge power target value for town storage battery 20. The generated information about the excess/shortage of electric power is transmitted to drooping characteristic table generation circuit 6092. Furthermore, twelfth control circuit 6094 generates a control command value used for controlling third DC/AC conversion circuit 608 in accordance with the sinusoidal wave output from sinusoidal wave generation circuit 6091. For example, third DC/AC conversion circuit 608 is controlled by pulse width modulation (PWM) control at a switching frequency of about 20 kHz so as to output an AC voltage corresponding to the above-mentioned voltage frequency.

(Autonomous Operation during Power Failure)

The following is an explanation about the autonomous operation during a power failure in a smart town shown in FIGS. 1 to 16.

Again referring to FIG. 1, at occurrence of a power failure, CEMS 15 outputs an interruption command to switch 22 to thereby electrically disconnect distribution system 16 from substation 24. When the entire smart town is thereby disconnected from substation 24, an autonomous operation for continuing supply of electric power in the smart town is performed using town storage battery power conversion device 21 as an AC voltage source. In the present embodiment, the autonomous operation is assumed to be performed for the purpose of ensuring the LCP for 72 hours.

In the autonomous operation, in order to implement the LCP for 72 hours, CEMS 15 creates an operation plan basically for the purpose of ensuring the electric power (for example, about 2 [kWh]) for a length of 72 hours supplied to an "essential load" such as a refrigerator 53 and a night lighting device 54. The operation plan includes a plan for trading electric power at a system interconnection point in each consumer house 18, and a plan for charging/discharging of town storage battery 20.

When HEMS 7 detects occurrence of a power failure in each consumer house 18, HEMS 7 instructs load 5 in each house to turn off all of the power supplies. For example, HEMS 7 instructs power switchboard 6 to automatically shut down all of the breakers so as to disconnect consumer premises distribution system 10 from distribution system 14.

When distribution systems 14 and 16 in the entire smart town are separated from substation 24, and each consumer house 18 is disconnected from distribution system 14, CEMS 15 instructs town storage battery power conversion device 21 to operate as a voltage source. Upon reception of the instruction from CEMS 15, town storage battery power conversion device 21 converts the DC power of town storage battery 20 into AC power and thereby starts to operate as an AC voltage source.

The following is an explanation about the reason why each consumer house 18 is disconnected from the distribution system immediately after occurrence of a power failure. Immediately after occurrence of a power failure, switch 22 disconnects the entire smart town from substation 24, and thereafter, town storage battery power conversion device 21 is started as an AC voltage source without disconnecting load 5 in consumer house 18, which results in simultaneous start-up of the loads that are not switched off (for example, loads such as a lighting device and a drier that are powered on if they are not switched off). This may possibly cause an excessively high current to prevent start-up of town storage battery power conversion device 21. Thus, in the present embodiment, after load 5, solar cell power conversion device 2 and storage battery power conversion device 4 in consumer house 18 are disconnected from distribution system 14, town storage battery power conversion device 21 is started as an AC voltage source.

After the autonomous operation is started by start-up of town storage battery power conversion device 21, HEMS 7 checks with a user to see whether each load 5 is switched off or not at a point of time when the AC voltage in distribution system 14 in each consumer house 18 is stabilized, and thereafter, permits the breaker to be turned on so as to supply electric power to an essential load. In this case, the information can be transmitted to and received from the user through the operation by the user's input into a user interface circuit (not shown) of HEMS 7. Thereby, in each consumer house 18, the operation of an essential load can be ensured in the autonomous operation by the manual operation to turn on a breaker and the manual operation to again turn on a power supply of an essential load.

When supply of electric power to an essential load is started, HEMS 7 collects the status information about solar cell 1 and storage battery 3 to the possible extent, and notifies CEMS 15 about the collection result. After completion of this notification, HEMS 7 automatically brings, into a connected state, the breaker to which solar cell power conversion device 2 and storage battery power conversion device 4 are connected. After supply of electric power to an essential load is started, solar cell power conversion device 2 and storage battery power conversion device 4 in consumer house 18 are started using the AC voltage output from town storage battery power conversion device 21.

HEMS 7 controls solar cell power conversion device 2 and storage battery power conversion device 4 based on the trading power target value at the system interconnection point (consumer premises distribution system 10) that is transmitted from CEMS 15. In the autonomous operation, the trading power target value at the system interconnection point (consumer premises distribution system 10) in each consumer house 18 is set according to the plan for trading electric power at the system interconnection point in each consumer house 18 that constitutes the above-mentioned operation plan, and transmitted from CEMS 15 to HEMS 7 separately for each consumer house 18.

Figure 17:
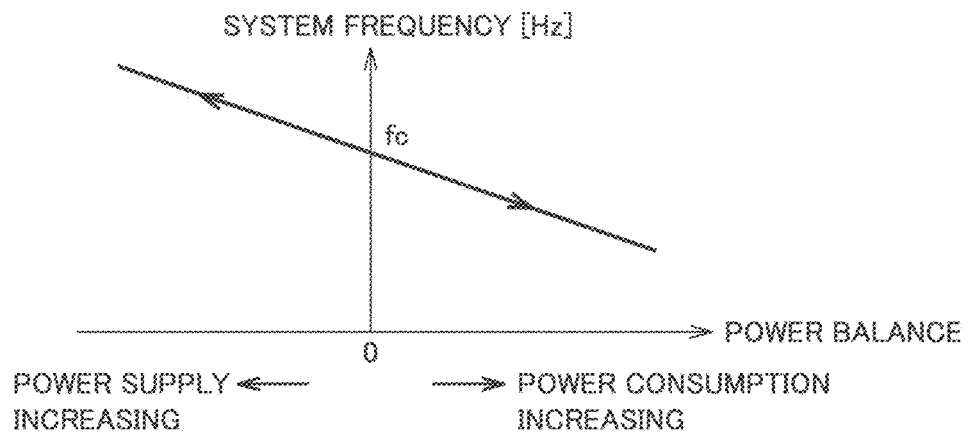
FIG. 17 is a conceptual diagram illustrating the operation principle of balancing control utilizing a drooping characteristic in the power management system according to the present embodiment.

In the power management system according to the present embodiment, in the autonomous operation, power balancing control using the drooping characteristic shown in FIG. 17 is performed by solar cell power conversion device 2, storage battery power conversion device 4, and town storage battery power conversion device 21. In the autonomous operation, as described above, town storage battery power conversion device 21 is controlled to operate as an AC voltage source while solar cell power conversion device 2 and storage battery power conversion device 4 in each consumer house 18 are controlled to operate as AC current sources in the same manner as in the interconnection operation (in the normal operation). In the above-mentioned role-sharing situation, town storage battery power conversion device 21 operating as an AC voltage source can detect an excess or a shortage of the electric power (power amount) in the entire smart town operating as an autonomous system, based on the electric power output from town storage battery 20 to distribution system 14.

On the other hand, second control circuit 209 in solar cell power conversion device 2 inside consumer house 18 that operates as an AC current source converts the electric power, which is generated by solar cell 1 and supplied from first DC/DC conversion circuit 203, into an AC current, and then, supplies the converted AC current to consumer premises distribution system 10. In this case, second control circuit 209 can detect the power generation amount of solar cell 1 using the voltage on DC bus 205. Similarly, fourth control circuit 409 in storage battery power conversion device 4 can detect the charge/discharge power of storage battery 3 using the voltage on DC bus 405. On the other hand, second control circuit 209 and fourth control circuit 409 cannot directly detect the excess/shortage of the electric power in the distribution system in a smart town directly from the AC voltage in consumer premises distribution system 10.

Accordingly, in the present embodiment, the distributed power supply installed in each consumer house 18 is notified, using a drooping characteristic, about the excess/shortage of the electric power detected by town storage battery power conversion device 21. In the following, power balancing control utilizing a drooping characteristic will be described.

FIG. 17 is a conceptual diagram illustrating the operation principle of balancing control utilizing a drooping characteristic in the power management system according to the present embodiment.

Referring to FIG. 17, the horizontal axis shows the power balance in the entire smart town while the vertical axis shows the system frequency during an autonomous operation.

The state where power balance is "0" corresponds to the state where the total supplied electric power and the total consumed electric power in the entire smart town are equal. The total supplied electric power in a smart town is equivalent to the total sum of: the discharge power of town storage battery 20; the total value of the electric power generated by solar cells 1 in respective consumer houses 18; and the total value of the discharge power (during discharging) of storage batteries 3 in respective consumer houses 18. On the other hand, in the autonomous operation, town storage battery 20 is normally operated only for discharging. Thus, the total consumed electric power in a smart town is equivalent to the total value of the electric power consumed by loads 5 in respective consumer houses 18.

As shown in FIG. 17, when the total consumed electric power is greater than the total supplied electric power (power balance is positive), the system frequency is gradually decreased from predetermined center frequency fc (for example, 60 Hz) as the consumed electric power increases. The AC voltage frequency output to distribution system 16 can be decreased from fc, for example, by town storage battery power conversion device 21 that converts the discharge power of town storage battery 20 into AC power. The AC voltage frequency of distribution system 16 is transmitted by pole-mounted transformer 9 also to distribution system 14 (on the pole-mounted transformer's secondary side) and consumer premises distribution system 10 in each consumer house 18.

As described with reference to FIGS. 11 and 13, the AC voltage frequency in consumer premises distribution system 10 can be detected by solar cell power conversion device 2 (sixth control circuit 2094) and storage battery power conversion device 4 (eighth control circuit 4094), that is, on the distributed power supply side in each consumer house 18. Thus, when a decrease in system frequency is detected in a distributed power supply in each consumer house 18, the control target value (distributed power supply) is modified to increase the electric power output from the distributed power supply in order to maintain the power balance. In other words, the electric power generated by solar cell 1 is increased and/or the discharge power of storage battery 3 is increased (or charging is switched to discharging).

In contrast, when the total supplied electric power is greater than the total consumed electric power (power balance is negative), the system frequency is gradually increased from center frequency fc as the supplied electric power increases. When an increase in system frequency is detected in the distributed power supply in each consumer house 18, the control target value (distributed power supply) is modified to decrease the electric power output from the distributed power supply in order to return the power balance to "0". In other words, the electric power generated by solar cell 1 is suppressed and/or the discharge power of storage battery 3 is decreased (or discharging is switched to charging).

Thus, in the power management system according to the present embodiment, in the autonomous operation, the information related to the power balance in a smart town is shared through the frequencies of the AC voltages in distribution systems 10, 14, and 16 (i.e., system frequencies), thereby performing power balancing control for balancing the total supplied electric power and the total consumed electric power in a smart town.

In the following, the control operation in the autonomous operation will be described. First, the operation of solar cell power conversion device 2 will be described again with reference to FIGS. 9 to 11.

In the present embodiment, solar cell power conversion device 2 is started when the DC voltage output from solar cell 1 becomes equal to or greater than a predetermined reference value. At start-up of solar cell power conversion device 2, fifth control circuit 2044 (FIG. 10) in first control circuit 204 instructs MPPT control circuit 2041 (FIG. 10) to start MPPT control so as to maximize the electric power output from solar cell 1. Furthermore, fifth control circuit 2044 outputs a control signal to switching circuit 2043 to select the control command value from MPPT control circuit 2041.

On the other hand, sixth control circuit 2094 (FIG. 11) in second control circuit 209 calculates the amplitude (the current command value) of the AC current output from DC/AC conversion circuit 208 such that the DC voltage on DC bus 205 detected by voltmeter 206 becomes constant. A specific method of generating a current command value will be described below.

As described above, in the power management system according to the present embodiment, in the autonomous operation during a power failure, town storage battery power conversion device 21 operates as an AC voltage source of the AC distribution system in a smart town while the distributed power supply installed in consumer house 18 operates as a current source based on the AC voltage at a system interconnection point (consumer premises distribution system 10) in each consumer house 18.

In this case, since town storage battery power conversion device 21 manages the AC voltage in distribution system 16, this town storage battery power conversion device 21 can detect an excess/shortage of the electric power in the entire smart town based on the excess/shortage of the electric power in distribution system 16. On the other hand, since the distributed power supply operating as a current source in consumer house 18 operates in such a manner as to control the electric power output to consumer premises distribution system 10 in accordance with a target value, it cannot directly detect an excess or a shortage of the electric power in consumer premises distribution system 10.

As described above, when town storage battery power conversion device 21 detects an excess or a shortage of electric power, it first controls the charge/discharge power from town storage battery 20 to thereby ensure the power balance in a smart town. Furthermore, when electric power is in shortage, the system frequency, i.e., the output frequency from town storage battery power conversion device 21 to distribution system 16, is decreased in accordance with the drooping characteristic that is described with reference to FIG. 17. In contrast, when electric power is excessive, the frequency of the AC system voltage, i.e., the output frequency of town storage battery power conversion device 21, is raised in accordance with the drooping characteristic. In fact, the output frequency of town storage battery power conversion device 21 is set in accordance with the drooping characteristic of which CEMS 15 notifies.

The distributed power supply installed in consumer house 18 detects the frequency of the AC voltage at a system interconnection point (consumer premises distribution system 10), and based on the drooping characteristic of which CEMS 15 notifies, determines whether the power supply amount in the entire smart town is excessive or is in shortage. The operation plan (including a drooping characteristic) from CEMS 15 is received by HEMS 7, and thereafter, this HEMS 7 notifies second control circuit 209 about this operation plan through communication interface circuit 212. The details of the method of generating a drooping characteristic will be described later in detail.

Referring back to FIGS. 9 and 11, the description of the operation of solar cell power conversion device 2 will be continued. Phase detection circuit 2091 (FIG. 11) in second control circuit 209 (FIG. 9) detects a zero cross point of the AC voltage output from voltmeter 210. The zero cross point information detected by phase detection circuit 2091 (FIG. 11) is input into frequency detection circuit 2092 and sixth control circuit 2094 that are shown in FIG. 11.

Frequency detection circuit 2092 measures the cycle of the received zero cross point detection information to thereby calculate the AC voltage frequency in consumer premises distribution system 10, i.e., the system frequency. The frequency information calculated by frequency detection circuit 2092 is output to drooping characteristic table generation circuit 2093 and sixth control circuit 2094. Upon reception of the system frequency, drooping characteristic table generation circuit 2093 calculates the differential power used for modifying the trading power target value from solar cell power conversion device 2 to consumer premises distribution system 10 in accordance with the drooping characteristic of which CEMS 15 notifies, and then, outputs the calculated differential power to sixth control circuit 2094. Sixth control circuit 2094 calculates a trading power target value for solar cell power conversion device 2 based on the above-mentioned differential power and the trading power target value that is based on the notification from CEMS 15.

Figure 18:
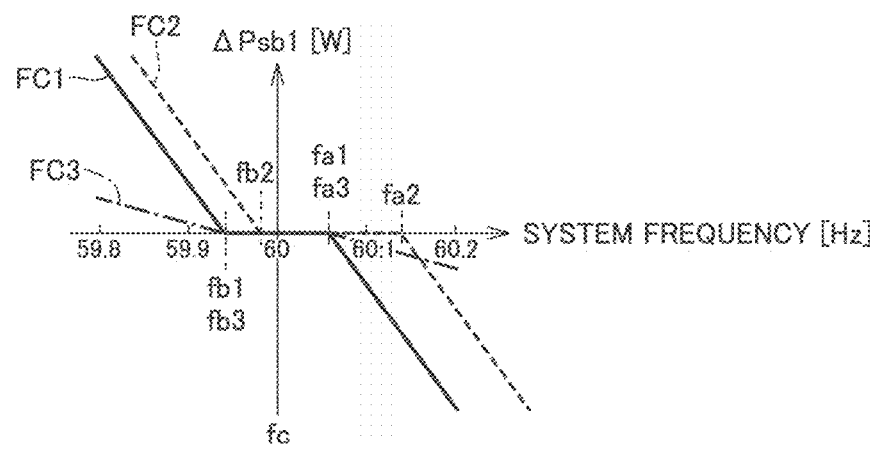
FIG. 18 is a conceptual diagram for illustrating the drooping characteristic for calculating differential power in the solar cell power conversion device.

FIG. 18 is a conceptual diagram for illustrating the drooping characteristic for calculating differential power in solar cell power conversion device 2.

Referring to FIG. 18, the drooping information for solar cell power conversion device 2 based on the notification from CEMS 15 is set to obtain a drooping characteristic table for defining drooping characteristic lines FC1 to FC3 in the figure for calculating differential power $\Delta Psb1$ with respect to the system frequency. In the same manner as with the trading power target value, a positive value of differential power $\Delta Psb1$ shows the power selling direction in which electric power is output from a distributed power supply to consumer premises distribution system 10. A negative value of differential power $\Delta Psb1$ shows the power buying direction opposite to the power selling direction.

In this case, drooping characteristic lines FC1 to FC3 represent that the drooping characteristic can be variably set in accordance with the status of the power management system (for example, the SOC of town storage battery 20). In the following description, drooping characteristic lines FC1 to FC3 will also be collectively referred to as a drooping characteristic line FC.

According to drooping characteristic line FC, when the system frequency is between a break frequency fa on the high frequency side and a break frequency fb on the low frequency side, the result shows that $\Delta Psb1=0$. In a region where the system frequency is higher than fa, $\Delta Psb1$ is decreased at an inclination ka in proportion to the frequency ($\Delta Psb1<0$). In a region where the system frequency is lower than fb, $\Delta Psb1$ is increased at an inclination kb in proportion to the frequency ($\Delta Psb1>0$).

As drooping characteristic information, four pieces of data including break frequencies fa, fb and inclinations ka, kb are transmitted, and thereby, a drooping characteristic table can be created in drooping characteristic table generation circuit 2093 (FIG. 11) in second control circuit 209 (FIG. 9). As these four pieces of data are transmitted as drooping characteristic information from CEMS 15 to HEMS 7, communication traffic can be reduced.

When fa1, fb1, ka1, and kb1 are transmitted as drooping characteristic information from CEMS 15, a drooping characteristic table that defines drooping characteristic line FC1 for solar cell power conversion device 2 is created by drooping characteristic table generation circuit 2093 (FIG. 11) in second control circuit 209 (FIG. 9). Similarly, when fa2, fb2, ka2, and kb2 are transmitted as drooping characteristic information, a drooping characteristic table that defines drooping characteristic line FC2 is created. Also, when fa3, fb3, ka3, and kb3 are transmitted as drooping characteristic information, a drooping characteristic table that defines drooping characteristic line FC3 is created.

Referring to FIG. 11, drooping characteristic table generation circuit 2093 outputs, as differential power information, differential power $\Delta Psb1$ calculated in accordance with the drooping characteristic in FIG. 18. Upon reception of the differential power information from drooping characteristic table generation circuit 2093 and the system frequency information from frequency detection circuit 2092, sixth control circuit 2094 uses the differential power information output from drooping characteristic table generation circuit 2093 to modify the trading power target value at the system interconnection point (consumer premises distribution system 10) in consumer house 18 based on the notification from CEMS 15, to thereby calculate a final trading power target value (hereinafter also referred to as a PV control target value) for solar cell power conversion device 2.

In the power management system according to the present embodiment, HEMS 7 processes the trading power target value, of which CEMS 15 notifies, at the system interconnection point in consumer house 18, to thereby generate a trading power target value for solar cell power conversion device 2 and a trading power target value for storage battery power conversion device 4. For example, the trading power target value for solar cell power conversion device 2 is set so as to preferentially use the electric power generated by solar cell 1. Also, the trading power target value for storage battery power conversion device 4 is set so as to satisfy the trading power target value (set by CEMS 15) at the system interconnection point (consumer premises distribution system 10) in consumer house 18.

Furthermore, differential power $\Delta Psb1$ corresponding to the detection value of the system frequency in accordance with the drooping characteristic is added to the trading power target value for solar cell power conversion device 2, to thereby set the PV control target value for solar cell power conversion device 2. As will be described later, also for storage battery power conversion device 4, a final trading power target value (PV control target value) is set by modifying the trading power target value set by HEMS 7 based on the differential power that follows the drooping characteristic.

Then, sixth control circuit 2094 (FIG. 11) notifies fifth control circuit 2044 in first control circuit 204 (FIG. 10) about this PV control target value in which differential power ΔPsb1 is reflected. Furthermore, in the power management system according to the present embodiment, the trading electric power at the system interconnection point (consumer premises distribution system 10) in consumer house 18 that is measured by power measurement circuit 61 (FIG. 2) in power switchboard 6 is output onto signal line 12. Then, through sixth control circuit 2094 (FIG. 11), fifth control circuit 2044 (FIG. 10) can be notified of this trading electric power.

Fifth control circuit 2044 subtracts the measured trading electric power at the system interconnection point (consumer premises distribution system 10) from the received PV control target value. When the subtraction result shows that electric power is excessively supplied to consumer premises distribution system 10, the electric power generated by solar cell 1 is suppressed.

Specifically, when the output from MPPT control circuit 2041 is selected (hereinafter referred to as an "MPPT control mode"), the control mode of solar cell 1 is shifted to a voltage control mode. While shifting to a voltage control mode, fifth control circuit 2044 reads: the command value supplied from MPPT control circuit 2041 to the present first DC/DC conversion circuit 203; and the integral value information and the like of a proportional integral (PI) controller (not shown), and thereafter, outputs a stop instruction to MPPT control circuit 2041. The MPPT control mode corresponds to one example of the "first control mode of the energy creation device".

On the other hand, for voltage control circuit 2042, fifth control circuit 2044 sets the control command value read from MPPT control circuit 2041 and the information obtained by processing the above-mentioned integral value information and the like, as initial values, in a PI controller (not shown) in voltage control circuit 2042, and then, outputs an instruction to start the voltage control.

In the voltage control mode, fifth control circuit 2044 controls the voltage output from solar cell 1 (the detection value of voltmeter 201) such that the PV control target value (the trading power target value) received from sixth control circuit 2094 becomes equal to the electric power generated by solar cell 1. In the voltage control mode, fifth control circuit 2044 generates a control signal of switching circuit 2043 so as to output the control command value from voltage control circuit 2042. Thus, by control of the output voltage from solar cell 1, the electric power generated by solar cell 1 is controlled in accordance with the PV control target value. The voltage control mode corresponds to one example of the "second control mode of the energy creation device".

In contrast, when the electric power supplied to consumer premises distribution system 10 is in shortage based on the result of subtraction of the measured trading electric power from the received PV control target value, the electric power generated by solar cell 1 is controlled to be increased. Specifically, when the MPPT control mode is selected, the MPPT control mode is maintained in order to maintain power generation with maximum power. On the other hand, when the voltage control mode is selected, the output voltage from solar cell 1 is controlled so as to increase the electric power generated by solar cell 1. Furthermore, when the output voltage from solar cell 1 becomes equal to or less than a reference value, fifth control circuit 2044 switches the control mode of solar cell 1 from the voltage control mode to the MPPT control mode.

While shifting to the MPPT control mode, fifth control circuit 2044 reads the present control command value from voltage control circuit 2042 and the integral value information and the like of the PI controller (not shown) circuit, and thereafter, outputs a stop instruction to voltage control circuit 2042.

On the other hand, for MPPT control circuit 2041, fifth control circuit 2044 sets the present control command value read from MPPT control circuit 2041 and the information obtained by processing the above-mentioned integral value information and the like, as initial values, in the PI controller (not shown) in MPPT control circuit 2041, and then, outputs an instruction to start MPPT control. In the MPPT control mode, the output voltage from solar cell 1 is adjusted so as to maximize the electric power generated by solar cell 1.

MPPT control circuit 2041 generates a control command value for first DC/DC conversion circuit 203 so as to maximize the electric power generated by solar cell 1. Furthermore, in the MPPT control mode, fifth control circuit 2044 generates a control signal for switching circuit 2043 so as to output the control command value from MPPT control circuit 2041.

In each of the MPPT control mode and the voltage control mode, the output from first DC/DC conversion circuit 203 is converted into AC power by first DC/AC conversion circuit 208 and supplied to consumer premises distribution system 10.

Then, the operation of storage battery power conversion device 4 will be described again with reference to FIGS. 9, 12, 13, and 19.

In the present embodiment, HEMS 7 instructs start-up of storage battery power conversion device 4. When storage battery 3 is not used, storage battery power conversion device 4 is configured to wait in a sleep mode (the operation mode requiring about several minutes for start-up time but consuming electric power of about several tens of μw). As in solar cell power conversion device 2, after HEMS 7 receives the operation plan (including a drooping characteristic) from CEMS 15, this HEMS 7 notifies fourth control circuit 409 about the received operation plan through communication interface circuit 412. The drooping characteristic information of which CEMS 15 notifies can be set in the same format as that of the drooping characteristic information of which solar cell power conversion device 2 is notified, as described with reference to FIG. 18.

Figure 19:
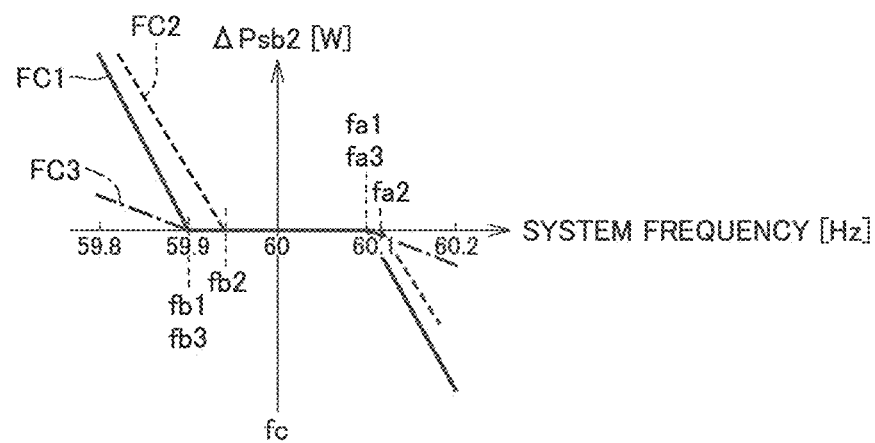
FIG. 19 is a conceptual diagram for illustrating the drooping characteristic for calculating the differential power in the storage battery power conversion device.

FIG. 19 is a conceptual diagram for illustrating the drooping characteristic for calculating the differential power in storage battery power conversion device 4.

Referring to FIG. 19, a drooping characteristic table is developed according to the drooping characteristic information from CEMS 15, so as to define drooping characteristic lines FC1 to FC3 in the figure for calculating differential power ΔPsb2 with respect to the system frequency in storage battery power conversion device 4. In the same manner as with differential power ΔPsb1, a positive value of differential power ΔPsb2 shows the power selling direction in which electric power is output from a distributed power supply to consumer premises distribution system 10. A negative value of differential power ΔPsb2 shows the power buying direction opposite to the power selling direction.

Since the details of the drooping characteristic information and creation of the drooping characteristic table by drooping characteristic table generation circuit 4093 (FIG. 13) are the same as those in the case of the drooping characteristic for solar cell power conversion device 2 described with reference to FIG. 18, the description thereof will not be repeated.

As a result, also for storage battery power conversion device 4, drooping characteristic line FC similar to that in FIG. 18 can be set. Drooping characteristic line FC is set, for example, in accordance with the above-mentioned break frequencies fa, fb, and inclinations ka, kb that are transmitted as drooping characteristic information. As in FIG. 17, the drooping characteristic can be set variably in accordance with the status of the power management system (for example, the SOC of town storage battery 20). In other words, three types of drooping characteristic lines FC1 to FC3 can be created in accordance with the drooping characteristic information.

In particular, as to the drooping characteristic of storage battery power conversion device 4, it is preferable to change break frequencies fa and fb in accordance with the SOC of storage battery 3 in each consumer house 18.

Specifically, for storage battery 3 with low SOC, it is preferable to create a drooping characteristic such that differential power $\Delta Psb2$ ($\Delta Psb2<0$) for increasing charge power is generated with a smaller amount of frequency change from the center frequency ($|fc-fa|$) than that in the case of storage battery 3 with high SOC. In the example in FIG. 19, for storage battery 3 with low SOC, break frequency fa can be set lower (closer to center frequency fc) than that in the case of storage battery 3 with high SOC.

In contrast, for storage battery 3 with high SOC, it is preferable to create a drooping characteristic such that differential power $\Delta Psb2$ ($\Delta Psb2>0$) for increasing the discharge power is generated with a smaller amount of frequency change from center frequency fc ($|fc-fb|$) than that in the case of storage battery 3 with low SOC. In the example in FIG. 19, for storage battery 3 with high SOC, break frequency fb can be set higher (closer to center frequency fc) than that in the case of storage battery 3 with low SOC. In this way, storage battery 3 in each consumer house 18 can be appropriately charged and discharged (so as to avoid overcharge and overdischarge) such that storage battery 3 with low SOC is preferentially charged and such that storage battery 3 with high SOC is preferentially discharged.

In addition, the drooping characteristic information about solar cell power conversion device 2 and the drooping information about storage battery power conversion device 4 are set separately. In other words, as two sets (for example, four pieces/one set) of drooping characteristic information are set in HEMS 7 from CEMS 15, the drooping characteristic for calculating differential power $\Delta Psb1$ in solar cell power conversion device 2 (FIG. 18) and the drooping characteristic for calculating differential power $\Delta Psb2$ in storage battery power conversion device 4 (FIG. 19) are separately created.

Again referring to FIG. 13, phase detection circuit 4091 in fourth control circuit 409 detects a zero cross point of the AC system voltage output from voltmeter 410. The zero cross point detected by phase detection circuit 4091 is input into frequency detection circuit 4092 and eighth control circuit 4094.

Frequency detection circuit 4092 measures the cycle of the input zero cross point detection information to thereby calculate the AC voltage frequency in consumer premises distribution system 10, i.e., the system frequency. The frequency information detected by frequency detection circuit 4092 is input into drooping characteristic table generation circuit 4093 and eighth control circuit 4094. Upon reception of the frequency of the AC system voltage, according to the drooping characteristic shown in FIG. 19, drooping characteristic table generation circuit 4093 calculates differential power $\Delta Psb2$ for modifying the trading power target value from storage battery power conversion device 4 to consumer premises distribution system 10, and then, outputs the calculated differential power $\Delta Psb2$ to eighth control circuit 4094.

Drooping characteristic table generation circuit 4093 outputs differential power $\Delta Psb2$ as differential power information. Upon reception of the differential power information from drooping characteristic table generation circuit 4093 and the system frequency information from frequency detection circuit 4092, eighth control circuit 4094 uses the differential power information output from drooping characteristic table generation circuit 4093 to modify the trading power target value at the system interconnection point (consumer premises distribution system 10) in consumer house 18 that is based on the notification from CEMS 15, thereby calculating a final trading power target value for storage battery power conversion device 4 (hereinafter also referred to as a BAT control target value).

Eighth control circuit 4094 adds differential power $\Delta Psb2$ corresponding to the detection value of the system frequency to the trading power target value for storage battery power conversion device 4 that is generated by HEMS 7 based on the trading power target value at the system interconnection point in consumer house 18, of which CEMS 15 notifies. Thereby, eighth control circuit 4094 sets the BAT control target value for storage battery power conversion device 4. As described above, in HEMS 7, the trading power target value for storage battery power conversion device 4 is set in consideration that electric power generated by solar cell 1 is preferentially used.

Eighth control circuit 4094 (FIG. 13) notifies seventh control circuit 4044 (FIG. 12) in third control circuit 404 about the BAT control target value in which differential power $\Delta Psb2$ is reflected. Furthermore, as in the case of solar cell power conversion device 2, through signal line 12 and eighth control circuit 4094 (FIG. 13), seventh control circuit 4044 (FIG. 12) is notified about the trading electric power at the system interconnection point (consumer premises distribution system 10) in consumer house 18 that is measured by power measurement circuit 61 (FIG. 2) in power switchboard 6.

Seventh control circuit 4044 subtracts the measured trading electric power at the system interconnection point (consumer premises distribution system 10) from the BAT control target value of which this seventh control circuit 4044 is notified. When the subtraction result shows that electric power is excessively supplied to consumer premises distribution system 10, excessive electric power is supplied to storage battery 3 for charging.

Specifically, when the output from charge control circuit 4041 is selected (hereinafter referred to as a "charge mode"), seventh control circuit 4044 increases the target charge power by charge control circuit 4041. On the other hand, when the output from discharge control circuit 4042 is selected (hereinafter also referred to as a "discharge mode"), seventh control circuit 4044 decreases the target discharge power by discharge control circuit 4042.

In the discharge mode, in the case where electric power is excessively supplied to consumer premises distribution system 10 even when the target discharge power is set at "0", seventh control circuit 4044 switches the control mode of storage battery 3 from the discharge mode to the charge mode. Specifically, seventh control circuit 4044 outputs an instruction to stop discharge control circuit 4042 and outputs an instruction to start charge control circuit 4041. In the charge mode, a control signal for switching circuit 4043 is generated such that the output from charge control circuit 4041 is selected.

When the control mode is switched between the charge mode and the discharge mode, the command value and the integral value information about a PI controller (not shown) are initialized to "0". Thus, there is no inheritance of the initial value between the charge mode and the discharge mode, unlike in the case of switching the control mode in solar cell power conversion device 2.

In contrast, when the supply power to consumer premises distribution system 10 is in shortage based on the result of subtraction of the measured trading electric power from the received BAT control target value, the discharge power from storage battery 3 is increased.

Specifically, when the discharge mode is selected, seventh control circuit 4044 increases the target discharge power in discharge control circuit 4042. On the other hand, when the charge mode is selected, the target charge power for charge control circuit 4041 is decreased. In the case where the supply power to consumer premises distribution system 10 is in shortage even when the target charge power is set at "0" in the charge mode, the control mode of storage battery 3 is switched from the charge mode to the discharge mode. Specifically, seventh control circuit 4044 outputs an instruction to stop charge control circuit 4041 and outputs an instruction to start discharge control circuit 4042. Furthermore, a control signal for switching circuit 4043 is generated so as to select the output from discharge control circuit 4042.

Then, again referring to FIGS. 14 to 16, the operation of town storage battery power conversion device 21 will be described.

As described above, in the autonomous operation during a power failure, town storage battery power conversion device 21 operates as an AC voltage source to support the distribution system in a smart town. After occurrence of a power failure, town storage battery power conversion device 21 started as an AC voltage source in the above-mentioned procedure controls town storage battery 20 to be charged and discharged based on the operation plan of which CEMS 15 notifies.

Specifically, in the autonomous operation, based on the voltage on DC bus 605 that is output from voltmeter 606, eleventh control circuit 6044 in ninth control circuit 604 (FIG. 15) determines whether the electric power in a smart town is excessive or is in shortage.

For example, in the case where town storage battery 20 operates in the charge mode, it is determined that the electric power supplied in the smart town is excessive when the voltage on DC bus 605 is higher than a target voltage. In this case, charge control circuit 6041 generates a control command value for third DC/DC conversion circuit 603 (FIG. 14) so as to increase the charge power. On the other hand, when town storage battery 20 operates in the discharge mode, discharge control circuit 6042 generates a control command value for third DC/DC conversion circuit 603 (FIG. 14) so as to decrease the discharge power of town storage battery 20.

Furthermore, in the case where the voltage on DC bus 605 is higher than the target voltage even when the discharge power is decreased to "0" in the discharge mode, eleventh control circuit 6044 switches the control mode of town storage battery 20 from the discharge mode to the charge mode. In this case, eleventh control circuit 6044 outputs a stop instruction to discharge control circuit 6042 and outputs a start instruction to charge control circuit 6041. Furthermore, a control signal for switching circuit 6043 is generated so as to select the output from charge control circuit 6041.

As in the case of control of storage battery power conversion device 4, there is no inheritance of the initial value for switching between the charge mode and the discharge mode, unlike in the case of switching the control mode in solar cell power conversion device 2.

In contrast, when the voltage on DC bus 605 is lower than the above-mentioned target voltage, it is determined that the electric power supplied in the smart town is in shortage. In this case, when town storage battery 20 operates in the discharge mode, eleventh control circuit 6044 (FIG. 15) in ninth control circuit 604 causes discharge control circuit 6042 to generate a control command value for third DC/DC conversion circuit 603 (FIG. 14) so as to increase the discharge power of town storage battery 20. On the other hand, when town storage battery 20 operates in the charge mode, charge control circuit 6041 generates a control command value for third DC/DC conversion circuit 603 (FIG. 14) so as to decrease the charge power amount of town storage battery 20.

Furthermore, in the case where the voltage on DC bus 605 is lower than the target voltage even when the charge power is decreased to "0" in the charge mode, eleventh control circuit 6044 switches the control mode of town storage battery 20 from the charge mode to the discharge mode. In this case, eleventh control circuit 6044 outputs a stop instruction to charge control circuit 6041 and outputs a start instruction to discharge control circuit 6042. Furthermore, a control signal for switching circuit 6043 is generated so as to select the output from discharge control circuit 6042. Thus, the electric power supplied from town storage battery 20 to a smart town is controlled by ninth control circuit 604.

Then, the operation of tenth control circuit 609 (FIG. 14) will be described.

Tenth control circuit 609 subtracts the charge/discharge power target value (operation plan), of which CEMS 15 notifies, from the charge/discharge power of town storage battery 20 output from third DC/DC conversion circuit 603 (a positive value shows discharging while charging shows a negative value) to thereby calculate a difference from the operation plan of which CEMS 15 notifies. For example, the charge/discharge power of town storage battery 20 can be calculate by multiplying the voltage on DC bus 605 detected by voltmeter 606 and the current on DC bus 605 detected by ammeter 607. The above-mentioned subtraction result showing a positive value means that the discharge power of town storage battery 20 is greater than that of the operation plan or the charge power of town storage battery 20 is less than that of the operation plan (hereinafter also referred to as a discharge-side operation, or simply referred to as a discharge side). In contrast, the subtraction result showing a negative value means that the charge power of town storage battery 20 is greater than that of the operation plan or the discharge power of town storage battery 20 is less than that of the operation plan (hereinafter also referred to as a charge-side operation, or simply referred to as a charge side).

The following is an explanation about the control of third DC/AC conversion circuit 608 that reflects the difference between the actual charge/discharge of town storage battery 20 and the operation plan of which CEMS 15 notifies.

Upon reception of the drooping characteristic information about town storage battery power conversion device 21 from CEMS 15 through communication interface circuit 612 (FIG. 14), twelfth control circuit 6094 (FIG. 16) outputs the drooping characteristic information to drooping characteristic table generation circuit 6092.

Figure 20:
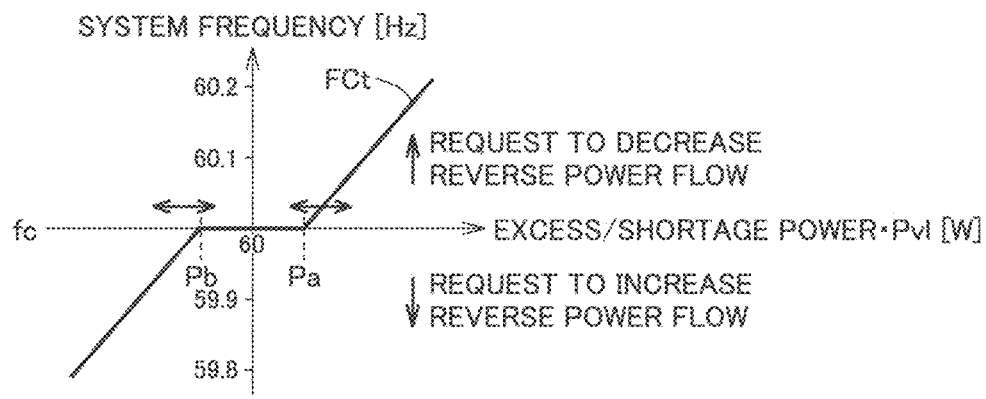
FIG. 20 is a conceptual diagram for illustrating the drooping characteristic for setting an output frequency of the town storage battery power conversion device.

FIG. 20 shows a conceptual diagram for illustrating the drooping characteristic of town storage battery power conversion device 21.

Referring to FIG. 20, the horizontal axis shows excess/shortage power Pvl for quantitatively showing the excess/shortage amount of the electric power supplied from the consumer side in a system town. Excess/shortage power Pvl is calculated from the above-mentioned difference (an excess or a shortage) between the actual charge and discharge of town storage battery 20 and the operation plan of which CEMS 15 notifies. Excess/shortage power Pvl is calculated by subtracting the actual charge/discharge power of town storage battery 20 from the charge/discharge power target value (operation plan) of which CEMS 15 notifies, in contrast to the above-mentioned difference, such that the excess amount of the supply power becomes a positive value. Also, the vertical axis shows the output frequency of town storage battery power conversion device 21, i.e., the frequency of the AC voltage output from third DC/AC conversion circuit (FIG. 14) to distribution system 16 (the system frequency).

Excess/shortage power Pvl on the horizontal axis is set at a positive value (Pvl>0) when the supply power is excessive, that is, when town storage battery 20 operates on the charge side with respect to the operation plan. On the other hand, excess/shortage power Pvl is a negative value (Pvl<0) when the supply power is in shortage, that is, when town storage battery 20 operates on the discharge side with respect to the operation plan.

The drooping characteristic information about town storage battery power conversion device 21 is set such that the drooping characteristic table for defining drooping characteristic line FCt shown in FIG. 20 is acquired. For example, drooping characteristic line FCt is defined to set the system frequency at center frequency fc (for example, 60 Hz) between breakpoint power Pa on the positive side (excessive power side) and breakpoint power Pb on the negative side (shortage power side). Further, according to drooping characteristic line FCt, in a region where Pvl>Pa (excessive supply), the system frequency is increased at an inclination kat in proportion to Pvl in order to decrease the electric power that is reversed in flow from each consumer house 18.

On the other hand, in a region where Pvl<Pb (shortage of supply), the system frequency is decreased at an inclination kbt in proportion to Pvl in order to increase the electric power that is reversed in flow from each consumer house 18. It should be noted that the range in which the system frequency changes is limited to fall within the range between a predetermined lower limit frequency (for example, 59.8 Hz) and a predetermined upper limit frequency (for example, 60.2 Hz).

The above-mentioned four pieces of data including breakpoint power Pa, Pb and inclinations kat, kbt are transmitted also as the drooping characteristic information about town storage battery power conversion device 21 from CEMS 15, and thereby, communication traffic can be reduced.

Again referring to FIG. 16, twelfth control circuit 6094 calculates excess/shortage power Pvl in FIG. 20, and outputs the calculated power as excess/shortage power information. Based on the drooping characteristic information from CEMS 15, drooping characteristic table generation circuit 6092 creates a drooping characteristic table for town storage battery power conversion device 21 that defines drooping characteristic line FCt in FIG. 20. Furthermore, drooping characteristic table generation circuit 6092 determines a system frequency based on the excess/shortage power information from twelfth control circuit 6094 and the above-mentioned drooping characteristic table information. The system frequency set by drooping characteristic table generation circuit 6092 is input into sinusoidal wave generation circuit 6091.

Based on the measurement result of the AC voltage in distribution system 16 that is output from voltmeter 610 and the frequency information (system frequency) from drooping characteristic table generation circuit 6092, sinusoidal wave generation circuit 6091 generates a sinusoidal wave used as a reference of the AC voltage output from third DC/AC conversion circuit 608, and outputs the generated sinusoidal wave to twelfth control circuit 6094.

On the other hand, twelfth control circuit 6094 outputs the control target value for third DC/AC conversion circuit 608 based on the sinusoidal wave from sinusoidal wave generation circuit 6091 as a target value. Third DC/AC conversion circuit 608 operates according to the control command value from twelfth control circuit 6094 to thereby output the AC voltage having the set system frequency to distribution system 16.

Then, the method of creating a drooping characteristic of each distributed power supply will be further described.

Again referring to FIG. 18, the drooping characteristic of which solar cell power conversion device 2 is notified is defined such that differential power ΔPsb1 (on the vertical axis) with respect to the system frequency (on the horizontal axis) is calculated, as described above. In this case, since solar cell 1 is an energy creation device, it can only control the generated electric power (control the output power).

In the present embodiment, when the system frequency rises according to the drooping characteristic as described with reference to FIG. 20, differential power ΔPsb1 is set such that ΔPsb1<0. This leads to a decrease in the PV control target value for solar cell power conversion device 2 to which differential power ΔPsb1 is added. In contrast, when the system frequency decreases due to a shortage of electric power supplied in a smart town according to the drooping characteristic described with reference to FIG. 20, differential power ΔPsb1 is set such that ΔPsb1>0. This leads to an increase in the PV control target value for solar cell power conversion device 2 to which differential power ΔPsb1 is added.

CEMS 15 generates drooping characteristics of solar cell power conversion device 2 and storage battery power conversion device 4 based on the elapsed time period from the start of the autonomous operation, the stored energy (SOC) of town storage battery 20, the stored energy (SOC) of storage battery 3 in consumer house 18, and the SOC total value in a smart town.

Specifically, CEMS 15 calculates the stored energy of storage battery 3 and the stored energy of town storage battery 20 that are required for ensuring the LCP for 72 hours, and generates a drooping characteristic based on the calculation result. For example, the drooping characteristic is generated such that drooping characteristic lines FC1 (a solid line), FC2 (a dotted line), and FC3 (a dashed-dotted line) are switched based on the above-mentioned SOC data.

For example, when the stored energy (SOC) that is required for ensuring the LCP for 72 hours is ensured, drooping characteristic line FC1 (a solid line) is set as a basic drooping characteristic.

In contrast, when the stored energy (SOC) that can implement the LCP for 72 hours is not ensured, drooping characteristic line FC2 (a dotted line) is set. On drooping characteristic line FC2, in order to extract the electric power, to the extent possible, generated from solar cell 1 in a frequency band in which the system frequency is lower than 60 Hz, break frequency fb2 on the low frequency side is set closer to center frequency fc (60 Hz) as compared with the above-mentioned drooping characteristic line FC1 (solid line).

In this case, on drooping characteristic line FC2 (a dotted line) of storage battery power conversion device 4 shown in FIG. 19, break frequency fb2 on the low frequency side is set lower than break frequency fb2 on drooping characteristic line FC2 (FIG. 18) of solar cell power conversion device 2. Thereby, CEMS 15 can be urged to increase electric power generated by solar cell power conversion device 2 in an earlier stage in the situation where town storage battery 20 is on the discharge side with respect to the operation plan.

Similarly, in the frequency band in which the frequency of the system voltage is higher than 60 Hz, break frequency fa2 on drooping characteristic line FC2 (FIG. 19) of solar cell power conversion device 22 is set higher than break frequency fa2 on drooping characteristic line FC2 (FIG. 19) of storage battery power conversion device 4. Thereby, charging of storage battery 3 with excessive electric power can be prioritized over suppression of electric power generated by solar cell 1. Specifically, when storage battery 3 is discharged, suppression of the discharge power from storage battery 3 is prioritized over suppression of the electric power generated by solar cell 1. On the other hand, when storage battery 3 is charged, electric power supplied to storage battery for charging is prioritized over suppression of the electric power generated by solar cell 1.

As a result, in the situation where the stored energy (SOC) that can implement the LCP for 72 hours is not ensured, the drooping characteristic can be set so as to ensure the power balance in a smart town while prioritizing ensuring of the electric power generated by solar cell 1.

On the other hand, in the state where each of town storage battery 20 and storage battery 3 in consumer house 18 is almost in a fully-charged state, drooping characteristic line FC3 (a dashed-dotted line) is set in order to prioritize discharging from storage battery 3. On drooping characteristic line FC3, relatively small inclinations ka3 and kb3 are set so as to maintain the trading power target value (solar cell power conversion device 2) that follows the operation plan.

Again referring to FIG. 19, the drooping characteristic of which storage battery power conversion device 4 is notified is defined such that differential power ΔPsb2 (on the vertical axis) with respect to the system frequency (on the horizontal axis) is calculated, as described above. In this case, storage battery 3 as an energy storage device mainly performs averaging of the trading electric power based on the operation plan at the system interconnection point (consumer premises distribution system 10) in consumer house 18 (absorption of the trading electric power fluctuations resulting from the prediction errors of the power generation amount and the load power consumption amount, and the like).

Also in storage battery power conversion device 4, according to the drooping characteristic described with reference to FIG. 20, when town storage battery 20 operates on the charge side with respect to the operation plan and the system frequency rises, differential power ΔPsb2 is set such that ΔPsb2<0. This leads to a decrease in the BAT control target value for storage battery power conversion device 4, to which differential power ΔPsb2 is added. In contrast, according to the drooping characteristic described with reference to FIG. 20, when town storage battery 20 operates on the discharge side with respect to the operation plan and the system frequency decreases, differential power ΔPsb2 is set such that ΔPsb2>0. This leads to an increase in the BAT control target value for storage battery power conversion device 4, to which differential power ΔPsb2 is added.

The drooping characteristic of storage battery power conversion device 4 is also generated by CEMS 15 based on the elapsed time period from the start of the autonomous operation, the stored energy (SOC) of town storage battery 20, the stored energy (SOC) of storage battery 3 in consumer house 18, and the SOC total value in a smart town, as described above.

For example, when the stored energy (SOC) required for ensuring the LCP for 72 hours is ensured, drooping characteristic line FC1 (a solid line) is set as a basic drooping characteristic.

In contrast, when the stored energy (SOC) that can implement the LCP for 72 hours is not ensured, drooping characteristic line FC2 (a dotted line) is set. On drooping characteristic line FC2, in order to increase the discharge power from storage battery 3 or decrease the charge power of storage battery 3, in a frequency band in which the system frequency is lower than 60 Hz, break frequency fb2 (dotted line) on the low frequency side is set closer to center frequency fc (60 Hz) than break frequency fb1 on the above-mentioned drooping characteristic line FC1 (a solid line).

Moreover, as described above, in a frequency band in which the frequency of the system voltage is lower than center frequency fc (60 Hz), in order to extract the electric power generated by solar cell 1 to the possible extent, break frequency fb2 on drooping characteristic line FC2 (a dotted line in FIG. 19) of storage battery power conversion device 4 is set lower than break frequency fb2 on drooping characteristic line FC2 (a dotted line in FIG. 18) of solar cell power conversion device 2.

On the other hand, in a frequency band in which the frequency of the system voltage is higher than center frequency fc (60 Hz), break frequency fa2 on drooping characteristic line FC2 (a dotted line in FIG. 19) of storage battery power conversion device 4 is set lower than break frequency fa2 on drooping characteristic line FC2 (a dotted line in FIG. 18) of solar cell power conversion device 2. Thereby, before the electric power generated by solar cell 1 is suppressed, the discharge power from storage battery power conversion device 4 can be suppressed or the charge power of storage battery power conversion device 4 can be increased.

Furthermore, as in FIG. 18, in the state where each of town storage battery 20 and storage battery 3 in consumer house 18 is almost in a fully-charged state, drooping characteristic line FC3 (a dashed-dotted line) is set in order to prioritize discharging from storage battery 3.

In the present embodiment, two distributed power supplies including solar cell power conversion device 2 and storage battery power conversion device 4 are installed in consumer house 18. Thus, as described above, CEMS 15 creates an operation plan for an autonomous operation so as to prioritize the output from solar cell 1 as an energy creation device while suppressing discharging from storage battery 3 as much as possible.

Specifically, as described above, town storage battery 20 operates on the discharge side with respect to the operation plan. Thus, when the electric power that is reversed in flow from consumer house 18 is increased, the drooping characteristic is generated such that, as the system frequency decreases, the target trading power at the system interconnection point in solar cell power conversion device 2 (the PV control target value) is increased prior to the target trading power of storage battery power conversion device 4 (the BAT control target value). As a result, as shown in FIGS. 18 and 19, drooping characteristic lines FC1 to FC3 are generated such that break frequencies fb1, fb2 and fb3 (FIG. 18) where $\Delta Psb1>0$ are higher than break frequencies fb1, fb2 and fb3, respectively, (FIG. 19) where $\Delta Psb2>0$.

Thereby, in the case where $\Delta Psb2=0$ and $\Delta Psb1>0$ when the electric power generated by solar cell 1 is suppressed, the electric power output from solar cell power conversion device 2 increases while the BAT control target value for storage battery power conversion device 4 does not change. Thus, storage battery power conversion device 4 operates so as to decrease the discharge power during discharging of storage battery 3 and to increase the charge power during charging of storage battery 3.

In contrast, town storage battery 20 operates on the charge side with respect to the operation plan. Thus, when the reverse power flow from consumer house 18 is reduced, the break frequency on the high frequency side of the drooping characteristic of which storage battery power conversion device 4 is notified is set lower than the break frequency on the high frequency side of the drooping characteristic of which solar cell power conversion device 2 is notified. Thereby, suppression of the discharge power of storage battery 3 or increase of the charge power is started earlier, and the frequency of the AC system voltage is further raised, to thereby perform the operation to suppress the output from solar cell 1, so as to allow suppression of the reverse power flow from consumer house 18.

When the electric power that is reversed in flow from consumer house 18 is decreased, it is preferable that suppression of the discharge power of storage battery 3 or increase of the charge power is started earlier in accordance with an increase in the system frequency, and thereafter, electric power is continuously excessively supplied to further increase the AC system frequency, and then, the electric power generated by solar cell 1 is suppressed. Thus, the drooping characteristic is generated such that the target trading power at the system interconnection point in solar cell power conversion device 2 (the PV control target value) decreases prior to the target trading power of storage battery power conversion device 4 (the BAT control target value). As a result, as shown in FIGS. 18 and 19, drooping characteristic lines FC1 to FC3 are generated such that break frequencies fa1, fa2 and fa3 (FIG. 18) where $\Delta Psb1<0$ are lower than break frequencies fa1, fa2 and fa3, respectively, (FIG. 19) where $\Delta Psb2<0$.

When the AC system frequency is center frequency fc (60 Hz in the examples in FIGS. 18 to 20), differential power is set such that $\Delta Psb1=\Delta Psb=0$ in solar cell power conversion device 2 and storage battery power conversion device 4. Thus, when the trading power target value at the system interconnection point (consumer premises distribution system 10) in each consumer house 18 from CEMS 15 is set at the trading power target value for each of solar cell power conversion device 2 and storage battery power conversion device 4, power distribution between solar cell 1 and storage battery 3 cannot be controlled. This may consequently cause problems unpreferable for ensuring the autonomous operation, for example, that storage battery 3 is discharged or charge power is suppressed in order to follow the trading power target value despite that the electric power generated by solar cell 1 is suppressed.

Thus, in the present embodiment, as described above, for each consumer equipped with solar cell 1 (an energy creation device) and storage battery 3, HEMS 7 processes the trading power target value at the system interconnection point of consumer house 18, of which CEMS 15 notifies, to thereby generate the trading power target value for solar cell power conversion device 2 and the trading power target value for storage battery power conversion device 4. Specifically, the trading power target value by CEMS 15 is processed so as to add an offset value to the trading power target value for solar cell power conversion device 2, and subtract this offset value from the trading power target value for storage battery power conversion device 4, with the result that the electric power generated by solar cell 1 can be prioritized.

Furthermore, differential power $\Delta Psb1$ and differential power $\Delta Psb2$ that follow the drooping characteristics described with reference to FIGS. 18 and 19 are respectively added to the trading power target value for solar cell power conversion device 2 and the trading power target value for storage battery power conversion device 4 that are processed as described above, to thereby set final trading power target values (a PV control target value and a BAT control target value) for solar cell power conversion device 2 and storage battery power conversion device 4. Thereby, a shortage and an excess of power supply in a system town can be eliminated in the state where ensuring of the output of solar cell 1 is prioritized.

Then, the drooping characteristic supplied to town storage battery power conversion device 21 will be described.

Again referring to FIG. 20, the drooping characteristic of town storage battery power conversion device 21 is defined such that the system frequency (on the vertical axis) with respect to excess/shortage power Pvl (on the horizontal axis) is calculated. This excess/shortage power Pvl (on the horizontal axis) shows a difference between the actual charge/discharge of town storage battery 20 and the operation plan of which CEMS 15 notifies. CEMS 15 generates a drooping characteristic based on the elapsed time period from the start of the autonomous operation, the stored energy (SOC) of town storage battery 20, the stored energy (SOC) of storage battery 3 in consumer house 18, the power generation amount actual result value, the power consumption actual result value, the status information about storage battery 3 and solar cell 1, the power generation amount prediction value, and the power consumption prediction value. Specifically, breakpoint power Pa, Bb and inclinations kat, kbt are changed.

For example, town storage battery 20 is not in a fully-charged state and when it is determined that solar cell 1 in consumer house 18 controls suppression of generated electric power based on the power generation amount actual result value and the power consumption actual result value, the drooping characteristic is set so as to increase the electric power that is reversed in flow from consumer house 18. Specifically, breakpoint power Pb is set closer to center frequency fc (60 Hz) than the default characteristic.

In the present embodiment, as will be described later in detail, the operation plan for town storage battery power conversion device 21 is created in a 5-minute cycle while a notification about the operation plan for each distributed power supply in consumer house 18 is given in a cycle longer than this 5-minute cycle (for example, in a 30-minute cycle).

Town storage battery power conversion device 21 controls the AC system frequency using the drooping characteristic shown in FIG. 20 according to the charge/discharge power target value in the operation plan, of which CEMS 15 notifies in a 5-minute cycle. Thus, even when the operation plan (the trading target power value) in a 30-minute cycle for the distributed power supply in each consumer house 18 is not updated in the case where the operation plan for town storage battery power conversion device 21 is updated in a 5-minute cycle, the AC system frequency is changed according to the drooping characteristic in FIG. 20, which allows adjustment of the trading electric power at the system interconnection point (consumer premises distribution system 10) in each consumer house 18 according to the drooping characteristics in FIGS. 18 and 19. For example, the AC system frequency is lowered to increase the electric power generated by solar cell 1 in each consumer house 18, and thereby unnecessary discharge from town storage battery 20 and unnecessary suppression of the electric power generated by solar cell 1 can be avoided.

In particular, when it is determined that solar cell 1 suppresses generated electric power in the case where the charge energy (SOC) of town storage battery 20 is less than a plan value, at least break frequency fb2 on the low frequency side is shifted to the right side (modified in the direction closer to center frequency fc) on the drooping characteristics in FIGS. 18 and 19. Thereby, even in the case where supply power is in shortage by small amount, the reverse power flow at the system interconnection point (consumer premises distribution system 10) in consumer house 18 can be increased.

The drooping characteristics of which solar cell power conversion device 2, storage battery power conversion device 4, and town storage battery power conversion device 21 are notified are created as described above, thereby providing the following advantages. In general, the notification cycle in which CEMS 15 notifies each consumer house 18 about the operation plan is set longer than the cycle in which CEMS 15 collects actual measurement data for creating an operation plan from each consumer house 18.

The operation plan for each consumer house 18 is created based on: the weather forecast information; the power generation amount prediction result predicted using the database generated from the power generation actual result about solar cell 1; and the power consumption prediction result predicted based on the database generated from the power consumption actual result. The weather forecast used in this case shows "sunny", "cloudy", "rain", "snow", and the like. For example, as to "sunny" weather, the weather forecast shows "sunny" not only when the sky is clear without clouds but also when 50% of the sky is covered with clouds. Accordingly, a significant error may occur in prediction of power generation even when the weather forecast was accurate.

In order to ensure the LCP for 72 hours, it is desirable to minimize the above-mentioned prediction error and consume the electric power generated by solar cell 1 as an energy creation device without suppression as far as possible. Therefore, in the present embodiment, as described above, the power generation amount actual result value, the power consumption actual result value, and the status information about solar cell 1 and storage battery 3 are collected in a 5-minute cycle. Based on the prediction values and actual measurement values, the operation plan for town storage battery 20 is created in a 5-minute cycle.

In order to minimize the prediction error, it is ideal to use the actual result values to revise the operation plan for the distributed power supply in consumer house 18 in a 5-minute cycle (the collection cycle of the measurement result) in addition to that for town storage battery 20.

However, CEMS 15 manages a large number of consumer houses 18 as set forth above. Accordingly, when an operation plan for each consumer house 18 is created in a short cycle (for example, a 5-minute cycle), high computing performance (CPU performance) may be required. In the present embodiment, CEMS 15 is assumed to manage 300 houses, but actually, one CEMS 15 is assumed to manage several thousands to several tens of thousands of consumers in terms of the operation costs (CPU performance, network traffic, and the like).

Thus, the shorter cycle of the operation plan creation for each consumer house 18 requires a significantly higher computing performance. On the other hand, town storage battery 20 is shared among consumer houses 18 in a smart town. Accordingly, even when the operation plan for town storage battery 20 is created in a short cycle, the computing performance is not remarkably improved. For example, even when the operation plan for town storage battery 20 is created in a range from a 30-minute cycle to a 5-minute cycle, it is expected that about several percentages (%) of improvement in CPU performance is sufficient.

Accordingly, in the present embodiment, the operation plan for town storage battery 20 is created in a 5-minute cycle and the operation plan for consumer house 18 is created in a 30-minute cycle. In addition, the cycle (30 minutes) of creating the operation plan for consumer house 18 is set at a multiple of the cycle (5 minutes) of creating the operation plan for town storage battery 20. Thereby, creation of the operation plan for consumer house 18 can be synchronized with creation of the operation plan for town storage battery 20.

Then, the method of creating an operation plan for town storage battery 20 will be described.

As described above, in the present embodiment, the operation plan for town storage battery power conversion device 21 includes two types of operation plans including: an operation plan in a 30-minute cycle that is created in combination with the operation plan for consumer house 18; and an operation plan created in a 5-minute cycle on the town storage battery side alone.

The operation plan in a 30-minute cycle is created based on the power generation amount prediction result about solar cell 1 and the power consumption prediction result about load 5 that are predicted using the weather forecast information, and the power generation actual result about solar cell 1, the power consumption actual result, the status information about each distributed power supply, and the like, that are obtained for 30 minutes from 1 hour ago to 30 minutes ago. On the other hand, the operation plan in a 5-minute cycle is created by: estimating the power generation suppression amount of solar cell 1 for 5 minutes from 10 minutes ago to 5 minutes ago; and correcting the operation plan created in a 30-minute cycle when it is estimated that the power generation of solar cell 1 is suppressed. The power generation suppression amount of solar cell 1 is estimated based on the power generation actual result of solar cell 1, the power consumption actual result, the status information about each distributed power supply, and the like for 5 minutes from 10 minutes ago to 5 minutes ago. When it is determined that the power generation of solar cell 1 is suppressed, the operation plan (target charge/discharge power) and the drooping characteristic for town storage battery 20 are generated based on the estimated power generation suppression amount (electric power).

Then, images of creation of the drooping characteristic and the operation plan for town storage battery 20 implemented in the above-mentioned 5-minute cycle will be described with reference to FIGS. 21 to 23.

Figure 21:
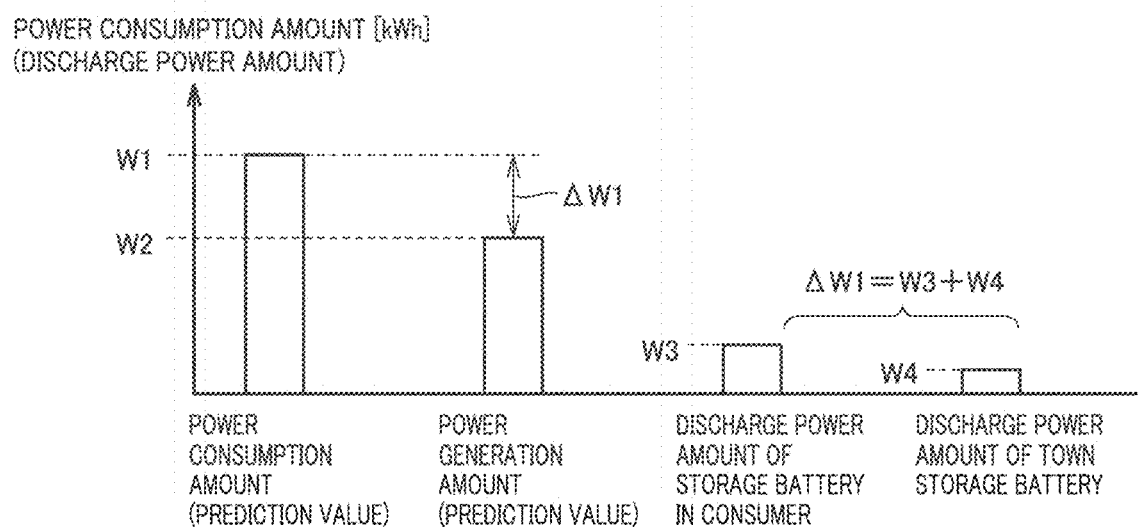
FIG. 21 is a conceptual graph showing an example of an operation plan created in a 30-minute cycle.

FIG. 21 is a conceptual graph showing an example of an operation plan created in a 30-minute cycle. The vertical axis in FIG. 21 shows a power amount (kWh).

Referring to FIG. 21, based on the prediction values of a power consumption amount (W1) on the leftmost side and a power generation amount (W2) of solar cell 1 on the second, a discharge power amount (W3) of storage battery 3 in consumer house 18 shown on the third, and a power amount W4 (a discharge power amount in the example in FIG. 21) supplied to consumer house 18 from town storage battery 20 shown on the fourth are calculated.

In the example in FIG. 21, the power consumption amount (prediction value) is greater than the power generation amount (prediction value) (W1>W2). Accordingly, CEMS 15 generates the operation plan and the drooping characteristic such that the shortage amount (ΔW1=W1−W2) of the power amount is shared between storage battery 3 in consumer house 18 and town storage battery 20, and supplied to load 5. In other words, the operation plan is created such that ΔW1=W3+W4.

In the present embodiment, according to the operation plan by CEMS 15, as described above, the operation plan for consumer house 18 includes a trading power target value (a positive value when selling electric power) at the system interconnection point (the consumer premises distribution system), and the operation plan for town storage battery 20 includes a charge/discharge power target value (a positive value when discharging) from town storage battery 20.

Figure 22:
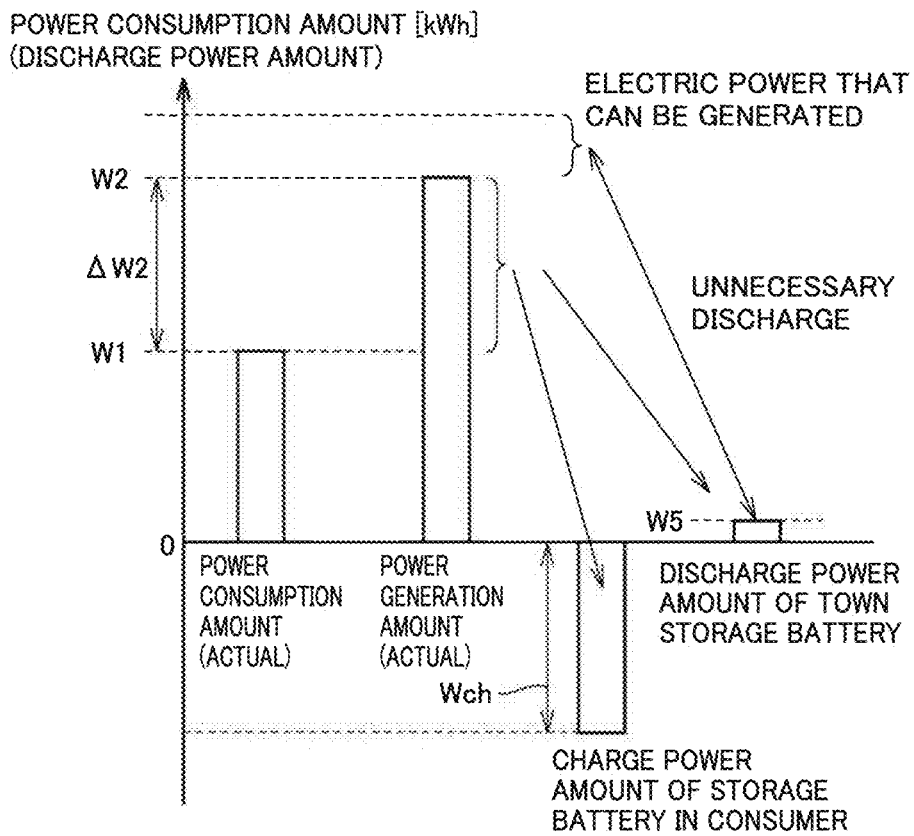
FIG. 22 is a bar graph showing an example of an actual measurement result in the first 5 minutes in an operation performed based on the operation plan created in a 30-minute cycle.

FIG. 22 shows an example of an actual measurement result (power amount) in the first 5 minutes in the operation performed based on the operation plan created in a 30-minute cycle.

In the example shown in FIG. 22, the actually measured power consumption amount is approximately the same as the prediction value in FIG. 21 while the amount of electric power generated by solar cell 1 is equal to or greater than twice as large as the prediction value in FIG. 21. For example, this actual result is obtained in the case where the weather forecast predicted "cloudy" but the actual result was "sunny". This produces an excessive power amount of ΔW2.

As a result, according to the operation plan in each 30 minutes of which consumer house 18 is notified (FIG. 21), discharge from storage battery 3 in consumer house 18 is planned but the amount of electric power generated by solar cell 1 becomes relatively large as in FIG. 22, and therefore, storage battery 3 in each consumer house 18 is charged. Specifically, storage battery power conversion device 4 charges storage battery 3 with maximum charge power of the electric power generated by solar cell 1 that is output from solar cell power conversion device 2.

As a result, in the entire smart town, the sum of charge/discharge power amount W5 (W5>0) of town storage battery 20 and power generation amount W2 of solar cell 1 is kept in balance with the sum of a charge power amount Wch of storage battery 3 and power consumption amount W1 (W2+W5=W1+Wch).

On the other hand, in solar cell 1, generated electric power is suppressed with respect to the electric power that can be generated since storage battery 3 is charged with maximum charge power. In other words, in the example in FIG. 22, consequently, town storage battery 20 is unnecessarily discharged even though solar cell 1 suppresses generated electric power.

Therefore, in the present embodiment, when the operation plan for town storage battery 20 is prepared, it is estimated whether solar cell 1 suppresses output or not and how much electric with which power town storage battery 20 can be charged, based on the power consumption amount actual result, the power generation amount actual result of solar cell 1, the control mode (MPPT control mode/voltage control mode) information about solar cell 1 by first control circuit 204 in solar cell power conversion device 2, and the charge/discharge power information about storage battery 3.

As will be described later in detail, for example, when the control mode of solar cell 1 is a voltage control mode, CEMS 15 can determine that solar cell 1 suppresses output. Furthermore, based on the charge power of storage battery 3, the electric power that can be reversed in flow from consumer house 18 to consumer premises distribution system 10 can be calculated.

Based on the electric power that can be reversed in flow from each consumer house 18, CEMS 15 can calculate the electric power with which town storage battery 20 can be charged. Based on this calculation result, the operation plan (the charge power) for town storage battery 20 is determined. When the charge power for town storage battery 20 is determined, the drooping characteristic transmitted to town storage battery power conversion device 21 is generated.

In the present embodiment, for the reasons described above, the operation plan for each consumer house 18 is created in each 30 minutes, whereas the operation plan for town storage battery 20 is updated in a 5-minute cycle. Solar cell power conversion device 2 in consumer house 18 controls the trading electric power at the system interconnection point (consumer premises distribution system 10) in consumer house 18 to be set at a control target value in which the operation plan is reflected. Thus, depending on the operation plan value, the reverse power flow supplied from each consumer house 18 to town storage battery 20 cannot be increased.

Therefore, in the present embodiment, the system frequency output from town storage battery power conversion device 21 is lowered using the drooping characteristics shown in FIGS. 18 to 20 to thereby increase the reverse power flow from consumer house 18. For example, in the case in FIG. 22, the charge/discharge power target value for town storage battery 20 is changed so as to change the operation plan for town storage battery 20 from discharging to charging. However, since the operation plan value (trading power target value) in consumer house 18 is not updated, the reverse power flow from consumer house 18 does not change. Consequently, town storage battery 20 is continuously discharged even though the operation plan is changed so as to plan charging.

Thereby, excess/shortage power Pvl shown on the horizontal axis in FIG. 20 increases in the direction in which Pvl<0, thereby lowering the system frequency that is output from town storage battery power conversion device 21. In response, differential power ΔPsb1 is added according to the drooping characteristic in FIG. 18, and thereby, the PV control target value for solar cell power conversion device 2 is corrected in the power selling direction. As a result, solar cell power conversion device 2 in consumer house 18 can increase the generated electric power that is extracted from solar cell 1.

On the other hand, storage battery power conversion device 4 has already charged storage battery 3 with maximum charge power. Accordingly, when the electric power generated by solar cell 1 increases, the electric power that is reversed in flow from each consumer house 18 increases. The increased reverse power flow is supplied to town storage battery 20 for charging.

Figure 23:
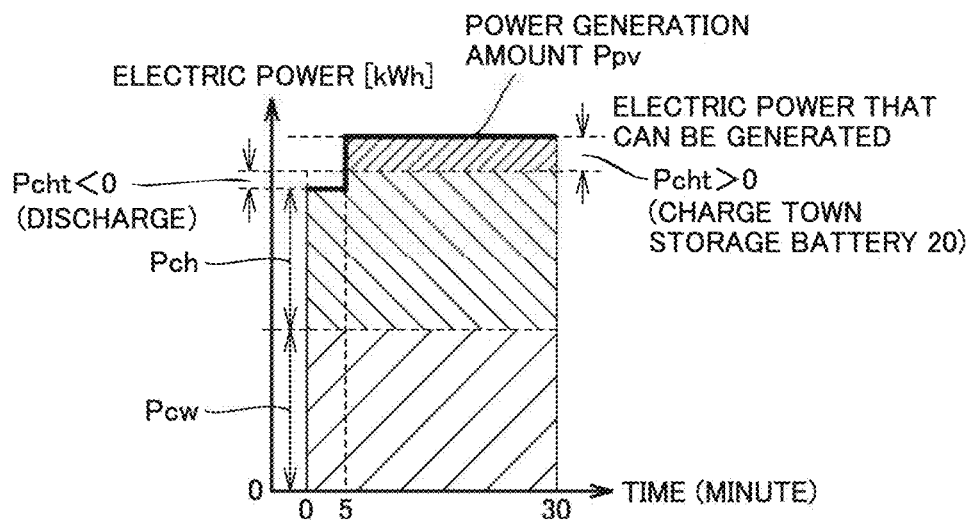
FIG. 23 is a conceptual diagram illustrating an operation image for 30 minutes according to the operation plan by the CEMS.

FIG. 23 is a conceptual diagram illustrating an operation image for 30 minutes according to the operation plan. FIG. 23 shows generated electric power Ppv by the entire solar cell 1 by a thick line, and also shows consumed electric power Pcw of the entire load 5, charge power Pht of the entire storage battery 3, and charge power Pcht of town storage battery 20.

Referring to FIG. 23, for first 5 minutes, town storage battery 20 is discharged according to the operation plan created by CEMS 15, as shown in FIG. 22. As a result, in the state where generated electric power Ppv of solar cell 1 is suppressed with respect to the electric power that can be generated, town storage battery 20 operates on the discharge side with respect to the operation plan, and thereby, the electric power in the smart town is kept balanced on the condition of (Pcht<0).

After 5 minutes has passed, the operation plan for town storage battery 20 is changed to charging based on the actual result values of the power consumption amount and the power generation amount for 5 minutes (FIG. 22). Thus, for subsequent 25 minutes, on consumer house 18 side, even if the operation plan is not updated, according to the drooping characteristic and in accordance with system frequency decrease, suppression of the electric power generated by solar cell 1 in consumer house 18 is canceled and the electric power reversed in flow is increased. As a result, the electric power generated by solar cell 1 can be ensured while town storage battery 20 can be charged with the reverse power flow (excessive power).

In this way, the operation plan for town storage battery 20 is updated in a cycle shorter than that of the operation plan for each consumer house 18. Thereby, without excessively improving the CPU performance of CEMS 15, unnecessary discharge from town storage battery 20 and unnecessary suppression of output from solar cell 1 can be minimized even when prediction of the generated electric power or the consumed electric power is incorrect.

Then, a specific operation of CEMS 15 will be described. It should be noted that no detailed description will be repeated about the respective operations of solar cell power conversion device 2, storage battery power conversion device 4, HEMS 7, and town storage battery power conversion device 21, which correspond to the processes in steps by CEMS 15 as described below.

Figure 24:
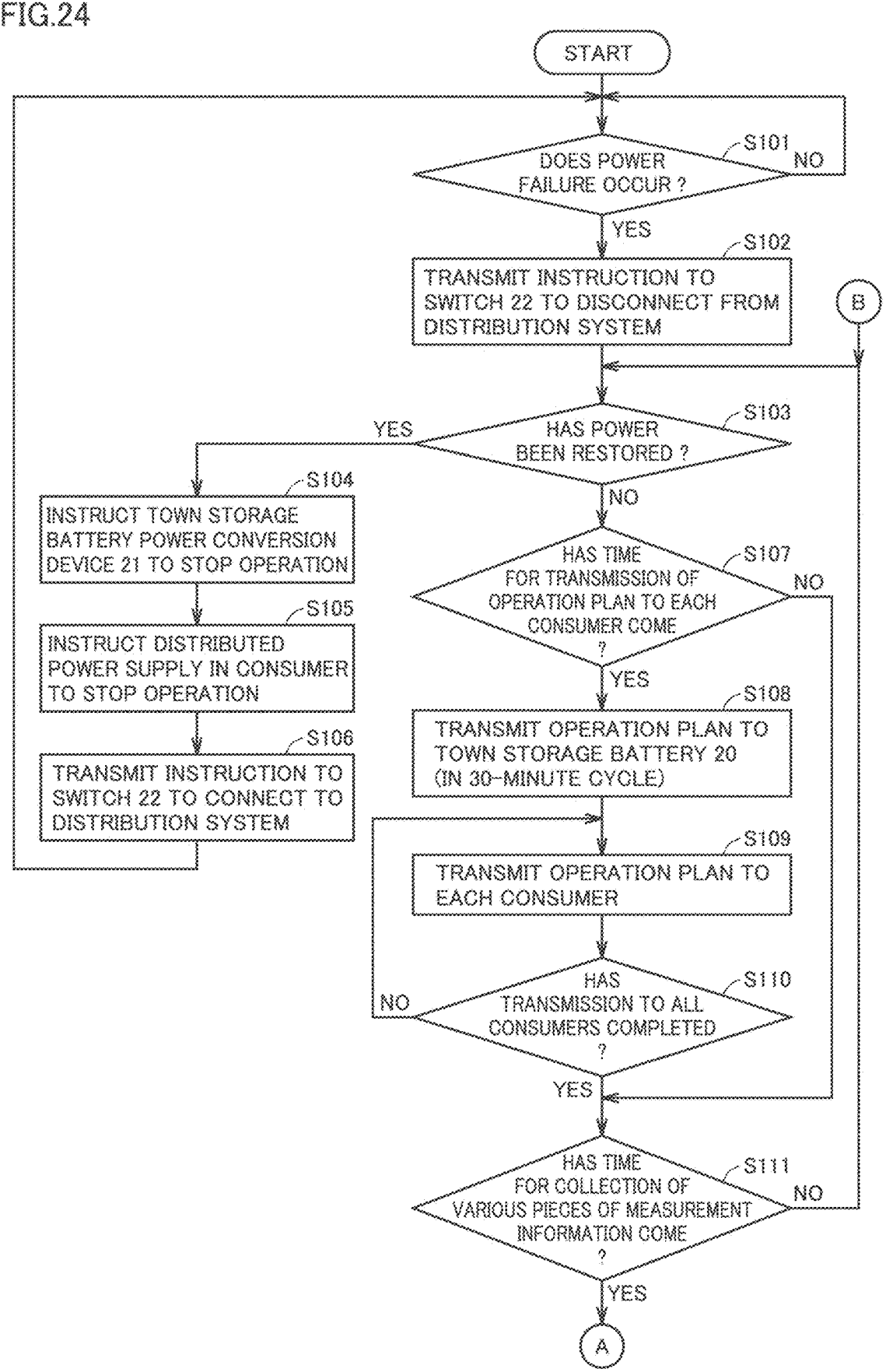
FIG. 24 is the first flowchart illustrating a series of processes performed by the CEMS at occurrence of a power failure.
Figure 25:
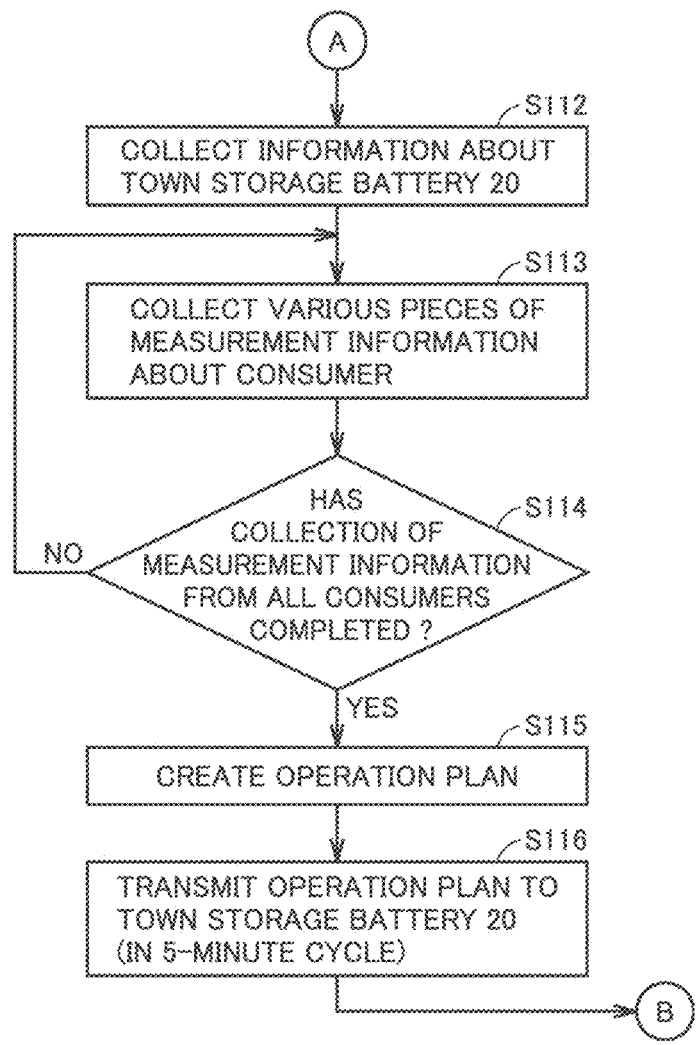
FIG. 25 is the second flowchart illustrating a series of processes performed by the CEMS at occurrence of a power failure.

FIGS. 24 and 25 each are a flowchart illustrating a series of processes performed by CEMS 15 at occurrence of a power failure.

Referring to FIG. 24, in step (hereinafter also simply referred to as "S") 101, CEMS 15 checks whether a power failure occurs or not. In the present embodiment, the effective value of the AC voltage in distribution system 17 that connects switch 22 and substation 24 in FIG. 1 is measured by a voltmeter (not shown) provided in switch 22. When the AC effective voltage in distribution system 17 is equal to or less than a predetermined determination voltage for a predetermined time period or longer, switch 22 notifies CEMS 15 about the measurement result about the AC effective voltage together with the power failure information showing that power supply to distribution system 17 from substation 24 is stopped.

CEMS 15 receives the power failure information from switch 22 at information collection circuit 152 (FIG. 3) through communication circuit 151 (FIG. 3). Information collection circuit 152 notifies distributed power supply status management circuit 155 (FIG. 13) about the power failure information received from switch 22. Upon reception of the power failure information, distributed power supply status management circuit 155 notifies operation plan creation circuit 160 (FIG. 3) about the received information. Upon reception of the power failure information, operation plan creation circuit 160 sets a power failure flag in an internal register (not shown). The determination in S101 can be made according to the power failure flag.

According to the set of the power failure flag, CEMS 15 instructs each consumer house 18 in a smart grid to become disconnected from distribution system 14, to turn off the power supply of load 5 in each consumer house 18, and to stop solar cell power conversion device 2 and storage battery power conversion device 4. Similarly, CEMS 15 instructs town storage battery power conversion device 21 to become disconnected from distribution system 16.

Operation plan creation circuit 160 outputs power failure flag information also to operation plan creation management circuit 161 (FIG. 3). After transmission of the above-mentioned instructions to each consumer house 18 and town storage battery power conversion device 21 in a smart town, then in S102, CEMS 15 outputs an interruption instruction to switch 22 to disconnect distribution system 16 in a smart town from distribution system 17 connected to substation 24.

The above-mentioned various instructions given upon detection of a power failure are output from operation plan creation circuit 160 to data transmission management circuit 153. Then, this data transmission management circuit 153 can notify each device about these instructions through communication circuit 151.

After occurrence of a power failure, then in S103, CEMS 15 sequentially checks whether power has been restored or not. Also in the interrupted state, switch 22 measures the AC voltage effective value in distribution system 17 connected to substation 24. Thus, when the measured AC voltage effective value is equal to or greater than a determination voltage for a time period exceeding a predetermined time period, switch 22 notifies CEMS 15, in the same manner as in the case of detection of a power failure, about the measurement result of the AC effective voltage together with the power restoration information showing that power supply from substation 24 to distribution system 17 has been restored.

CEMS 15 receives the power restoration information from switch 22 at information collection circuit 152 through communication circuit 151 (FIG. 3). Information collection circuit 152 notifies distributed power supply status management circuit 155 (FIG. 3) about the power restoration information received from switch 22. Upon reception of the power restoration information, distributed power supply status management circuit 155 notifies operation plan creation circuit 160 (FIG. 3) about the received information. Upon reception of the power restoration information, operation plan creation circuit 160 resets the above-mentioned power failure flag in the internal register. The determination in S103 can be made according to this power failure flag.

When the power failure flag is reset, CEMS 15 confirms that power has been restored or not and determines the process in S103 as YES. When it is confirmed that power has been restored, then in S104, CEMS 15 instructs town storage battery power conversion device 21 to stop the operation. Then, in S105, CEMS 15 instructs each consumer house 18 in a smart grid to turn off the power supply of each load 5 and to stop the solar cell power conversion device 2 and storage battery power conversion device 4. Furthermore, in S106, CEMS 15 outputs a connection instruction to switch 22 to electrically connect distribution system 16 in a smart town to substation 24. In response, switch 22 electrically connects distribution systems 16 and 17.

After the above-mentioned various instructions given upon detection of power restoration are output from operation plan creation circuit 160 to data transmission management circuit 153, this data transmission management circuit 153 can also notify each device about these various instructions through communication circuit 151. After completion of S106, CEMS 15 repeats the process of detecting a power failure in S101 while no power failure is detected.

When power restoration is not confirmed after detection of a power failure (determines as NO in S103), CEMS 15 starts the process for a power failure. In the present embodiment, during a power failure, CEMS 15 performs two types of processes including a process in a 5-minute cycle and a process in a 30-minute cycle, as described above.

Figure 26:
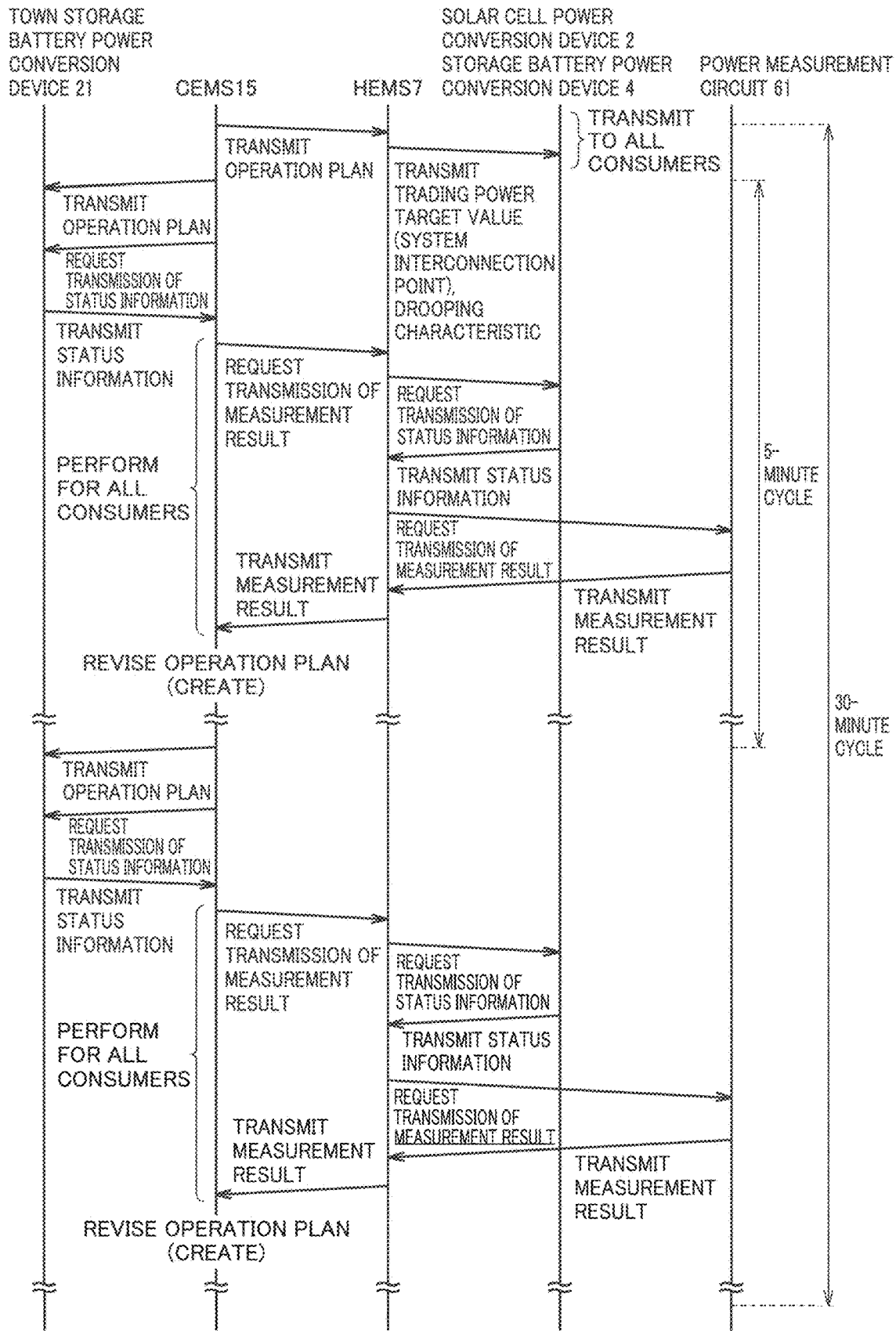
FIG. 26 is a diagram of an operation sequence among various devices during a power failure in a power system according to the present embodiment.

FIG. 26 shows a diagram of an operation sequence among various devices during a power failure in a power system according to the present embodiment.

The process in a 30-minute cycle is started, for example, from the time of 13:00, the time of 13:30, or the like. Also, the process in a 5-minute cycle is started from the time of 13:05, the time of 13:10, . . . , or the like. Moreover, regarding collection of various measurement results, for example, the measurement result in the time period from 13:00 to 13:05 (5 minutes) is collected from 13:05 at which this measurement time period ends and reflected in the operation plan in the time period started from 13:10.

Moreover, the operation plan in a 30-minute cycle is updated in accordance with the updating cycle of the weather forecast in cloud 23. For example, when the weather forecast is updated at 23:00, the operation plan for 24 hours at and after 23:00 is created in each 30 minutes. After that, in the manner as described above, the operation plan in a 5-minute cycle and the operation plan in a 30-minute cycle are corrected based on various actual measurement results collected in a 5-minute cycle. Although not described in detail, in the present embodiment, at occurrence of a power failure, the operation plan for the load is different from the operation plan during the interconnection operation (normal operation). Thus, the power consumption prediction result about the load is replaced for creating an operation plan.

Referring to FIG. 26, at a predetermined time in a 30-minute cycle, CEMS 15 notifies HEMS 7 for each consumer house 18 about the operation plan (specifically, the trading power target value in consumer premises distribution system 10, and the drooping characteristics of solar cell power conversion device 2 and storage battery power conversion device 4). In the present embodiment, after HEMS 7 receives the communication between CEMS 15 and consumer house 18, this HEMS 7 notifies each device in consumer house 18 about this communication.

Upon reception of the operation plan and the drooping characteristics, HEMS 7 notifies solar cell power conversion device 2 and storage battery power conversion device 4 about the trading power target values at the respective system interconnection points and the drooping characteristics. In this case, as described above, the trading power target values for solar cell power conversion device 2 and storage battery power conversion device 4 are generated by processing the trading power target value transmitted from CEMS 15. For example, in order to preferentially use the electric power generated by solar cell 1, the trading power target value for solar cell power conversion device 2 is generated so as to be larger than the trading power target value for storage battery power conversion device 4. The difference between the trading power target values for solar cell power conversion device 2 and storage battery power conversion device 4 in this case can be set based on the charge energy (SOC) of storage battery 3. Specifically, when the SOC is relatively small (for example, in the case where SOC≤0.8), the difference can be increased as compared with the case where the SOC is relatively large (for example, in the case where SOC>0.8).

Upon completion of transmission of the operation plan to each consumer house 18, CEMS 15 transmits the operation plan (the charge/discharge power target value and the drooping characteristic) to town storage battery power conversion device 21. Upon completion of transmission of the operation plan, CEMS 15 starts collection of various pieces of measurement data. Specifically, upon completion of transmission of the operation plan to town storage battery power conversion device 21, data transmission management circuit 153 (FIG. 3) notifies operation plan creation management circuit 161 (FIG. 3) about completion of transmission. Upon reception of the notification about communication completion, operation plan creation management circuit 161 checks a clock (not shown) for the present time information to thereby check whether the collection start time for various pieces of measurement data has come or not. When the collection time has come, CEMS 15 transmits a request signal to town storage battery power conversion device 21 to request transmission of the status information. Upon reception of the transmission request for the status information, town storage battery power conversion device 21 transmits, to CEMS 15, the SOC information about town storage battery 20, the capacity retention rate (SOH) information, and the charge/discharge power amount for 5 minutes that have been collected at a prescribed time (in a 5-minute cycle). Upon completion of reception of the status information from town storage battery power conversion device 21, CEMS 15 transmits a request signal to HEMS 7 in each consumer house 18 to request transmission of the measurement result and the status information about the distributed power supply.

HEMS 7 checks the clock (not shown). Then, when a prescribed time (in a 5-minute cycle) has come, HEMS 7 collects the power generation amount for 5 minutes, the status information (start, power generation, stop), and the present control mode (MPPT control or voltage control) information from solar cell power conversion device 2. Upon completion of collection of the status information about solar cell power conversion device 2, HEMS 7 collects the charge/discharge power amount for 5 minutes, the SOC information about storage battery 3, and the capacity retention rate (SOH) information from storage battery power conversion device 4. Then, HEMS 7 collects the power consumption amount of each breaker for 5 minutes from power measurement circuit 61 in power switchboard 6. Then, upon reception of the status transmission request from CEMS 15, HEMS 7 transmits the above-mentioned collected data to CEMS 15.

Upon completion of collection of the status information from each consumer house 18, CEMS 15 updates various databases and revises the operation plan (the charge/discharge power and the drooping characteristic) for town storage battery 20. Upon completion of revision of the operation plan, town storage battery power conversion device 21 is notified about the revision result. Upon completion of notification to town storage battery power conversion device 21, then, until the process in a next 5-minute cycle is started, CEMS 7 corrects the operation plan for each consumer house 18 and the operation plan for town storage battery power conversion device 21 that are transmitted in a next 30-minute cycle.

In the present embodiment, the operation plan in a 30-minute cycle used from 13:30 is created based on the actual measurement result collected between 12:30 and 13:00 by using the free time of the process from 13:00 to 13:30. In this case, assuming that the operation plans for several thousands of consumers are prepared, the CPU throughput of a standard cloud server may require the processing time of about several minutes to a dozen or so minutes. Thus, it is also practical to use the data collected more than 30 minutes ago for correcting the operation plan prepared using the actual measurement data, as described above.

When the clock (not shown) in CEMS 15 shows a prescribed time (in a 30-minute cycle), CEMS 15 performs creation and transmission of the operation plan in the above-described manner after completion of collection of the status information and the actual measurement result. In the present embodiment, the operation plan transmitted to HEMS 7 in each consumer house 18 and town storage battery power conversion device 21 in a 30-minute cycle is obtained as a result of correction made based on the actual measurement data collected up to 30 minutes ago.

Again referring to FIG. 24, the operation in and after S107 will be hereinafter described. When power restoration is not confirmed after detection of a power failure (determined as NO in S103), then in S107, CEMS 15 checks whether the operation plan transmission time (the transmission time in a predetermined 30-minute cycle) has come or not, at which the operation plan is transmitted to each consumer house 18. In the present embodiment, operation plan creation management circuit 161 in CEMS 15 manages collection of various pieces of measurement information in a 5-minute cycle, generation and transmission of the operation plan in a 5-minute cycle, and the generation timing and the transmission timing for the operation plan in each 30 minutes. According to the transmission timing managed by operation plan creation management circuit 161, data transmission management circuit 153, data reception management circuit 154, and operation plan creation circuit 160 operate.

When the operation plan transmission time has come (determined as YES in S107), then in S108, CEMS 15 transmits the operation plan for town storage battery 20. Specifically, operation plan creation management circuit 161 (FIG. 3) instructs operation plan creation circuit 160 to output the operation plan for town storage battery power conversion device 21 in a 30-minute cycle to data transmission management circuit 153. Furthermore, to data transmission management circuit 153 (FIG. 3), operation plan creation management circuit 161 outputs an instruction of transmission to town storage battery power conversion device 21. Upon reception of the transmission instruction from operation plan creation management circuit 161, data transmission management circuit 153 transmits the operation plan received from the operation plan creation circuit to town storage battery power conversion device 21 through communication circuit 151.

Upon completion of transmission of the operation plan in a 30-minute cycle to town storage battery power conversion device 21 in S108, CEMS 15 proceeds the process to S109 and then transmits the operation plan to each consumer. Specifically, operation plan creation management circuit 161 (FIG. 3) instructs operation plan creation circuit 160 to output the operation plan for the first consumer house 18 and instructs data transmission management circuit 153 to transmit the operation plan, which has been output from operation plan creation circuit 160, to consumer house 18 (the first consumer). Upon reception of the transmission instruction from operation plan creation management circuit 161, data transmission management circuit 153 notifies consumer house 18 through communication circuit 151 about the operation plan output from the operation plan creation circuit.

Until completion of transmission of the operation plan to all of consumer houses 18 in a smart town (determined as NO in S110), CEMS 15 repeatedly gives a notification about the operation plan to one consumer house 18 in S109.

When the operation plan transmission time in each 30 minutes has not come (determined as NO in S107), or when transmission of the operation plan to all consumer houses 18 completes at the operation plan transmission time in each 30 minutes (determined as YES in S110), CEMS 15 proceeds the process to S111.

In S111, CEMS 15 checks whether the measurement information collection time (the transmission time in a predetermined 5-minute cycle) has come or not. When the measurement information collection time has not come (determined as NO in S111), the process is returned to S103.

On the other hand, when the measurement information collection time has come (determined as YES in S111), then in S112, CEMS 15 collects the information about town storage battery 20. Specifically, when the measurement information collection time (for example, 13:05) has come, operation plan creation management circuit 161 (FIG. 3) instructs data transmission management circuit 153 (FIG. 3) to output a measurement information notification request packet to town storage battery power conversion device 21. Upon reception of the instruction of transmission of the measurement information notification request packet from operation plan creation management circuit 161, data transmission management circuit 153 transmits a predetermined packet to town storage battery power conversion device 21 through communication circuit 151. On the other hand, data reception management circuit 154 checks whether or not information collection circuit 152 has acquired the information about the measurement information from town storage battery power conversion device 21 through communication circuit 151. When acquisition of the information is confirmed, data reception management circuit 154 notifies operation plan creation management circuit 161 about acquisition of the information. On the other hand, when the information has not been received after a predetermined time period has passed since transmission of the measurement information notification request packet, data reception management circuit 154 notifies operation plan creation management circuit 161 about a request to re-transmit the measurement information notification request packet. Upon reception of the request for re-transmission, operation plan creation management circuit 161 instructs data transmission management circuit 153 to re-transmit the measurement information notification request packet to town storage battery power conversion device 21.

Upon completion of collection of the information about town storage battery 20 in S112, then in S113, CEMS 15 collects various measurement results and various pieces of information about consumer house 18. Specifically, operation plan creation management circuit 161 (FIG. 3) instructs data transmission management circuit 153 (FIG. 3) to collect the measurement information about the first consumer house 18. In this case, operation plan creation management circuit 161 also instructs data reception management circuit 154 to receive the measurement information about the first consumer house 18. Upon reception of the transmission instruction from operation plan creation management circuit 161, data transmission management circuit 153 transmits the measurement information notification request packet to the first consumer house 18. On the other hand, data reception management circuit 154 checks whether or not information collection circuit 152 has acquired the information about the measurement information from consumer house 18 through communication circuit 151. When the information has been acquired, data reception management circuit 154 notifies operation plan creation management circuit 161 about acquisition of the information. On the other hand, when the information has not been received even when a predetermined time period has passed since transmission of the measurement information notification request packet, data reception management circuit 154 notifies operation plan creation management circuit 161 about the request for re-transmission of the measurement information notification request packet.

Until completion of collection of the measurement information from all of consumer houses 18 in a smart town (determined as NO in S114), CEMS 15 repeatedly performs collection of the measurement information from each consumer house 18 in S113. When collection of the measurement information from all of consumer houses 18 completes (determined as YES in S114), CEMS 15 proceeds the process to S115 and then creates an operation plan.

Figure 27:
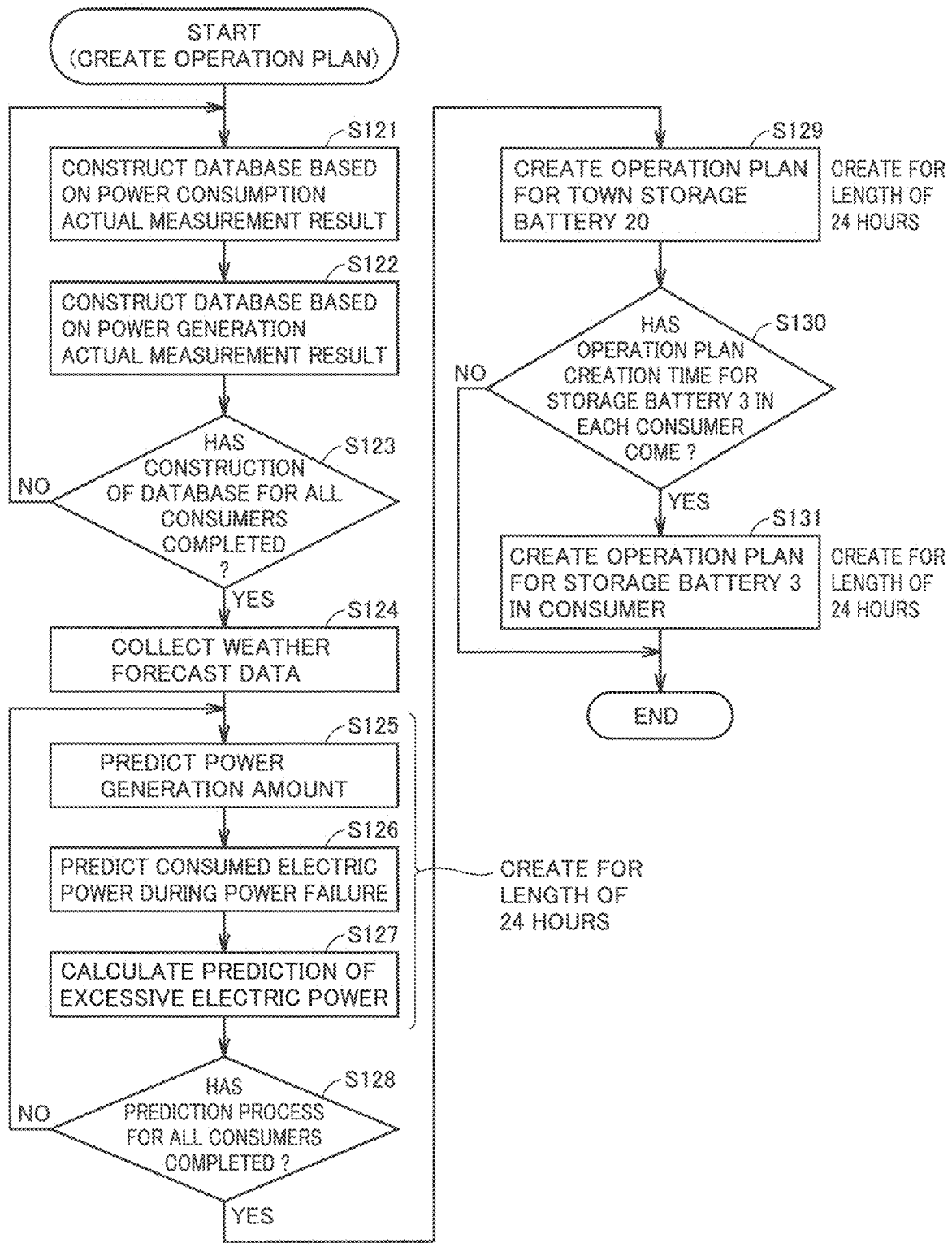
FIG. 27 is a flowchart illustrating details of a process in a step of creating the operation plan in FIG. 26.

FIG. 27 shows a flowchart illustrating the details of the process in S115 (the step of creating an operation plan).

Referring to FIG. 27, when creation of an operation plan is started (S115), then in S121, CEMS 15 constructs a database based on the power consumption actual measurement result. Specifically, information collection circuit 152 (FIG. 3) in CEMS 15 outputs various pieces of information collected from town storage battery power conversion device 21 and HEMS 7 in each consumer house 18 to distributed power supply status management circuit 155, power generation actual result management circuit 156, and power consumption actual result management circuit 159. Distributed power supply status management circuit 155 causes a memory (not shown) to store the status information about town storage battery 20 output from information collection circuit 152 (SOC, SOH, and the charge/discharge power amount for 5 minutes), the status information about storage battery 3 in each consumer house 18 (SOC, SOH, and the charge/discharge power amount for 5 minutes), and the status information about solar cell 1 (the power generation amount, status (standby, stop, power generation), and the operation mode)).

Moreover, in order to construct a database for each consumer house 18, power consumption actual result management circuit 159 causes a memory (not shown) to store the power consumption actual result about each consumer house 18 together with the time information. In the normal situation, when the weather actual result information at this time is obtained from cloud 23, power consumption actual result data is read from the database constructed on a weather-actual-result basis, on a monthly basis and on a day-of-week basis, and new power consumption actual result data is generated by the study in combination with the data actually measured at this time and written back into the database.

In contrast, occurrence frequency of a power failure is relatively low and loads to be used are also limited during a power failure. Thus, in the present embodiment, a database in a power failure is constructed by predicting the load power consumption based on the power consumption actual result stored in the memory (not shown). Alternatively, the database of the load power consumption in the normal situation can also be utilized for predicting load power consumption. Specifically, based on the load power consumption curves in the morning and the evening, the database can be utilized for predicting the time at which a lighting device as an essential load is turned on and predicting the time zone in which cooking appliance such as a microwave oven is temporarily used.

Upon completion of construction of the database in S121, then in S122, CEMS 15 constructs a database based on the power generation actual measurement result. Specifically, power generation actual result management circuit 156 (FIG. 3) in CEMS 15 updates the database based on the power generation amount actual result. However, during a power failure, generated electric power may be suppressed for balancing control. Thus, in the present embodiment, power generation actual result management circuit 156 causes a memory (not shown) to store the power generation actual measurement result and additionally the control mode of solar cell 1, the load power consumption amount actual result, the trading power amount actual result, the charge and discharge actual results about storage battery 3 together with the time information, so as to construct a database.

Until completion of construction of the database for all of consumer houses 18 in a smart town (determined as NO in S123), CEMS 15 repeatedly performs S121 and S122.

Upon completion of the process of constructing the database for all of consumer houses 18 in a smart town (determined as YES in S123), CEMS 15 collects weather forecast data in S124. Specifically, operation plan creation management circuit 161 (FIG. 3) instructs data transmission management circuit 153 (FIG. 3) to acquire weather forecast information from cloud 23. Upon reception of this instruction, data transmission management circuit 153 transmits a weather forecast information transmission request packet to cloud 23 for requesting transmission of the latest weather forecast information. Upon acquisition of the latest weather forecast data from cloud 23 through communication circuit 151, power generation prediction circuit 157 and power consumption prediction circuit 158 are notified about this weather forecast data.

Upon collection of the weather forecast data in S124, CEMS 15 predicts the electric power generated by solar cell 1 in S125. Specifically, upon reception of new weather forecast information, power generation prediction circuit 157 compares the received new weather forecast information with the previously acquired weather forecast information to thereby check whether the data is updated or not. When the weather forecast data is updated, power generation prediction circuit 157 predicts the electric power generated by solar cell 1 for a length of 24 hours in each 30 minutes for each consumer house 18 based on the power generation amount actual result database in the normal situation that is constructed by power generation actual result management circuit 156. On the other hand, when the weather forecast data is not updated, the previously predicted result is used as it is.

Upon completion of power generation amount prediction for solar cell 1 (S125), CEMS 15 predicts the consumed electric power during a power failure in S126. As described above, since load 5 used during a power failure is different from load 5 in the normal situation, the consumed electric power is also different. Accordingly, the consumed electric power during a power failure is predicted based on the actual result data stored in the memory (not shown) in power consumption actual result management circuit 159. Specifically, in the present embodiment, immediately after occurrence of a power failure at which the power consumption actual result is not stored in the memory, the average power consumption of the refrigerator as an essential load is used as a power consumption prediction value during a power failure. Since the database based on the power consumption actual result is not constructed until 24 hours passes since occurrence of a power failure, the power consumption data actually measured immediately before creation of an operation plan can be used as a prediction value. After 24 hours has passed since occurrence of a power failure, the consumed electric power of load 5 can be predicted based on the database of the power consumption actual result for a length of 24 hours that is constructed in the memory.

In S127, CEMS 15 subtracts the power consumption prediction value (S126) during a power failure from the power generation prediction value for solar cell 1 (S125), to thereby calculate excessive electric power of solar cell 1. Calculation in S127 is performed by excessive power prediction circuit 1655 (FIG. 7).

Until completion of the above-mentioned prediction process in S125 to S127 for all of consumer houses 18 in a smart town (determined as NO in S128), CEMS 15 repeatedly performs the process in S125 to S127. Upon completion of various prediction processes for all of consumer houses 18 (determined as YES in S128), the process proceeds to creation of an operation plan for town storage battery 20 (S129) and creation of an operation plan for consumer's storage battery 3 (S131).

Then, again referring to FIGS. 3 to 8, creation of an operation plan for each consumer house 18 and town storage battery 20 will be described.

The operation plan for each consumer house 18 is created by consumer operation plan creation circuit 1651 (FIG. 4) in operation plan creation circuit 160 (FIG. 3). Consumer operation plan creation unit 1652 (FIG. 6) is mounted in consumer operation plan creation circuit 1651 for each consumer house 18. Consumer operation plan creation unit 1652 receives inputs of the power generation amount prediction result about solar cell 1 and the power consumption prediction result about load 5, which are predicted for each consumer house 18. Furthermore, consumer operation plan creation unit 1652 receives inputs of notifications from each consumer house 18 in a 5-minute cycle about the power generation actual result value of solar cell 1, the power consumption actual result value of load 5, SOC, SOH and the charge/discharge power actual result value of storage battery 3, and the status information and the control mode of solar cell 1.

Consumer operation plan creation unit 1652 performs data processing for the above-mentioned input information to generate data for creating operation plans in a 5-minute cycle and a 30-minute cycle. This data generation is performed based on the timing signal that is output from operation plan creation management circuit 161. Upon completion of data generation, solar cell output suppression determination circuit 1656 in consumer operation plan creation unit 1652 estimates the power generation suppression amount for solar cell 1. The method of calculating the power generation suppression amount for solar cell 1 will be described later (see FIG. 35).

Again referring to FIG. 7, second operation plan creation circuit 1657 (FIG. 7) in consumer operation plan creation unit 1652 creates an operation plan in a 30-minute cycle for consumer house 18. The operation plan includes the trading power target value in consumer premises distribution system 10 as a system interconnection point, and the drooping characteristics of which solar cell power conversion device 2 and storage battery power conversion device 4 are notified. In this case, in second operation plan creation circuit 1657, operation plan correction circuit 1662 (FIG. 8) performs operation plan correction by correcting the operation plan based on the trading electric power (actual result value) at the system interconnection point in consumer house 18 that is calculated by consumer system interconnection point power generation circuit 1610 (FIG. 5) in first operation plan creation circuit 1601.

Moreover, the process in S125 is performed by power generation prediction circuit 157 (FIG. 3), and the process in S126 is performed by power consumption prediction circuit 158 (FIG. 3). As described above, excessive power prediction circuit 1655 (FIG. 7) predicts excessive electric power by subtracting the power consumption prediction result by power consumption prediction circuit 158 from the power generation prediction result for solar cell 1 in consumer house 18 by power generation prediction circuit 157. The excessive power calculation result by excessive power prediction summation circuit 1605 is input to second operation plan creation circuit 1657, excessive power prediction summation circuit 1605 in first operation plan creation circuit 1601, and consumer system interconnection point power generation circuit 1610. When the excessive electric power calculated by excessive power prediction summation circuit 1605 is summed by excessive power prediction summation circuit 1605, the process in S127 is implemented.

On the other hand, solar cell output suppression determination circuit 1656 in consumer operation plan creation unit 1652 estimates the power generation suppression amount of solar cell 1. Estimation of the power generation suppression amount is performed in creation of an operation plan both in a 30-minute cycle and in a 5-minute cycle. When creating an operation plan in a 30-minute cycle, the power generation suppression amount of solar cell 1 is estimated based on the prediction result and the actual measurement result for 30 minutes from 1 hour ago to 30 minutes ago. Moreover, when creating an operation plan in a 5-minute cycle of which town storage battery power conversion device 21 is notified, the power generation suppression amount of solar cell 1 is estimated based on the prediction result and the actual measurement result for 5 minutes from 10 minutes ago to 5 minutes ago.

Second operation plan creation circuit 1657 generates a trading power target value at the system interconnection point (consumer premises distribution system 10) in consumer house 18, and drooping characteristics of solar cell power conversion device 2 and storage battery power conversion device 4 based on the trading electric power (actual result) at the system interconnection point in consumer house 18 that is output from consumer system interconnection point power generation circuit 1610, the estimation result about the power generation suppression amount of solar cell 1 that is output from solar cell output suppression determination circuit 1656, and the status information about the distributed power supply in consumer house 18.

Again referring to FIG. 8, consumer distributed power supply drooping characteristic generation circuit 1661 in second operation plan creation circuit 1657 creates drooping characteristics of solar cell power conversion device 2 and storage battery power conversion device 4 based on the SOC and SOH information about storage battery 3 that are output from distributed power supply status management circuit 155, the excessive power prediction information output from excessive power prediction circuit 1655, and the correction result about the operation plan output from operation plan correction circuit 1662.

First, creation of the drooping characteristic on the low frequency side of solar cell power conversion device 2 will be hereinafter described. When the correction result about the operation plan is subtracted from the prediction result about the excessive electric power to thereby calculate the charge energy that can be supplied to storage battery 3, it is determined that electric power that can be supplied to storage battery 3 for charging still remains when the charge energy is positive. In this case, in order to immediately supply excessive electric power of solar cell 1 when town storage battery 20 operates on the discharge side with respect to the operation plan, a drooping characteristic is generated such that the break frequency (fb2) on the low frequency side is set closer to center frequency fc (60 Hz) as illustrated on drooping characteristic line FC2 (a dotted line) in FIG. 18.

The difference between break frequency fb2 and center frequency fc can be reduced as the charge energy that can be supplied to storage battery 3 is larger (i.e., the SOC of storage battery 3 is lower). Moreover, the inclination (kb2) of the line of the drooping characteristic on the lower frequency side than break frequency fb2 on the low frequency side can be determined based on the charge power that can be supplied to storage battery 3. Specifically, inclination kb2 can be determined such that differential power ΔPsb1 becomes equal to the charge power that can be supplied to storage battery 3 at the lower limit frequency (for example, 59.8 Hz) of the drooping characteristic. When no excessive electric power exists, a predetermined drooping characteristic (for example, drooping characteristic line FC1) can be used on the low frequency side with respect to center frequency fc.

Then, creation of a drooping characteristic on the high frequency side of solar cell power conversion device 2 will be described. As described above, in the present embodiment, the trading power target value for storage battery power conversion device 4 at the system interconnection point (consumer premises distribution system 10) in consumer house 18 is set smaller than the trading power target value for solar cell power conversion device 2. Thus, due to the difference between both the trading power target values, storage battery 3 can be charged through storage battery power conversion device 4 with part of the electric power output from solar cell power conversion device 2. Accordingly, when solar cell 1 suppresses generated electric power, electric power generated by solar cell 1 can be increased by the amount of charge power for storage battery 3. In other words, by providing a difference between the trading power target value for solar cell power conversion device 2 and the trading power target value for storage battery power conversion device 4, the electric power generated by solar cell 1 can be utilized to the possible extent.

In the present embodiment, as to the drooping characteristic on the high frequency side, a predetermined drooping characteristic (for example, drooping characteristic line FC1) can be used in a fixed manner. Alternatively, as described with reference to FIG. 18, the drooping characteristic can be changed based on the SOC of town storage battery 20, for example. In this case, the drooping characteristic is generated such that excessive electric power of solar cell 1 can be preferentially supplied for charging by town storage battery 20.

Similarly, generation of the drooping characteristic of storage battery power conversion device 4 will be described.

As described above, electric power generated by solar cell 1 needs to be supplied preferentially to a distribution system. Thus, when the supply power in a smart town becomes insufficient and the system frequency lowers, the electric power supplied from solar cell power conversion device 2 needs to be first increased. Therefore, as described with reference to FIGS. 18 and 19, on the low frequency side, break frequencies fb1 to fb3 of storage battery power conversion device 4 are set lower than break frequencies fb1 to fb3 of solar cell power conversion device 2.

On the high frequency side, as described with reference to FIGS. 18 and 19, in order to supply excessive electric power before solar cell 1 starts output suppression, break frequencies fa1 to fa3 of storage battery power conversion device 4 are set higher than break frequencies fa1 to fa3 on the high frequency side for solar cell power conversion device 2. In the present embodiment, inclinations ka and kb of lines on the low frequency side and the high frequency side are determined based on the comparison result between the SOC remaining amount in town storage battery 20 and the SOC (plan value) required for implementing the LCP for 72 hours.

Again referring to FIG. 8, the function of operation plan correction circuit 1662 will be described. As described above, as to the operation plan for consumer house 18, an operation plan for a length of 24 hours is created in a 30-minute cycle based on the prediction results about: the electric power generated by solar cell 1 on the basis of the weather forecast information; and the power consumption of the load. A weather forecast is normally updated three to four times in one day. However, when such a weather forecast is not updated since the previous cycle (30 minutes ago), the operation plan is not updated.

Operation plan correction circuit 1662 corrects the trading power target value at the system interconnection point (consumer premises distribution system 10) in consumer house 18 based on the excessive power prediction result about solar cell 1 estimated from the above-mentioned operation plan, the power generation actual result, the power consumption actual result, the output suppression amount information about solar cell 1 generated from the status information about the distributed power supply, and the SOC information about storage battery 3 and town storage battery 20. Specifically, when the SOC of town storage battery 20 is lower than the plan value and solar cell 1 suppresses the output, the operation plan is corrected so as to increase the trading power target value (i.e., changing to the power selling side) to thereby urge charging of town storage battery 20. In this case, the increasing amount of the trading power target value can be determined so as to correspond to the charge power of town storage battery 20 according to a proportional division ratio that is calculated for the power generation increase amount of solar cell 1 between storage battery 3 and town storage battery 20 based on the SOC of storage battery 3 and the SOC of town storage battery 20.

Again referring to FIG. 5, excessive power prediction summation circuit 1605 in first operation plan creation circuit 1601 sums the excessive electric power in each consumer house 18 that is calculated by excessive power prediction circuit 1655 (FIG. 7) in consumer operation plan creation unit 1652 in each consumer house 18, and thereby outputs the excessive power prediction value in the entire smart town. Output suppression power summation circuit 1606 sums the estimation values of the power generation suppression amounts of solar cells 1 in the respective consumer houses 18 that are calculated by solar cell output suppression determination circuit 1656 (FIG. 7) in consumer operation plan creation unit 1652 in each consumer house 18, and thereby, outputs the power generation suppression amount (estimation value) of solar cell 1 in the entire smart town.

The outputs from excessive power prediction summation circuit 1605 and output suppression power summation circuit 1606 are input into each of town storage battery charge/discharge power decision circuit 1607 and town storage battery drooping characteristic generation circuit 1608. Town storage battery charge/discharge power decision circuit 1607 creates an operation plan (a charge/discharge plan) for town storage battery 20 based on the excessive power prediction value (sum total) in the entire smart town, and the power generation suppression amount (the sum total of the estimation values) of solar cells 1 in the entire smart town.

Then, referring to FIGS. 28 to 33, creation of a charge/discharge plan for town storage battery 20 will be described.

Figure 28:
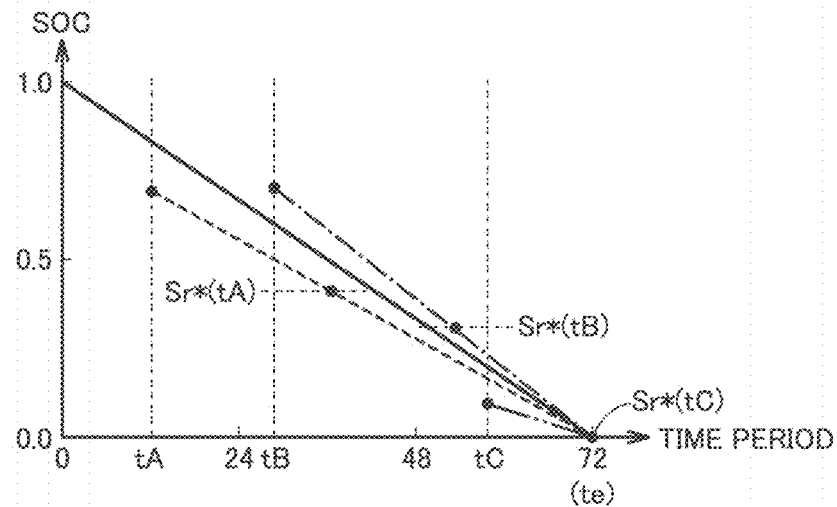
FIG. 28 is a conceptual diagram for illustrating a target SOC for a length of 24 hours for a town storage battery in the power system according to the present embodiment.

FIG. 28 shows a conceptual diagram for illustrating a target SOC for a length of 24 hours for town storage battery 20. In FIG. 28, the horizontal axis shows elapsed time period since occurrence of a power failure while the vertical axis shows the SOC of town storage battery 20.

In the power management system according to the present embodiment, CEMS 15 creates an operation plan for the purpose of continuously supplying electric power to an essential load such as a refrigerator in a time period during which 72 hours passes from occurrence of a power failure, as described above. Therefore, an original target SOC for a length of 72 hours in the case of town storage battery 20 in a fully-charged state (SOC=1.0) at occurrence of a power failure is set according to the solid line in the figure.

On the other hand, the target SOC of town storage battery 20 is created, for a length of 24 hours from the present point of time, based on the SOC actual result at the present point of time, such that SOC=0 after 72 hours since occurrence of a power failure.

For example, at the point of time tA at which A hours has passed since occurrence of a power failure, the target SOC (Sr*(tA)) of town storage battery 20 after 24 hours passed since time tA is calculated according to an approximation line (a dotted line in the figure) along which the SOC at time tA (the actual result value) decreases to SOC=0 at time to at which 72 hours has passed since occurrence of a power failure. In other words, Sr*(tA) is a point on the approximation line indicated by a dotted line. Thereby, the target SOC for a length of 24 hours is generated from time to along this approximation line.

Similarly, at time tB at which 24 hours or more has passed since occurrence of a power failure, the target SOC (Sr*(tB)) of town storage battery 20 after 24 hours has passed since time tB is calculated according to an approximation line (a dashed-dotted line in the figure) along which the SOC (actual result value) at time tB decreases to SOC=0 at time te. The target SOC for a length of 24 hours from time tB is generated along this approximation line.

Moreover, at time tC at which 48 hours or more has passed since occurrence of a power failure, the target SOC of town storage battery 20 at each point of time from time tC to time te is calculated along an approximation line (a chain double-dashed line in the figure) along which the SOC (actual result value) at time tC decreases to SOC=0 after 72 hours has passed since occurrence of a power failure.

Upon completion of calculation of the target SOC after 24 hours, town storage battery charge/discharge power decision circuit 1607 (FIG. 5) decides charge/discharge power of storage battery 3 in consumer house 18 and charge/discharge power of town storage battery 20 based on the prediction result for a length of 24 hours about the excessive electric power that occurs in a smart town.

Figure 29:
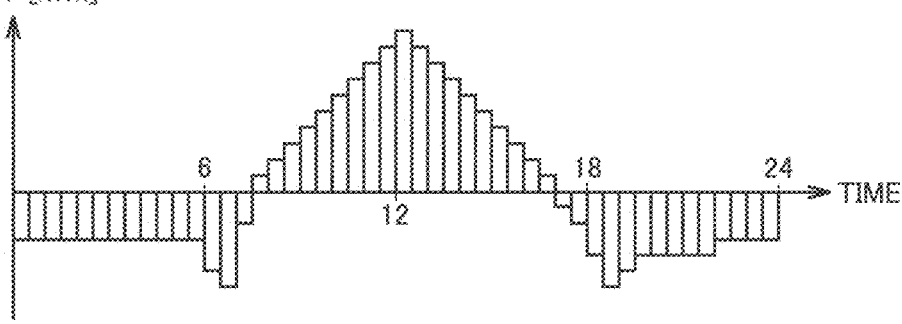
FIG. 29 is a graph showing an example of a prediction result of an excessive power amount at each time that occurs in a smart town.

FIG. 29 is a graph showing an example of a prediction result about the excessive power amount at each time that occurs in a smart town. The horizontal axis in FIG. 29 shows time from 0:00 to 24:00. The vertical axis in FIG. 29 shows excessive power amount prediction value at each time. The negative value of the excessive power amount prediction value means a shortage of electric power.

Referring to FIG. 29, in the nighttime during which solar cell 1 does not generate electric power, the prediction value for the excessive power amount is negative. Thus, supply of electric power in a smart town needs to be ensured by the output (discharge) from storage battery 3 and town storage battery 20. In the present embodiment, the supply power (discharge power) that is required based on the excessive power prediction result is divided proportionally between the charge/discharge power of town storage battery 20 and the charge/discharge power of storage battery 3 installed in each consumer house 18. For example, in the present embodiment, the above-mentioned supply power (discharge power) can be divided proportionally according to the ratio between: the power amount that can be supplied for charging, which is calculated from the SOC and the SOH of storage battery 3; and the power amount that can be supplied for charging for town storage battery 20, which is calculated from the SOC and the SOH of town storage battery 20. In this case, the power amount that can be supplied for charging is equivalent to the energy (kWh) that can be received from the present SOC to the fully-charged state.

In contrast, also when excessive electric power needs to be supplied for charging in the daytime during which solar cell 1 generates electric power in large quantity, the charge/discharge power of town storage battery 20 and the charge/discharge power of storage battery 3 in each consumer house 18, which are applied when excessive electric power is supplied for charging, can be divided proportionally according to the ratio of the power amount that can be supplied for charging. Alternatively, the charge/discharge power of town storage battery 20 and the charge/discharge power of storage battery 3 can be divided proportionally during charging according to the ratio of the power amount that can be supplied for charging and also can be divided proportionally during discharging according to the ratio of the charge energy (kWh).

When the charge/discharge power is divided proportionally in this way, town storage battery charge/discharge power decision circuit 1607 creates a charge/discharge plan (operation plan) for town storage battery 20 based on the result of such proportional division, and calculates transition of the SOC of town storage battery 20 based on the operation plan.

Figure 30:
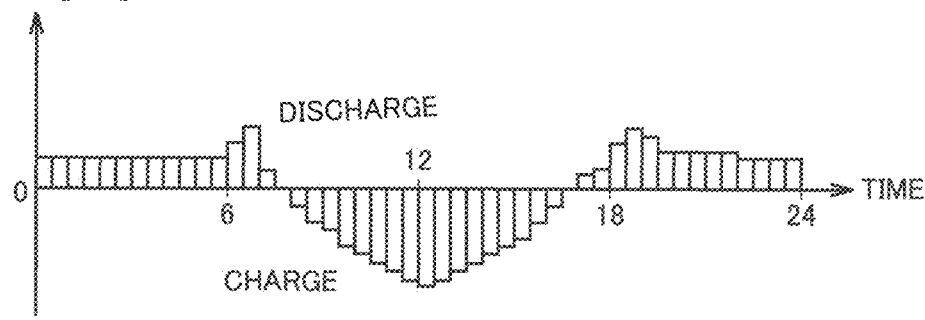
FIG. 30 is a graph showing an example of a plan for charge/discharge power of the town storage battery.

FIG. 30 is a graph showing an example of a plan for charge/discharge power of town storage battery 20. The horizontal axis in FIG. 30 shows time from 0:00 to 24:00 as in FIG. 29. The vertical axis in FIG. 30 shows the charge/discharge power target value for town storage battery 20 at each time.

Referring to FIG. 30, the charge/discharge power target value at each time has a positive value showing discharging of town storage battery 20 and a negative value showing charging of town storage battery 20. Thus, the charge/discharge power target value is calculated by multiplying the value, which is obtained by reversing positive and negative of the excessive power amount prediction value shown on the vertical axis in FIG. 29, by the proportional division ratio (0 to 1.0) obtained by town storage battery 20.

Figure 31:
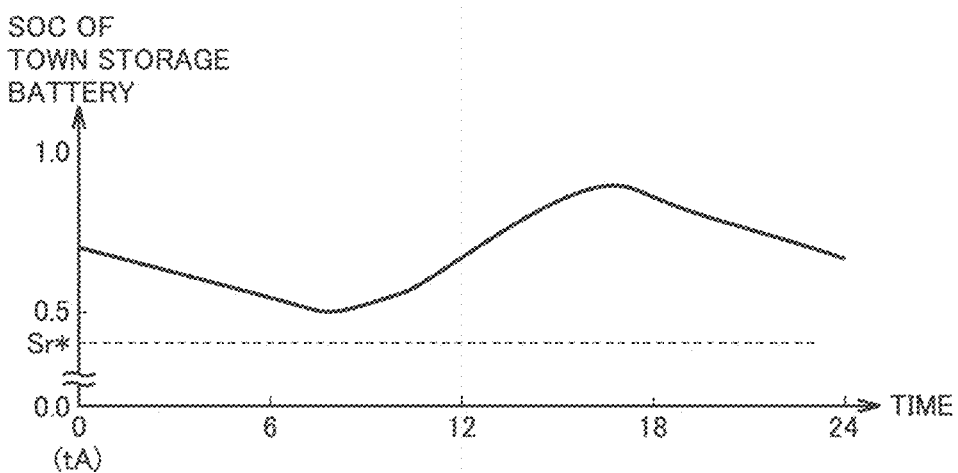
FIG. 31 is a graph showing an example of SOC transition in accordance with the operation plan for the town storage battery.

FIG. 31 shows an example of the calculation result about SOC transition of town storage battery 20 in accordance with the operation plan in FIG. 30. FIG. 31 also shows SOC transition for 24 hours from 0:00 to 24:00.

Referring to FIG. 31, SOC transition occurring when town storage battery 20 is charged or discharged according to the charge/discharge power target value shown in FIG. 30 can be calculated based on the SOC actual result at 0:00 as an initial value. It is understood that the SOC decreases until 7:30 and rises from 7:30 according to the charge/discharge plan shown in FIG. 31.

When SOC transition as shown in FIG. 31 is calculated, it is checked whether or not the SOC decreases below the target SOC (Sr*), as a target after 24 hours, within a time period of 24 hours. In the example in FIG. 31, the SOC of town storage battery 20 is higher than Sr* during 24 hours from time tA. However, if there is a time period during which the SOC decreases below Sr*, a charge/discharge plan (operation plan) for town storage battery 20 in FIG. 30 is created again. For example, the operation plan is modified so as to reduce the discharge power from town storage battery 20 during discharging.

Similarly, also for storage battery 3 in consumer house 18, creation of the charge/discharge plan (operation plan) and calculation of SOC transition according to the operation plan are performed in the same manner as in the case of town storage battery 20.

Figure 32:
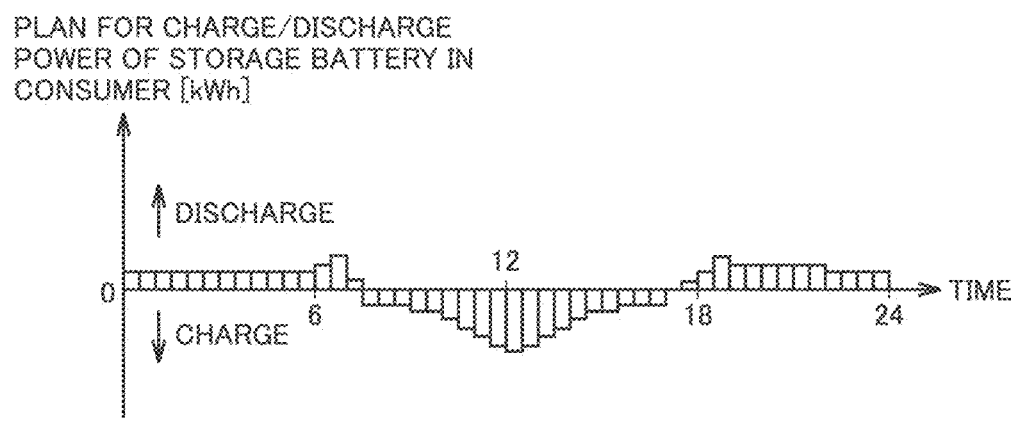
FIG. 32 is a graph showing an example of a plan for charge/discharge power of a storage battery in a consumer.

FIG. 32 shows a graph showing an example of a plan for charge/discharge power of storage battery 3 installed in consumer house 18. The horizontal axis in FIG. 32 shows time from 0:00 to 24:00 as in FIG. 30. The vertical axis in FIG. 32 shows the charge/discharge power target value for storage battery 3 (in the entire smart town) at each time.

Referring to FIG. 32, the charge/discharge power target value at each time has a positive value showing discharging of storage battery 3 and a negative value showing charging of storage battery 3. Thus, the charge/discharge power target value for storage battery 3 can be calculated by subtracting the charge/discharge power target value of town storage battery 20 shown on the vertical axis in FIG. 30 from the value that is obtained by reversing positive and negative of the excessive power amount prediction value shown on the vertical axis in FIG. 29.

Figure 33:
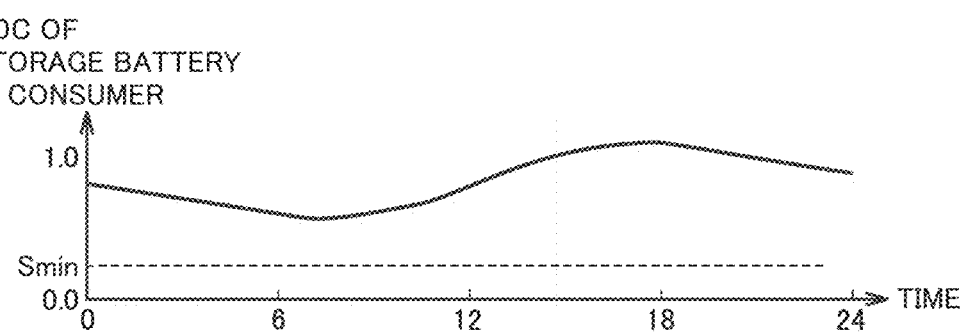
FIG. 33 is a graph showing an example of a calculation result about SOC transition in accordance with the operation plan for the storage battery in the consumer.

FIG. 33 shows an example of a calculation result about SOC transition of storage battery 3 according to the operation plan in FIG. 32. FIG. 33 also shows SOC transition for 24 hours starting from time tA (FIG. 28).

Referring to FIG. 33, SOC transition occurring when storage battery 3 is charged or discharged according to the charge/discharge power target value shown in FIG. 32 can be calculated based on the SOC actual result at time tA as an initial value. It is understood that, according to the charge/discharge plan shown in FIG. 32, the SOC decreases until 7:30 and rises from 7:30.

When SOC transition as shown in FIG. 33 is calculated, it is checked whether the SOC decreases to a control lower limit value Smin or not within a time period of 24 hours. Control lower limit value Smin can be set such that a margin is ensured with respect to SOC=0 in order to prevent overdischarge. In the example in FIG. 33, SOC>Smin throughout 24 hours from time tA. However, if there is a time period during which the SOC decreases below Smin, charge/discharge plans (operation plans) for town storage battery 20 and storage battery 3 in FIGS. 30 and 32 are created again. For example, the operation plan is modified so as to reduce the discharge power from storage battery 3 during discharging.

Creation of the operation plan based on prediction of the excessive power amount reflecting the weather forecast (FIGS. 29 to 33) as described above can be performed only when the weather forecast downloaded from cloud 23 is updated. Subsequently, correction of the operation plan based on the actual measurement result is cyclically made based on the operation plan, and thereby, the operation plan is created cyclically (in a 5-minute cycle or a 30-minute cycle). Specifically, the operation plan is corrected based on the power generation suppression amount (estimation value) calculated by solar cell output suppression determination circuit 1656 (FIG. 7). In addition, the power generation suppression amount is calculated to be a negative value when the electric power generated by solar cell 1 is smaller than the prediction value, and the discharge power from storage battery 3 and town storage battery 20 is relatively large.

When the operation plan is created in a 30-minute cycle, the operation plan is corrected based on the estimation result about the power generation suppression amount of solar cell 1 and on the basis of the actual measurement data that reflects the operation plan and that is obtained in a time period from 1 hour ago to 30 minutes ago. Specifically, when the electric power generated by solar cell 1 is suppressed for 30 minutes in this time zone and when it is determined that part of the generated electric power is discarded, the operation plan is corrected and created so as to charge storage battery 3 and town storage battery 20 with the generated electric power that is to be discarded. In this case, the charge power for each of storage battery 3 and town storage battery 20 can be proportionally divided between storage battery 3 and town storage battery 20 according to the SOC average value of storage battery 3 and the SOC of town storage battery 20. For example, in the present embodiment, much charge power is allocated to the battery with smaller SOC.

When the estimation result of the power generation suppression amount is a negative value, the discharge power from storage battery 3 and town storage battery 20 is divided proportionally according to the ratio between the SOC average value of storage battery 3 and the SOC of town storage battery 20. Specifically, the discharge power is divided proportionally to be larger as the SOC is higher, and thus, the operation plan is created in a 30-minute cycle.

When the operation plan in a 5-minute cycle (town storage battery 20) is created, the charge power of town storage battery 20 is determined based on the power generation actual result of solar cell 1, the power consumption actual result of load 5, the charge/discharge power actual result of storage battery 3, the charge/discharge power actual result of town storage battery 20, and the status information about the distributed power supply that are measured in a time period from 10 minutes ago to 5 minutes ago, and that reflect the operation plan output from solar cell output suppression determination circuit 1656.

In the case where the estimation value of the power generation suppression amount is positive, that is, in the case where it is estimated that solar cell 1 suppresses the generated electric power according to the trading power target value, town storage battery charge/discharge power decision circuit 1607 (FIG. 5) creates a corrected operation plan so as to reduce the discharge power of town storage battery 20 by the amount corresponding to the estimation value of the power generation suppression amount of solar cell 1 when the operation plan for town storage battery 20 shows discharging. Furthermore, in the case where the amount corresponding to the estimation value of the power generation suppression amount cannot be achieved even if the discharge power of town storage battery 20 is set at 0, the operation plan for town storage battery 20 is corrected from discharging to a charge mode in order to supply excessive electric power for charging. Moreover, when the operation plan for town storage battery 20 shows charging, the charge power of town storage battery 20 is increased by the amount corresponding to the estimation value of the power generation suppression amount of solar cell 1. In addition, when the increased charge power is greater than the maximum charge power (rating) of town storage battery power conversion device 21, the operation plan is created such that town storage battery power conversion device 21 charges town storage battery 20 with maximum charge power (rating).

On the other hand, when the estimation value of the power generation suppression amount is negative, that is, when the electric power generated by solar cell 1 is smaller than the prediction value and the electric power supplied from town storage battery 20 and storage battery 3 is greater than that of the operation plan, town storage battery charge/discharge power decision circuit 1607 (FIG. 5) creates the corrected operation plan so as to increase the discharge power of town storage battery 20 and storage battery 3. For example, proportional division of the power amount is determined based on the present SOC information and the target SOC after 24 hours of town storage battery 20 (FIG. 28), and the SOC of storage battery 3. Specifically, in the case where SOC transition of town storage battery 20 calculated as shown in FIG. 31 is not below the target SOC after 24 hours even when shortage power corresponding to the amount of the estimation value of the power generation suppression amount is supplied only from town storage battery 20, the shortage power is covered only by increasing the discharge power of town storage battery 20. On the other hand, when SOC transition of town storage battery 20 is below the target value after 24 hours, the operation plan is corrected on the precondition that storage battery 3 supplies part of the above-mentioned shortage power.

In this way, upon completion of creation of the operation plan for town storage battery 20 (including both creation by update of the weather forecast and creation by correction based on the power generation suppression amount of solar cell 1), the created operation plan is output to town storage battery drooping characteristic generation circuit 1608 (FIG. 5) and town storage battery operation plan creation circuit 1609 (FIG. 5).

The operation plan before correction based on the above-mentioned power generation suppression amount (estimation value) is also output to town storage battery drooping characteristic generation circuit 1608 (FIG. 5). Upon reception of the operation plan for town storage battery 20 from town storage battery charge/discharge power decision circuit 1607, town storage battery drooping characteristic generation circuit 1608 generates a drooping characteristic of town storage battery power conversion device 21.

Specifically, when the operation plan in a 30-minute cycle is created, correction of the operation plan based on the above-mentioned power generation suppression amount (estimation value) is also made for storage battery 3. Accordingly, a predetermined drooping characteristic is output to town storage battery power conversion device 21. As shown in FIG. 20, the drooping characteristic output to town storage battery power conversion device 21 is set to determine the AC system frequency with respect to excess/shortage power Pvl (FIG. 20) in contrast to the drooping characteristic output to the distributed power supply installed in consumer house 18. As described with reference to FIG. 20, as the drooping characteristic information about town storage battery power conversion device 21, CEMS 15 outputs four pieces of data including breakpoint power Pa, Bb, and inclinations kat, kbt to town storage battery power conversion device 21.

Then, generation of a drooping characteristic at the time when creating an operation plan in a 5-minute cycle will be described. The operation plan in a 5-minute cycle is created only for town storage battery 20. On the other hand, the distributed power supply installed in consumer house 18 operates based on the operation plan of which a notification is given in a 30-minute cycle. Thus, when the electric power generated by solar cell 1 is suppressed, the electric power generated by solar cell 1 needs to be increased without relying on creation (correction) of the operation plan.

In the power management system according to the present embodiment, the drooping characteristic is utilized to change the PV control target value and the BAT control target value as trading power target values at the system interconnection point in consumer house 18 for solar cell power conversion device 2 and storage battery power conversion device 4, respectively, thereby increasing the electric power supplied from each consumer house 18 to the distribution system.

Again referring to FIGS. 21 to 23, the operation of town storage battery power conversion device 21 using a drooping characteristic will be described. FIG. 21 shows: operation plans (W3, W4) of which consumer house 18 and town storage battery power conversion device 21 are notified in a 30-minute cycle; and prediction results about the power generation amount (W2) of solar cell 1 and the power consumption amount (W1) of load 5, based on which the operation plans are created.

In FIG. 21, the operation plan in a 30-minute cycle (for example, the operation plan for 30 minutes from 13:00) is created to be planned such that town storage battery 20 is discharged. However, according to the actual measurement results from 12:55 to 13:00, even when the electric power generated by solar cell 1 is greater than the prediction value and the generated electric power is suppressed as in FIG. 22, town storage battery 20 outputs the discharge power according to the operation plan from CEMS 15.

For storage battery 3 in consumer house 18, as described above, the trading power target value at the system interconnection point (consumer premises distribution system 10) in consumer house 18 that is an operation plan from CEMS 15 is processed, and thereby, the trading power target value for storage battery power conversion device 4 is set smaller than the trading power target value for solar cell power conversion device 2. Accordingly, even when discharge of storage battery 3 is planned at the time of creation of an operation plan, excessive electric power of solar cell 1 is supplied to storage battery 3 for charging until at least the maximum charge power by storage battery power conversion device 4 (i.e., the maximum charge power of storage battery 3) is reached. However, when the electric power that can be generated by solar cell 1 exceeds the maximum charge power of storage battery 3, this excessive amount of the generated electric power is suppressed.

The operation plan for town storage battery power conversion device 21 at 13:05 is created so as to estimate the suppression amount of the above-mentioned generated electric power and make a correction based on this estimation result. In the case shown in FIG. 22, the operation plan is created so as to supply the suppressed generated electric power for charging, and then, town storage battery power conversion device 21 is notified of this created operation plan. Upon reception of the above-mentioned operation plan, town storage battery power conversion device 21 changes the charge/discharge target value from 13:05.

On the other hand, since the operation plan transmitted to consumer house 18 is not changed, the electric power supplied from consumer house 18 to the distribution system (trading electric power) does not change. Accordingly, town storage battery power conversion device 21 continues discharging until the electric power supplied from consumer house 18 to the distribution system increases. However, since the charge/discharge power target value for town storage battery 20 has changed, excess/shortage power Pvl shown on the horizontal axis in FIG. 20 occurs (Pvl<0). In the present embodiment, the drooping characteristic of town storage battery power conversion device 21 is created such that the system frequency is set at 59.9 (Hz) based on the difference between a new operation plan value (charge/discharge power target value) and the original operation plan value (the charge/discharge power target value) created in a 30-minute cycle, for example, in the case in FIGS. 21 and 22.

By generating a drooping characteristic in this way, also in the case where the electric power supplied to a distribution system abruptly changes due to an abrupt change of solar radiation or an abrupt change of the load during the autonomous operation, the electric power supplied to the distribution system from the distributed power supply in consumer house 18 can be controlled without modifying the operation plan for consumer house 18.

In the case where the drooping characteristic is fixed to a default, the trading electric power from consumer house 18 cannot be controlled any more when the system frequency reaches the upper limit frequency (for example, 60.2 Hz) or the lower limit frequency (for example, 59.8 Hz) on the drooping characteristic according to the change in excess/shortage power Pvl. In contrast, in the present embodiment, the drooping characteristic can be changed such that the electric power supplied from the distributed power supply in consumer house 18 can be controlled to be increased or decreased, as described above. In addition, the inclination of the drooping characteristic can be set, for example, such that the electric power supplied from the distributed power supply in consumer house 18 to the distribution system becomes "0" at the upper limit frequency of the system frequency. Moreover, a default table can also be applied in the range in which the differential power is negative.

Again referring back to FIG. 27, the process of creating an operation plan by CEMS 15 will be described. As shown in FIGS. 24 and 25, generation of an operation plan in S115 (FIG. 25) is performed at each collection time for various pieces of measurement information, that is, in a 5-minute cycle in the present embodiment. In other words, the process in S121 to S128 in FIG. 27 is performed also in a 5-minute cycle.

Upon completion of various prediction processes for all of consumer houses 18 (determined as YES in S128), then in S129, CEMS 15 creates an operation plan for town storage battery 20.

Figure 34:
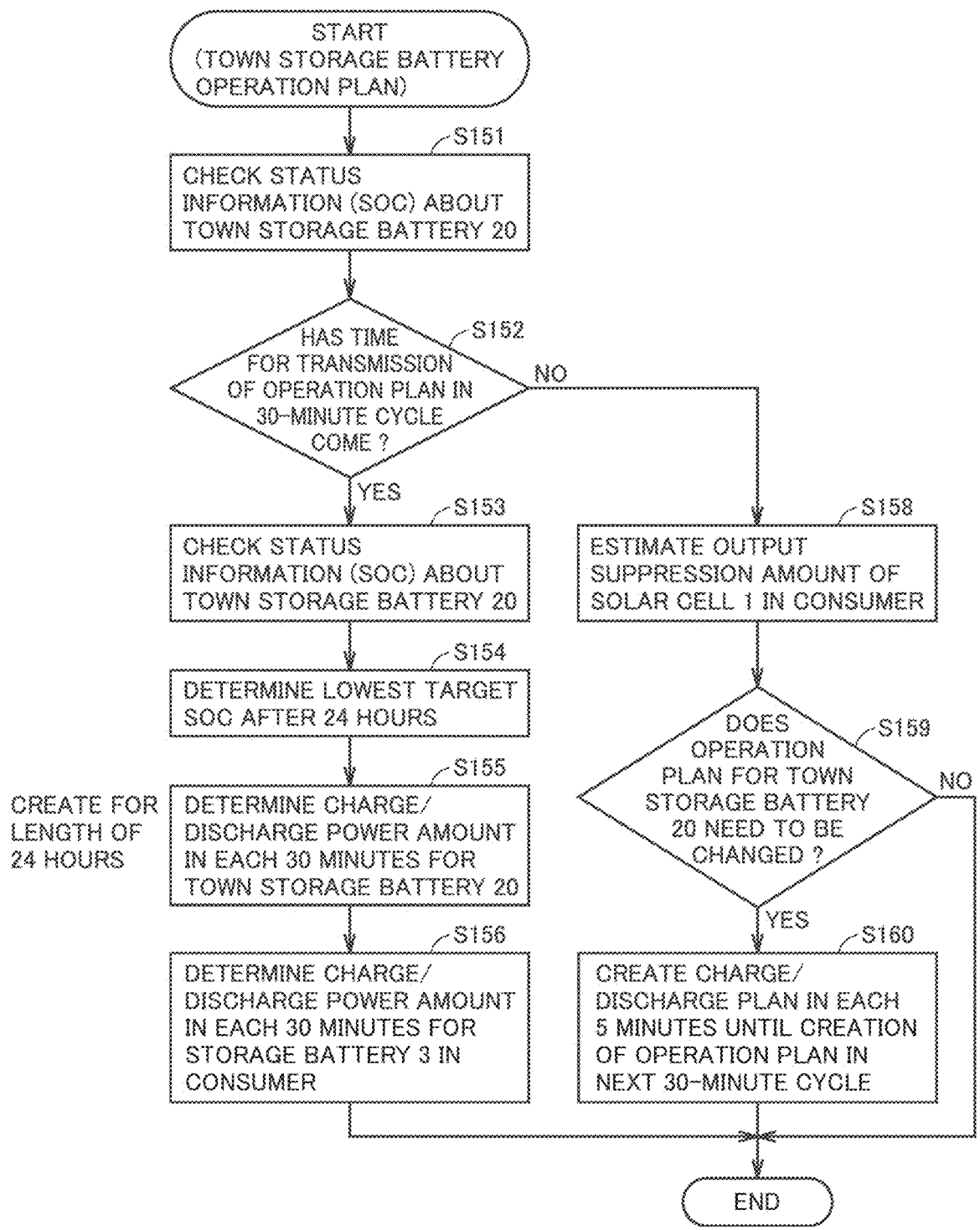
FIG. 34 is a flowchart illustrating details of a process in a step of creating an operation plan for the town storage battery in FIG. 27.

FIG. 34 is a flowchart illustrating details of a process in step 129 (the step of creating an operation plan for the town storage battery).

Referring to FIG. 34, in S151, CEMS 15 checks the status information (SOC, SOH, charge/discharge power amount, and the like) about town storage battery 20 that is provided from town storage battery power conversion device 21 and received by distributed power supply status management circuit 155 (FIG. 3) in a 5-minute cycle. In S152, CEMS 15 checks whether the time for creating an operation plan in a 30-minute cycle has come or not. Specifically, the operation plan creation time (timing) is managed by operation plan creation management circuit 161 (FIG. 3), and this operation plan creation management circuit 161 notifies operation plan creation circuit 160 about timing signals in a 5-minute cycle and a 30-minute cycle. Thus, determination in S152 can be performed depending on whether the timing signal (in a 30-minute cycle) has been input or not.

When the time for creating an operation plan in a 30-minute cycle has come (determined as YES in S152), then in S153, CEMS 15 again checks the SOC information about town storage battery 20. Furthermore, in S154, CEMS 15 generates a SOC target after 24 hours, as described with reference to FIG. 28. Furthermore, in S155, CEMS 15 creates an operation plan in each 30 minutes for town storage battery 20 for a length of 24 hours, as described with reference to FIGS. 30 to 32. As described above, the total value of excessive electric power from 1 hour ago to 30 minutes ago, starting from the time at which the present operation plan is reflected, can also be created based on each prediction result.

In this case, output suppression power summation circuit 1606 (FIG. 5) sums the power generation suppression amount of solar cell 1 for 30 minutes in each consumer house 18 that is estimated based on the measurement result from 1 hour ago to 30 minutes ago, which is output from solar cell output suppression determination circuit 1656 (FIG. 7). Based on the total value of the excessive electric power from 1 hour ago to 30 minutes ago that is output from excessive power prediction summation circuit 1605 (FIG. 5) and the output from solar cell output suppression determination circuit 1656 at this time, town storage battery charge/discharge power decision circuit 1607 (FIG. 5) estimates an error between the power generation prediction result about solar cell 1 based on the weather forecast and the power consumption prediction result about load 5.

Since the present embodiment has been described with regard to the autonomous operation during a power failure, a control error is dominantly a prediction error about the electric power generated by solar cell 1 based on the weather forecast. Then, a method of estimating a suppression amount of a power generation amount will be simply described again with reference to FIGS. 21 and 22, the details of which will be described later.

FIG. 21 shows the prediction value about the power generation amount of solar cell 1 in consumer house 18 that is created based on the weather forecast, the prediction value about the power consumption amount of load 5, and the operation plan for storage battery 3 and town storage battery 20. Similarly, FIG. 22 shows the actual power consumption amount of load 5, the actual power generation amount of solar cell 1, the actual charge/discharge power amount of storage battery 3, and the actual charge/discharge power amount of town storage battery 20.

As understood from FIGS. 21 and 22, at least the sum of: (discharge power (plan value)–charge power actual result (positive in case of discharging and negative in case of charging)) of storage battery 3 in consumer house 18; and (consumed electric power (plan value)–consumed electric power (actual result value)) is a power generation prediction error for solar cell 1. Moreover, when the control mode of solar cell 1 is a voltage control mode, it is determined that solar cell 1 suppresses the generated electric power. This control mode can be detected according to the status information about solar cell 1.

When it is determined that solar cell 1 suppresses the generated electric power, the power generation amount of solar cell 1 at cancellation of output suppression is predicted. In the present embodiment, an ideal power generation amount of solar cell 1 at each time that is calculated based on the installation position information (latitude and longitude) and the installation orientation (including the installation angle information) about solar cell 1 is stored in advance as a database in power generation prediction circuit 157 (FIG. 3). For example, in the present embodiment, in order to create an operation plan in a 5-minute cycle, an ideal value of the amount of solar radiation of solar cell 1 is calculated based on the above-mentioned installation position and installation angle of solar cell 1. Furthermore, an ideal value of the power generation amount of solar cell 1 for 5 minutes is calculated based on the calculated ideal amount of solar radiation and stored in the database in advance.

The power generation amount at each time (the power generation amount for 5 minutes in the operation plan in a 5-minute cycle and the power generation amount for 30 minutes in the operation plan in a 30-minute cycle) is read from the database, and thereby, the ratio of the actually measured generated electric power to the ideal generated electric power can be calculated. Furthermore, the ideal power generation amount at which the operation plan is calculated at this time (the power generation amount for 5 minutes in the operation plan in a 5-minute cycle and the power generation amount for 30 minutes in the operation plan in a 30-minute cycle) is read from the database and multiplied by the above calculated ratio of the generated electric power. Thereby, the power generation amount at cancellation of output suppression can be estimated.

Moreover, when the actually measured electric power generated by solar cell 1 in consumer house 18 is smaller than the power generation amount prediction result, and when storage battery 3 is discharged, it can be determined that the actual generated electric power is smaller than the power generation amount prediction result. In this case, the ratio between the power generation amount prediction result and the actually measured generated electric power is calculated. Then, the prediction value about the power generation amount of solar cell 1 at which the operation plan is calculated at this time is multiplied by the calculated ratio of the generated electric power, and thereby, the actual power generation amount can be estimated.

Again referring to FIG. 34, in S155, CEMS 15 estimates excessive electric power based on the above-mentioned prediction value about the power generation amount (the sum of electric power generated by solar cells 1 in all consumer houses 18 in a smart town) and the power consumption prediction result of load 5 (the sum of the electric power consumed by loads 5 in all consumer houses 18 in a smart town). Then, by town storage battery charge/discharge power decision circuit 1607 (FIG. 5), excessive electric power is divided proportionally between town storage battery 20 and storage battery 3 based on the excessive power estimation result, the SOC of town storage battery 20 and the SOC of storage battery 3, thereby deciding the charge/discharge power target value for town storage battery 20 (for a length of 24 hours in each 30 minutes).

Upon completion of decision of the charge/discharge power target value for town storage battery 20 in this way, town storage battery drooping characteristic generation circuit 1608 (FIG. 5) generates, in the above-mentioned manner, the drooping characteristic of which town storage battery power conversion device 21 is notified. The outputs from town storage battery charge/discharge power decision circuit 1607 and town storage battery drooping characteristic generation circuit 1608 are input into town storage battery operation plan creation circuit 1609 (FIG. 9). In this case, the charge/discharge plan for town storage battery 20 is input into consumer system interconnection point power generation circuit 1610 (FIG. 5). In consumer system interconnection point power generation circuit 1610, the trading power target value (operation plan) at the system interconnection point in consumer house 18 for a length of 24 hours in each 30 minutes is generated based on the outputs from excessive power prediction circuit 1655 and solar cell output suppression determination circuit 1656, and the charge/discharge plan for town storage battery 20.

Specifically, the total value of the charge/discharge power of storage batteries 3 in all consumer houses 18 for a length of 24 hours in each 30 minutes is first generated, based on the above-mentioned power generation prediction value for solar cell 1 (the sum of the electric power generated by solar cells 1 in all of consumer houses 18 in a smart town), the power consumption prediction value for load 5 (the sum of the electric power consumed by loads 5 in all of consumer houses 18 in a smart town), and the charge/discharge power target value for town storage battery 20. Specifically, (power generation prediction value for solar cell 1)−(power consumption prediction value for load 5)−(charge/discharge power target value for town storage battery 20) is calculated in each 30 minutes. When the charge/discharge power target value (sum) of storage batteries 3 in all of consumer houses 18 is calculated by the above calculation, the charge/discharge power target value (sum) is divided proportionally among consumer houses 18.

In the present embodiment, when the charge/discharge power target value is negative (i.e., during charging), the charge/discharge power target value (total value) is divided proportionally such that much charge power is allocated to storage battery 3 with low SOC according to the ratio of the SOC of storage battery 3. Specifically, for each consumer house 18, $\Delta SOC = 1.0 - SOC$ (actual result) is calculated and $\Delta SOC$ of all consumer houses 18 in a smart town are summed to thereby calculate/($\Delta SOC$). Furthermore, the charge/discharge power target value for each consumer house 18 can be calculated by multiplying the charge/discharge power target value (sum) in all of consumer houses 18 and ($\Delta SOC/(\Delta SOC)$) in each consumer house 18.

On the other hand, when the charge/discharge power target value is positive (i.e., during discharging), the charge/discharge power target value (total value) is divided proportionally such that much discharge power is allocated to storage battery 3 with high SOC according to the ratio of the SOC of storage battery 3. Specifically, the charge/discharge power target value for each consumer house 18 can be calculated by multiplying the charge/discharge power target value (sum) in all of consumer houses 18 and ($SOU/\Sigma(\Delta SOC)$) in each consumer house 18.

In the next time zone (30 minutes), based on the SOC obtained after storage battery 3 in each consumer house 18 is charged or discharged according to the above-mentioned proportional division, the above-mentioned $\Delta SOC/\Sigma(\Delta SOC)$ or $SOC/\Sigma(\Delta SOC)$ is calculated again, and thereby, the charge/discharge power target value (sum) in all of consumer houses 18 in this time zone can be divided proportionally at the charge/discharge power target value for each consumer house 18.

Upon completion of calculation of the charge/discharge power target value for storage battery 3 in each consumer house 18, consumer system interconnection point power generation circuit 1610 (FIG. 5) determines the trading power target value at the system interconnection point (consumer premises distribution system 10) in consumer house 18 based on the power generation estimation value about solar cell 1 in each consumer house 18, the power consumption prediction value about load 5, and the proportionally divided charge/discharge power target value for storage battery 3. Specifically, by calculation of (power generation prediction value about solar cell 1)−(power consumption prediction value about load 5)+(proportionally divided charge/discharge power target value for storage battery 3), the trading power target value at the system interconnection point in consumer house 18 for a length of 24 hours in each 30 minutes is generated. Upon completion of generation of the trading power target value (operation plan) at the system interconnection point in each consumer house 18 by consumer system interconnection point power generation circuit 1610 (FIG. 5), second operation plan creation circuit 1657 (FIG. 7) is notified of the result.

When second operation plan creation circuit 1657 (FIG. 7) is notified of the trading power target value (operation plan) at the system interconnection point in each consumer house 18, consumer distributed power supply drooping characteristic generation circuit 1661 (FIG. 8) generates, in the above-mentioned manner, the drooping characteristics of solar cell power conversion device 2 and storage battery power conversion device 4 based on the power generation prediction value (after correction) for solar cell 1 and the power consumption prediction value for load 5 as mentioned above. The generated drooping characteristic is output to operation plan correction circuit 1662 (FIG. 8) and data transmission management circuit 153 (FIG. 3).

Operation plan correction circuit 1662 calculates transition of the SOC of storage battery 3 based on the trading electric power at the system interconnection point in each consumer (operation plan), the above-mentioned estimation result about the power generation amount (after correction), and the SOC information and the power consumption prediction result about load 5, and checks whether or not the SOC does not deviate from a predetermined range (between 0.0 and 1.0 in the present embodiment). When the SOC deviates from this range, the operation plan is corrected (S156). When S156 ends, operation plan creation circuit 160 determines that creation of the operation plan in a 30-minute cycle completes, and then waits until a next operation plan creation instruction is input from operation plan creation management circuit 161.

Again referring to FIG. 34, when the time for creating an operation plan in a 30-minute cycle has not come (determined as NO in S152), that is, when the timing for creating an operation plan in a 5-minute cycle has come, then in S158, CEMS 15 estimates the power generation suppression amount of solar cell 1 in each consumer house 18. At this time, solar cell output suppression determination circuit 1656 (FIG. 7) in consumer operation plan creation unit 1652 (FIG. 6) estimates the power generation suppression amount.

Figure 35:
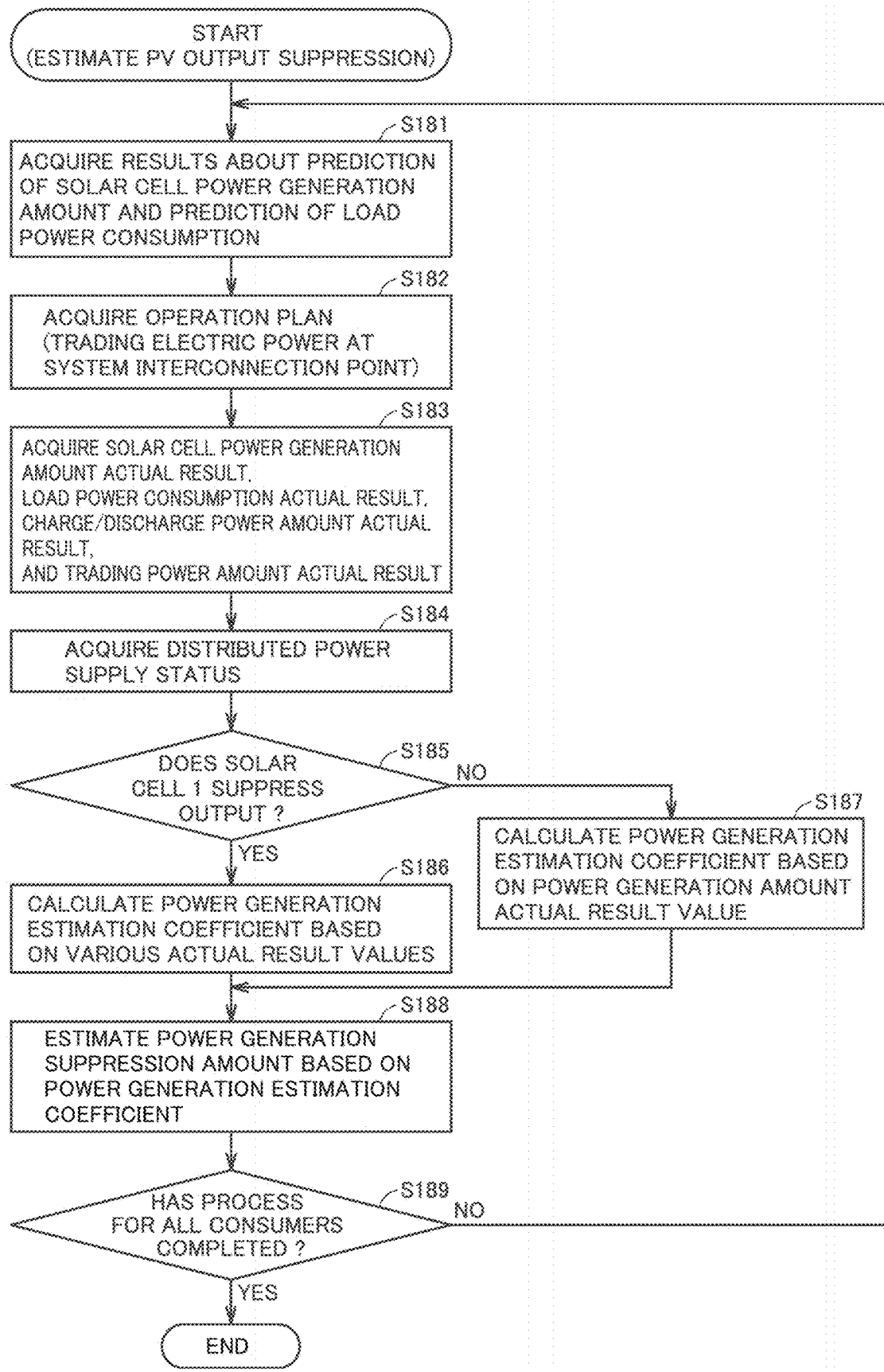
FIG. 35 is a flowchart illustrating details of a process in a step of estimating a power generation suppression amount for a solar cell in FIG. 34.

FIG. 35 is a flowchart illustrating details of a process in step S158 (the step of estimating the power generation suppression amount for solar cell 1).

Referring to FIG. 35, when estimation of the control amount of the voltage of the electric power generated by solar cell 1 in consumer house 18 (S158) is started, then in S181, CEMS 15 acquires the power generation prediction value about solar cell 1 in consumer house 18 based on the weather forecast and the power consumption prediction value about load 5 by power generation prediction circuit 157 (FIG. 3) and power consumption prediction circuit 158 (FIG. 3).

Then, in S182, CEMS 15 acquires the operation plan transmitted to consumer house 18. Furthermore, in S183, CEMS 15 acquires the power generation actual result about solar cell 1, the charge/discharge power actual result about storage battery 3, the power consumption actual result about load 5, and the trading power actual result at the system interconnection point (consumer premises distribution system 10) by distributed power supply status management circuit 155 (FIG. 3), power generation actual result management circuit 156 (FIG. 3), and power consumption actual result management circuit 159 (FIG. 3).

In S184, CEMS 15 collects the control mode (MPPT control/voltage control) and the status information (stop/power generation/standby) of solar cell 1, and the SOC and SOH information about storage battery 3 from distributed power supply status management circuit 155 (FIG. 3).

Upon completion of reading of the status information about the distributed power supply in S184, then in S185, CEMS 15 determines whether solar cell output suppression determination circuit 1656 suppresses the electric power generated by solar cell 1 or not, that is, whether the output is suppressed or not. In S185, it is determined that the output is suppressed at least when the control mode of solar cell 1 is a voltage control mode. Also when storage battery 3 is charged with maximum charge power, it can be determined that the output from solar cell 1 is suppressed.

When it is determined that the output from solar cell 1 is suppressed (determined as YES in S185), then in S186, CEMS 15 causes solar cell output suppression determination circuit 1656 (FIG. 7) to calculate the power generation estimation coefficient. Specifically, the power generation amount at this time (the power generation amount for 5 minutes in the operation plan in a 5-minute cycle or the power generation amount for 30 minutes in the operation plan in a 30-minute cycle) is read from the database of the ideal power generation amount of solar cell 1 at each time that is stored in advance in power generation prediction circuit 157 (FIG. 3). As described above, the ideal power generation amount stored in the database is calculated in advance based on the installation position information (latitude and longitude) and the installation orientation (including the installation angle information) about solar cell 1.

In S186, the ratio of the generated electric power calculated based on various pieces of actually measured data to the ideal generated electric power based on the database (hereinafter referred to as a power generation estimation coefficient) is calculated. Specifically, as described above, the sum of: (discharge power (plan value)−charge power actual result (positive in case of discharging and negative in case of charging)) of storage battery 3 in consumer house 18; and (power consumption amount (plan value)−power consumption amount (actual result value)) corresponds to the prediction error about the electric power generated by solar cell 1. Thus, in this case, when storage battery 3 is not charged with maximum charge power (rating), this prediction error about the electric power generated by solar cell 1 is added to the original power generation prediction value about solar cell 1 based on the weather forecast. Thereby, the power generation estimation value for solar cell 1 can be calculated.

On the other hand, when storage battery 3 is charged with maximum charge power, it is determined that the output from solar cell 1 is suppressed. Accordingly, in this case, the ideal value of the generated electric power at which the actual measurement data is collected can be read from the database in power generation prediction circuit 157. Furthermore, the power generation estimation value for solar cell 1 is calculated using the read data in a 5-minute cycle. Specifically, (charge/discharge power amount (plan value in each 5 minutes))−(charge/discharge power amount actual result (measurement value in each 5 minutes))+(power consumption amount (plan value for 5 minutes))−(power consumption amount (actual result value for 5 minutes))+(generated electric power created based on the weather forecast (prediction value for 5 minutes)) is calculated in each 5 minutes for a length of 30 minutes, that is, 6 pieces of data ((30/5)=6) are added, thereby allowing calculation of the power generation amount estimation value for 30 minutes. The power generation amount estimation value for 30 minutes calculated in this way is divided by the ideal value of the power generation amount in the same time zone (30 minutes) that is read from the database, and thereby, a power generation estimation coefficient can be calculated. It is understood that the power generation estimation coefficient calculated in this way is equivalent to the parameter used for quantitatively estimating the ratio of the actually generated electric power under the amount of solar radiation in the present weather to the ideal electric power generated by solar cell 1.

When it is determined that the output from solar cell 1 is not suppressed (determined as NO in S185), then in S187, CEMS 15 calculates the power generation estimation coefficient based on the power generation amount actual result about solar cell 1. When the process in S185 is determined as NO, solar cell 1 is under MPPT control by solar cell power conversion device 2. Accordingly, it can be estimated that the actual measurement value of the power generation amount of solar cell 1 shows the power generation actual result by the electric power that can be generated in the present weather (the amount of solar radiation). Thus, the power generation amount (the actual measurement value) of solar cell 1 is divided by the above-mentioned ideal value of the power generation amount that is read from the database, and thereby, a similar power generation estimation coefficient can be calculated.

Upon completion of calculation of the power generation estimation coefficient in S186 or S187, then in S188, CEMS 15 calculates the power generation estimation value for solar cell 1 based on the calculated power generation estimation coefficient. Specifically, solar cell output suppression determination circuit 1656 (FIG. 7) reads the ideal value of the power generation amount for a length of 24 hours based on the installation position and the installation angle of solar cell 1 from the above-mentioned database in power generation prediction circuit 157 (FIG. 3). Solar cell output suppression determination circuit 1656 multiplies the ideal value of the generated electric power based on the read power generation amount by the above-mentioned power generation estimation coefficient, to thereby generate a power generation estimation value for solar cell 1 in a 5-minute cycle (the estimation result about the actual result value of the generated electric power) for a length of 24 hours.

In S188, upon completion of calculation of the power generation estimation value of solar cell 1, solar cell output suppression determination circuit 1656 (FIG. 7) can further calculate the charge/discharge power target value for storage battery 3 (the operation plan) based on: the above-mentioned power generation prediction result based on the weather forecast for solar cell 1 in consumer house 18; the power consumption prediction result about load 5; and the operation plan transmitted to consumer house 18. Then, by subtracting the power generation actual result about solar cell 1, the charge/discharge power target value for storage battery 3, the power consumption actual result value of load 5, and the trading power actual result value at the system interconnection point (consumer premises distribution system 10) from the above-mentioned power generation estimation value for solar cell 1 in a 5-minute cycle, the power generation suppression amount (estimation value) of solar cell 1 in a 5-minute cycle can also be further calculated.

Upon completion of generation of the power generation estimation value and the power generation suppression amount (estimation value) for solar cell 1 (for a length of 24 hours) in S188, then in S189, CEMS 15 checks whether generation of the power generation estimation values and the power generation suppression amounts (estimation values) for all of consumer houses 18 has completed or not. When this generation has not completed (determined as NO in S189), the process is returned to S181, and then, the process in S181 to S188 for each consumer house 18 is performed. On the other hand, when generation of the power generation amount estimated values and the power generation suppression amounts (estimation values) for all of consumer houses 18 has completed (determined as YES in S189), CEMS 15 ends output suppression amount estimation for solar cell 1 in consumer house 18 (S158 in FIG. 34).

Again referring to FIG. 34, upon completion of the process in S158, then in S159, CEMS 15 determines whether the operation plan for town storage battery power conversion device 21 in the next 5-minute cycle needs to be changed or not. Specifically, in S159, first operation plan creation circuit 1601 (FIG. 4) compares the power generation suppression amount (estimation value) of solar cell 1 in the next 5-minute cycle with a predetermined reference value. When the power generation suppression amount (estimation value) is less than the reference value, the process in S159 is determined as NO. Then, creation of the operation plan for town storage battery 20 (S129 in FIG. 27) is ended.

On the other hand, when the power generation suppression amount (estimation value) is equal to or greater than the reference value, CEMS 15 determines that the operation plan needs to be changed. Thus, the process in S159 is determined as YES. Thereby, in S160, CEMS 15 creates a charge/discharge plan in each 5 minutes until creation of an operation plan in the next 30-minute cycle in order to change the operation plan (the charge/discharge plan) for town storage battery 20.

Figure 36:
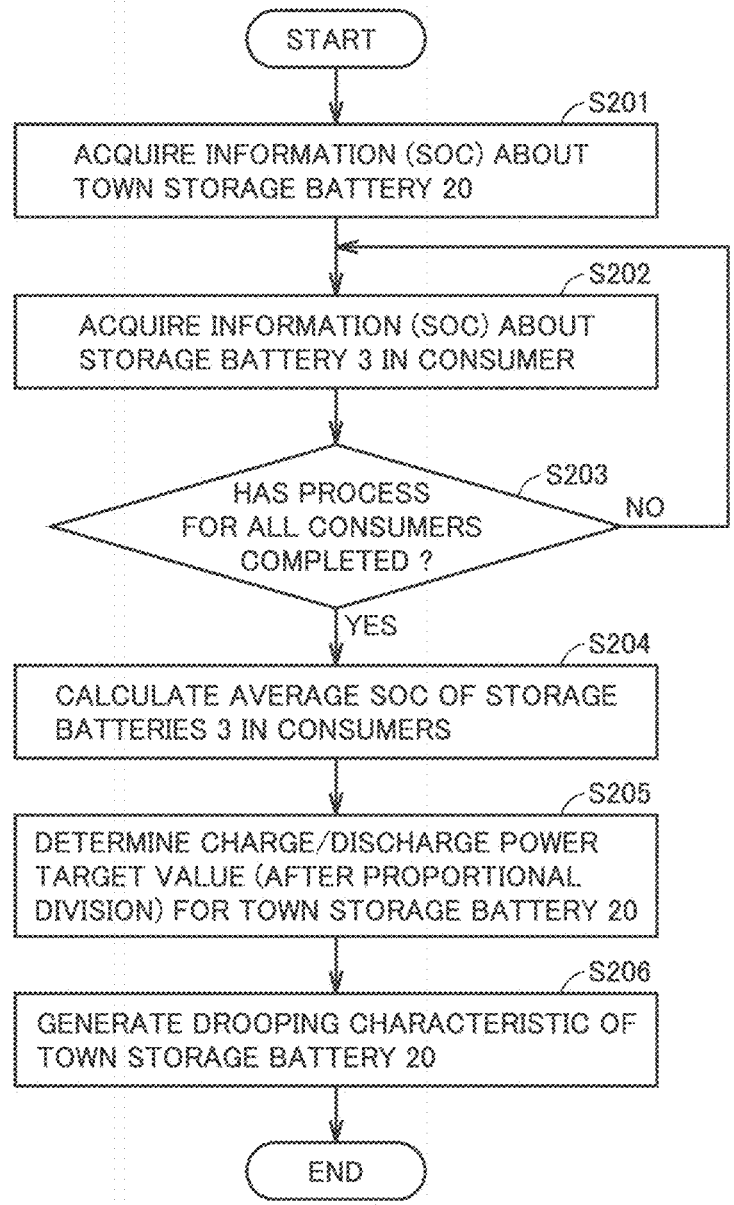
FIG. 36 is a flowchart illustrating details of a process in a step of changing the operation plan for the town storage battery in FIG. 34.

FIG. 36 is a flowchart illustrating details of a process in step S160 (the step of changing the operation plan for town storage battery 20).

Referring to FIG. 36, in S201, CEMS 15 acquires the status information (SOC) about town storage battery 20. Upon completion of acquisition of the status information about town storage battery 20 (S201), then in S202, CEMS 15 acquires the status information (SOC) about storage battery 3 in consumer house 18. Specifically, in S201 and S202, first operation plan creation circuit 1601 (FIG. 3) acquires the status information from distributed power supply status management circuit 155 (FIG. 3) and the like. The process in S202 is repeatedly performed until the status information (SOC) about storage battery 3 is acquired from all of consumer houses 18 (determined as NO in S203).

When the status information (SOC) about storage battery 3 is acquired from all of consumer houses 18 (determined as YES in S203), then in S204, CEMS 15 calculates an average SOC of storage batteries 3 in all of consumer houses 18.

Upon completion of calculation of the average SOC (S204), then in S205, CEMS 15 creates a charge/discharge power target value (a plan value) for town storage battery 20 of which town storage battery charge/discharge power decision circuit 1607 in first operation plan creation circuit 1601 notifies town storage battery power conversion device 21. Specifically, based on the power generation suppression amount (estimation value) of solar cell 1 in a 5-minute cycle that is calculated in S188 (FIG. 35), the proportionally divided electric power for town storage battery 20 can be determined.

Specifically, when the power generation suppression amount of solar cell 1 is positive (when further generated electric power can be extracted from solar cell 1), the suppressed generated electric power can be divided proportionally between town storage battery 20 and storage battery 3 in consumer house 18 for charging. In this case, much charge power is allocated to the low SOC side according to the ratio between the SOC of town storage battery 20 and the average SOC of storage battery 3.

Specifically, using the SOC (SOCtw) of town storage battery 20 and the average SOC (SOCav) of storage battery 3 in consumer house 18, proportionally divided electric power Ptw included in power generation suppression amount (estimation value) Psp of solar cell 1 and supplied to town storage battery 20 for charging can be calculated according to the following equation (1).

$$Ptw=(1.0-SOCtw)/\{(1.0-SOCtw)+(1.0-SOCav)\} \cdot Psp \quad (1)$$

Similarly, proportionally divided electric power Pusr included in power generation suppression amount (estimation value) Psp of solar cell 1 and supplied to storage battery 3 in consumer house 18 (entire) for charging can be calculated according to the following equation (2).

$$Pusr=(1.0-SOCav)/\{(1.0-SOCtw)+(1.0-SOCav)\} \cdot Psp \quad (2)$$

Furthermore, as the proportionally divided electric power for storage batteries 3 among consumer houses 18, proportionally divided electric power Pusr(x) included in power generation suppression amount (estimation value) Psp of solar cell 1 and supplied to storage battery 3 of the x-th (x: natural number) consumer house 18 for charging can be calculated according to the following equation (3). In the equation (3), SOCx shows the SOC of storage battery 3 in the x-th consumer house 18, and Σ/(ΔSOCx) shows the total value of (1.0−SOCx) in all of consumer houses 18.

$$Pusr(x)=(1.0-SOCx)/\Sigma(\Delta SOCx) \cdot Pusr \quad (3)$$

On the other hand, when the power generation suppression amount of solar cell 1 is negative (when the power generation amount of solar cell 1 is less than the generated electric power predicted by the weather forecast), shortage power can be divided proportionally between town storage battery 20 and storage battery 3 in consumer house 18, for discharging. In this case, much discharge power is allocated to the high SOC side according to the ratio between the SOC of town storage battery 20 and the average SOC of storage battery 3.

Specifically, proportionally divided electric power Ptw included in power generation suppression amount (estimation value) Psp of solar cell 1 and discharged from town storage battery 20 can be calculated according to the following equation (4).

$$Ptw=SOCtw/(SOCtw+SOCav) \cdot Psp \quad (4)$$

Similarly, proportionally divided electric power Pusr included in power generation suppression amount (estimation value) Psp of solar cell 1 and discharged from storage battery 3 in consumer house 18 (entire) can be calculated according to the following equation (5).

$$Pusr=SOCav/(SOCtw+SOCav) \cdot Psp \quad (5)$$

Moreover, proportionally divided electric power Pusr(x) included in power generation suppression amount (estimation value) Psp of solar cell 1 and discharged from storage battery 3 in the x-th (x: natural number) consumer house 18 can be calculated according to the following equation (6). It should be noted that Σ(SOCx) in the equation (6) shows the total value of SOCx of all consumer houses 18.

$$Pusr(x)=SOCx/\Sigma(SOCx) \cdot Pusr \quad (6)$$

In the present embodiment, after completion of creation of the operation plan in a 5-minute cycle as mentioned above, the SOC is calculated from the above-mentioned proportionally divided electric power, for 5 minutes, of each of town storage battery 20 and storage battery 3 in each consumer house 18. Then, based on the calculation result, the operation plan for town storage battery 20 in the next 5-minute cycle is created. This process is repeated until the operation plan for a length of 24 hours is created.

Upon determination of the proportionally divided electric power (charge/discharge power) of town storage battery 20 for a length of 24 hours (S205), then in S206, CEMS 15 generates a drooping characteristic of which town storage battery 20 is notified. Specifically, based on the proportionally divided electric power (charge/discharge power) of town storage battery 20 output from town storage battery charge/discharge power decision circuit 1607 (FIG. 5), town storage battery drooping characteristic generation circuit 1608 (FIG. 5) generates, in the manner as described above, a drooping characteristic of which town storage battery power conversion device 21 is notified. Thereby, the process in S160 in FIG. 34 ends.

Again referring to FIG. 34, upon completion of the process in S160, CEMS 15 returns the process to FIG. 27 and performs S130. In S130, CEMS 15 determines whether the operation plan creation time for each consumer storage battery 3 has come or not. Specifically, based on the created operation plan (the trading power target value at the system interconnection point), determination in S130 can be made depending on whether or not collection of various pieces of actual result data obtained until 30 minutes ago from 1 hour before the time of starting control of the distributed power supply in consumer house 18 has completed or not.

When collection of data has not completed, the process in S130 is determine as NO, and the operation plan creation is ended. On the other hand, when collection of data has completed, CEMS 15 determines the process in S130 as YES, and then in S131, creates an operation plan for a length of 24 hours for storage battery 3 in a consumer. Specifically, operation plan correction circuit 1662 (FIG. 8) calculates the trading power target value at the system interconnection point (consumer premises distribution system 10) in each consumer house 18 based on the operation plan for storage battery 3 for a length of 24 hours in a 30-minute cycle that is generated in S156, the power generation estimation value of solar cell 1 (the estimation result about the actual result value of the generated electric power), and the power consumption prediction result of load 5.

Upon completion of calculation of the trading power target value, a drooping characteristic of which the distributed power supply in each consumer house 18 is notified is further generated based on the calculated trading power target value (operation plan). Since generation of the drooping characteristics of which solar cell power conversion device 2 and storage battery power conversion device 4 are notified is as described above, the detailed description thereof will not be repeated. Upon completion of generation of the operation plan for storage battery 3 in consumer house 18 (the charge/discharge power target value at a system interconnection point and the drooping characteristics of which solar cell power conversion device 2 and storage battery power conversion device 4 are notified) in S131, the operation plan in a 5-minute cycle is transmitted to town storage battery power conversion device 21 in S116 in FIG. 25, and thereafter, the process is returned to S103 in FIG. 24. In this way, a series of controlling processes for the autonomous operation as described above can be repeatedly performed at occurrence of a power failure.

As described above, according to the power management system in the present embodiment, in the autonomous operation during a power failure, town storage battery power conversion device 21 operates as a voltage source of the AC distribution system using energy stored in town storage battery 20 while the distributed power supplies (solar cell 1 and/or storage battery 3) on the consumer house 18 side is operated as a current source. Furthermore, town storage battery 20 and the distributed power supplies in consumer house 18 cooperate and coordinate with each other to support the distribution system during a power failure, to thereby allow flexible handling of an abrupt change of the load (for example, use of high power devices such as an IH cooking heater and a microwave oven) and the like as compared with the case where an autonomous operation is performed in the state disconnected from the distribution system in each consumer house 18. In other words, the capability to handle the autonomous operation in a management section (a smart town) is enhanced.

Moreover, the autonomous operation using the capacities of both storage battery 3 in each consumer house 18 and town storage battery 20 can be implemented. Thus, since the battery capacity on the consumer house 18 side that is required for ensuring the LCP at the same level is reduced, the house purchase cost can also be reduced.

In particular, based on the charge energy (SOC) of each storage battery 3 and town storage battery 20, the power generation amount prediction for solar cell 1, and the power consumption prediction result about load 5, the operation plans for town storage battery 20 and the distributed power supplies on the consumer house 18 side are created to manage the electric power supplied in the entire smart town. Accordingly, even when there are variations in SOC of storage batteries 3 in each consumer house 18, there is still an effect that a long-term autonomous operation can be performed with stability.

When the power generation amount prediction for solar cell 1 is incorrect, town storage battery 20 may be unnecessarily discharged despite that electric power generated by solar cell 1 is suppressed. However, in the power management system according to the present embodiment, when it is determined that the electric power generated by solar cell 1 is suppressed based on the actual measurement value of the electric power generated by solar cell 1 and the status information about solar cell 1, the actual measurement value of the electric power consumed by load 5, the trading power actual result value at a system interconnection point, and the like, the operation plan for town storage battery 20 can be modified.

In particular, the operation plan is corrected based on the power generation amount prediction value for solar cell 1 and the power consumption prediction value for load 5. Accordingly, the accuracy of various prediction values in creation of an operation plan can be improved, which leads to an effect that discharge from town storage battery 20 can be minimized despite that the output from solar cell 1 is suppressed.

Furthermore, depending on an excess or a shortage of the actual output electric power (charge/discharge power) with respect to the operation plan for town storage battery 20, the AC voltage frequency (system frequency) output from town storage battery power conversion device 21 is changed. Also, on the distributed power supply side in each consumer house 18, as the system frequency changes, the control target values for solar cell power conversion device 2 and storage battery power conversion device 4 can be modified from the control target value obtained based on the operation plan.

Thus, also until the operation plan for consumer house 18 is updated, the frequency of the AC system voltage is controlled on the town storage battery 20 side on which an excess or a shortage of the electric power supplied in a smart town can be detected, and thereby, the distributed power supply side in each consumer house 18 can be notified about the situation where the electric power is excessive or in shortage with respect to the operation plan. As a result, the distributed power supply in consumer house 18 controls the output (the trading electric power) in accordance with the AC system frequency, and thereby, power balancing in the distribution system in a smart town can be implemented without establishing communication between town storage battery 20 and consumer house 18.

As a result, the control target value for the distributed power supply can be modified equivalently according to the creation cycle of the operation plan for town storage battery 20 without shortening the creation cycle of the operation plan for the distributed power supply that is created for each consumer house 18. Accordingly, the collection cycle of the actual measurement result and the like in consumer house 18 (including collection of the status information about town storage battery 20) is set shorter than at least the creation cycle of the operation plan that is to be transmitted to consumer house 18. Also, the creation cycle of the operation plan for town storage battery 20 is set shorter than the creation cycle of the operation plan for the distributed power supply in consumer house 18. Thereby, without increasing the processing load in CEMS 15, discharge from town storage battery 20 and the like can be minimized even though solar cell 1 suppresses the output.

Furthermore, a drooping characteristic of which storage battery 3 in consumer house 18 is notified is generated particularly based on the charge energy (SOC) of storage battery 3. Thereby, specifically, for storage battery 3 with low SOC, the drooping characteristic can be created such that differential power for increasing the charge power occurs with a smaller amount of frequency change from the center frequency than that in the case of storage battery 3 with high SOC. Thereby, when the electric power supplied in a smart town is excessive, storage battery 3 with low SOC can be charged preferentially. Similarly, in storage battery 3 with high SOC, a drooping characteristic can be created such that differential power for increasing the discharge power occurs with a smaller amount of frequency change from the center frequency than that in the case of storage battery 3 with low SOC. Thereby, when the electric power supplied in a smart town is in shortage, storage battery 3 with high SOC can be preferentially discharged. As a result, also when an error occurs in the power generation amount prediction value for solar cell 1 and/or the power consumption prediction value for load 5 in the autonomous operation for power balancing in a smart town, storage battery 3 in each consumer house 18 can be appropriately charged or discharged.

Furthermore, the drooping characteristics created for solar cell power conversion device 2, storage battery power conversion device 4, and town storage battery power conversion devices 21 are not limited to those illustrated in FIGS. 18 to 20. In particular, the drooping characteristics that are transmitted to solar cell power conversion device 2 and storage battery power conversion device 4 in consumer house 18 can achieve the similar effect by the following way. Specifically, when the electric power supplied in a smart town is excessive, a drooping characteristic on the high frequency side is created such that the charge power to storage battery 3 increases before the electric power generated by solar cell 1 is suppressed. Also, when the electric power supplied in a smart town is in shortage, the system frequency at which the power generation target value (PV control target value) for solar cell 1 starts to increase is set higher than the system frequency at which the discharge power of storage battery 3 is increased. Thereby, the above-mentioned similar effect can be achieved.

Moreover, the drooping characteristic of which solar cell power conversion device 2 is notified can be the same among all consumer houses 18, whereas the drooping characteristic of which storage battery 3 is notified can be determined based on the SOC of town storage battery 20 and the SOC of the storage battery in each consumer house 18. In this way, suppression control of the electric power generated by solar cell 1 in a smart town, and the like, can be started approximately simultaneously in all consumer houses 18. Moreover, as to charging of storage battery 3 and town storage battery 20, charging of the storage battery with low SOC can be preferentially started by generating a drooping characteristic based on the SOC of each storage battery. Furthermore, if output suppression of solar cell 1 is started after the charge power of all storage batteries increases, the electric power generated by solar cell 1 can be effectively utilized without suppressing the output from solar cell 1 even though the storage battery can be charged.

Moreover, the operation plan of which each consumer house 18 is notified is not limited to the trading electric power at the system interconnection point (consumer premises distribution system) in each consumer house 18 in the illustrative example in the present embodiment, but the charge/discharge power of storage battery 3, the electric power generated by solar cell 1 or the like may be directly set by the operation plan. Alternatively, as to the trading power target value at a system interconnection point of which HEMS 7 notifies solar cell power conversion device 2 and storage battery power conversion device 4 in the same consumer house 18, an explanation has been given with regard to an example in which the trading power target value of which storage battery power conversion device 4 is notified is set uniformly smaller than the trading power target value of which solar cell power conversion device 2 is notified. However, the present disclosure is not limited to this example, but the similar effect can be achieved by a command value by which the operation of charging storage battery power conversion device 4 with excessive electric power is started before the operation of suppressing the output from solar cell 1 by solar cell power conversion device 2, on the basis of the trading electric power for which sensor errors and the like are corrected.

Moreover, detection of the output suppression of solar cell 1 is determined in the control mode of solar cell 1 of which solar cell power conversion device 2 notifies in the present embodiment, but not limited thereto, and, needless to say, may be determined by the charge power of storage battery 3 installed in the same consumer house 18, for example. Specifically, when storage battery 3 is charged with the maximum charge power that can be supplied with the present SOC, it is determined that solar cell 1 suppresses the output. Then, when the number of consumer houses 18 that are determined as suppressing the output is equal to or greater than a predetermined reference value, it may be determined that the output is suppressed in the entire town.

Furthermore, the method of estimating the power generation amount of solar cell 1 is not limited to the examples in the present embodiment. For example, for calculating the ideal electric power generated by solar cell 1, in the present embodiment, this ideal electric power generated by solar cell 1 is calculated by estimation of the amount of solar radiation on solar cell 1 based on the information of location at which solar cell 1 is installed (latitude and longitude information), and the installation orientation (including the installation angle information). However, in this case, for example, when solar cell 1 is disposed on each of the east-side surface and the west-side surface, the amount of solar radiation on each of the surfaces is estimated based on the above-mentioned information, and then, the generated electric power can be estimated based on the capacity of solar cell 1 on each of the surfaces. Moreover, also when the maximum generated electric power at each point of time during 28 days of the first-half two weeks and the second-half two weeks is used as an ideal power generation amount, the similar effect can be achieved. In this case, for example, consideration can be taken about the influences of the solar radiation upon the surrounding environment such as a shadow of a nearby building that covers solar cell 1 in a specific time zone. Thereby, more accurate estimation can be achieved.

Moreover, tables for power generation amount estimation can be prepared separately for a cloudy day, a rainy day, and a sunny day. In particular, when solar cell 1 is installed on each of the east-side and west-side surfaces as mentioned above, the light directly incident upon solar cell 1 on a sunny day is a main component of generated electric power, but diffused light is mainly a main component of generated electric power on a cloudy day or a rainy day. As a result, transition (a curve) of the electric power generated by solar cell 1 at each time is different between a sunny day and a cloudy day or a rainy day. Accordingly, the table for power generation amount estimation for a cloudy day or a rainy day is prepared separately from the table for power generation amount estimation for a sunny day, thereby allowing improvement in accuracy of estimating the electric power generated by solar cell 1. In addition, the method of calculating a power generation estimation coefficient described with reference to FIG. 35 (S186, S187) is not limited to the examples in the present embodiment.

The present embodiment has been described with regard to the example in which proportional division of the charge/discharge power between town storage battery 20 and storage battery 3 in consumer house 18 is determined according to the SOC, but the charge/discharge power may also be proportionally divided by the method other than the above. For example, after the proportional division for town storage battery 20 is determined, the proportional division ratio of the charge/discharge power for storage battery 3 in each consumer house 18 may be determined according to the energy (kWh) stored in each storage battery 3. This is because electric power is supplied mainly to essential loads such as a refrigerator and a lighting device in consumer house 18 during a power failure, with the result that the amount of energy stored in each storage battery 3 is important for implementing the LCP for 72 hours. When the storage capacities (stored energy when SOC=1.0) of storage batteries 3 in consumer houses 18 are different, controlling of the proportional division ratio only by the SOC may cause significant discharging of storage battery 3 with small charge energy. For example, a fixed-type storage battery installed in consumer house 18 has a storage capacity of about 2 to 4 (kWh), whereas an electric vehicle may have a storage capacity exceeding 20 kWh. In this case, in the case of an on-vehicle storage battery of an electric vehicle (for example, a storage capacity of 24 (kWh)) with SOC=0.5, the storage energy is 12 (kWh). Also, in the case of a fixed-type storage battery having a storage capacity of 2 (kWh) with SOC=0.8, the storage energy is 1.6 (kWh). In this case, when the charge/discharge power is divided proportionally based on the SOC, much discharge power is shared by a fixed-type storage battery with less storage energy. On the other hand, when proportional division of the discharge power is determined based on the storage energy, much discharge power can be shared by an electric vehicle. Furthermore, as to proportional division between town storage battery 20 and storage battery 3 in each consumer house 18, the proportional division ratio is calculated according to the ratio between the SOC average value of storage battery 3 in consumer house 18 and the SOC of town storage battery 20 in the present embodiment. However, in the similar manner as described above, the proportional division ratio can be determined according to the ratio between the total value of the energy stored in storage batteries 3 in consumer houses 18 and the energy stored in town storage battery 20.

Moreover, in the present embodiment, town storage battery 20 and town storage battery power conversion device 21 in FIG. 1 correspond to one example of the "main distributed power supply". Each of solar cell 1, solar cell power conversion device 2, storage battery 3, and storage battery power conversion device 4 in each consumer house 18 corresponds to one example of the "distributed power supply". Moreover, distribution system 16 corresponds to one example of the "first distribution system", and consumer premises distribution system 10 corresponds to one example of the "second distribution system".

Moreover, the operation plan for town storage battery power conversion device 21 corresponds to the "first operation plan", and five minutes of the creation cycle correspond to one example of the "first cycle". Similarly, the operation plan for the distributed power supply in consumer house 18 corresponds to the "second operation plan", and thirty minutes of the creation cycle correspond to one example of the "second cycle". Moreover, the system frequency in FIGS. 18 to 21 corresponds to the "AC voltage frequency", and differential power ΔPsb1 and ΔPsb2 in FIGS. 18 and 19 each are equivalent to one example of "the modification value according to the AC voltage frequency". Furthermore, the drooping characteristic of which town storage battery power conversion device 21 shown in FIG. 20 is notified corresponds to the "first drooping characteristic". Similarly, the drooping characteristic of which solar cell power conversion device 2 shown in FIG. 18 is notified and the drooping characteristic of which storage battery power conversion device 4 shown in FIG. 19 is notified each correspond to the "second drooping characteristic".

Furthermore, power measurement circuit 61 (FIG. 2) corresponds to one example of the "measuring instrument", communication circuit 151 (FIG. 3) corresponds to one example of the "communication unit", and information collection circuit 152 (FIG. 3) corresponds to one example of the "information collection unit". The power generation prediction circuit (FIG. 3) corresponds to one example of the "power generation prediction unit", and power consumption prediction circuit 158 (FIG. 3) corresponds to one example of the "power consumption prediction unit". Operation plan creation circuit 160 (FIG. 3) corresponds to one example of the "operation plan creation unit", and data transmission management circuit 153 (FIG. 3) corresponds to one example of the "transmission management unit". Moreover, solar cell output suppression determination circuit 1656 (FIG. 7) corresponds to one example of the "output suppression determination unit". Tenth control circuit 609 (FIGS. 14 and 16) corresponds to one example of the "first controller", and each of second control circuit 209 (FIGS. 9 and 11) and fourth control circuit 409 (FIGS. 9 and 13) corresponds to one example of the "second controller".

Moreover, the present embodiment has been described with regard to the case where town storage battery 20 is connected to the primary side of pole-mounted transformer 9 and consumer house 18 is disposed on the secondary side of pole-mounted transformer 9 as shown in FIG. 1, but the present disclosure is not limited thereto, and needless to say, the output of town storage battery 20 may be connected to consumer house 18 without passing through pole-mounted transformer 9. Specifically, when the management section is constituted of about 20 consumers, the output of town storage battery 20 is connected to the secondary side of pole-mounted transformer 9 shown in FIG. 1, and the section downstream from pole-mounted transformer 9 is defined as a management section so as to control town storage battery 20 and the consumer distributed power supply (solar cell power conversion device 2 and storage battery power conversion device 4) to cooperate with each other in the manner as described above during a power failure, with the result that the similar effect can be achieved.

Furthermore, the present embodiment has been described with regard to the autonomous operation control by which electric power is supplied to each consumer during a power failure. However, it is needless to say that, for example, several tens of houses in a rural area in a mountain region constitute a microgrid and the present system is applied to supply of electric power to an off-grid town, which still achieves effects of: allowing stable supply of electric power to each consumer; and also allowing optimization of the capacities of a storage battery and a solar cell as distribution system facilities and the capacity of an energy creation device for cogeneration and the like.

Description of Modifications

The present embodiments have been described with regard to the case where the control circuits in solar cell power conversion device 2 and storage battery power conversion device 4 are configured by hardware (H/W) as shown in FIGS. 3 to 11 and FIG. 27 for easy understanding of the description. However, the similar control function can be implemented even when the function of each block or some of the blocks shown in each block is implemented by software (S/W) mounted on a central processing unit (CPU). Alternatively, for at least some of the blocks, the similar control function can also be implemented by dividing the function of software and hardware.

It should be understood that the embodiments disclosed herein are illustrative and non-restrictive in every respect.

The scope of the present invention is defined by the terms of the claims, rather than the description above, and is intended to include any modifications within the meaning and scope equivalent to the terms of the claims.

REFERENCE SIGNS LIST

1 solar cell, 2 solar cell power conversion device, 3 storage battery (consumer house), 4 storage battery power conversion device, 5 load, 6 power switchboard, 8 smart meter, 9, 9Q, 9R, 9Z pole-mounted transformer, 10 consumer premises distribution system, 11 consumer premises communication network, 12 signal line, 13 outside premises communication network, 14 distribution system (pole-mounted transformer's secondary side), 16 distribution system (pole-mounted transformer's primary side), 17 distribution system (substation), 18, 18a, 18b, 18x consumer house, 19Q, 19R, 19Z section, 20 town storage battery, 21 town storage battery power conversion device, 22 switch, 23 cloud, 24 substation, 51 heat storage device, 52 air conditioner, 53 refrigerator, 54 lighting device, 55 cooking heater, 61 power measurement circuit, 151 communication circuit, 152 information collection circuit, 153 data transmission management circuit, 154 data reception management circuit, 155 distributed power supply status management circuit, 156 power generation actual result management circuit, 157 power generation prediction circuit, 158 power consumption prediction circuit, 159 power consumption actual result management circuit, 160 operation plan creation circuit, 161 operation plan creation management circuit, 201, 206, 210, 401, 406, 410, 601, 606, 610 voltmeter, 202, 207, 211, 402, 407, 411, 602, 607, 611 ammeter, 203 first DC/DC conversion circuit, 204 first control circuit, 205, 405, 605 DC bus, 208 first DC/AC conversion circuit, 209 second control circuit, 212, 412, 612 communication interface circuit, 403 second DC/DC conversion circuit, 404 third control circuit, 408 second DC/AC conversion circuit, 409 fourth control circuit, 603 third DC/DC conversion circuit, 604 ninth control circuit, 608 third DC/AC conversion circuit, 609 tenth control circuit, 1601 first operation plan creation circuit, 1605 excessive power prediction summation circuit, 1606 output suppression power summation circuit, 1607 town storage battery charge/discharge power decision circuit, 1608 town storage battery drooping characteristic generation circuit, 1609 town storage battery operation plan creation circuit, 1610 consumer system interconnection point power generation circuit, 1651 consumer operation plan creation circuit, 1652 consumer operation plan creation unit, 1655 excessive power prediction circuit, 1656, 1658 solar cell output suppression determination circuit, 1657 second operation plan creation circuit, 1661 consumer distributed power supply drooping characteristic generation circuit, 1662 operation plan correction circuit, 2041 MPPT control circuit, 2042 voltage control circuit, 2043, 4043, 6043 switching circuit, 2044 fifth control circuit, 2091, 4091 phase detection circuit, 2092, 4092 frequency detection circuit, 2093, 4093, 6092 drooping characteristic table generation circuit, 2094 sixth control circuit, 4041, 6041 charge control circuit, 4042, 6042 discharge control circuit, 4044 seventh control circuit, 4094 eighth control circuit, 6044 eleventh control circuit, 6091 sinusoidal wave generation circuit, 6094 twelfth control circuit, FC1 to FC3, FCt drooping characteristic line, fa, fa1, fa2, fa3, fb, fb1, fb2, fb3 break frequency, fc center frequency.

The invention claimed is:

1. A power management system for a management section equipped with a main distributed power supply to supply an AC voltage to a first distribution system during a power failure, and a plurality of distributed power supplies including an energy creation device, the power management system comprising:

a measuring instrument to measure electric power consumed by a load electrically connected to each of the distributed power supplies through a second distribution system that is connected through a transformer to the first distribution system;

a communication circuit to communicate with the main distributed power supply, each of the distributed power supplies, and the measuring instrument;

an information collection circuit to collect, through the communication circuit, the consumed electric power that is measured by the measuring instrument and status information about each of the main distributed power supply and the distributed power supplies;

a power generation prediction circuit to predict electric power generated by the energy creation device in the distributed power supplies;

a power consumption prediction circuit to predict the electric power consumed by the load during a power failure;

an operation plan creation circuit to create a first operation plan for controlling the main distributed power supply and a second operation plan for controlling the distributed power supplies, the first operation plan and the second operation plan being applied in an autonomous operation for addressing a power failure, and being created based on a power generation prediction result by the power generation prediction circuit, a power consumption prediction result by the power consumption prediction circuit, the status information, and a power consumption actual result by the measuring instrument that are collected by the information collection circuit; and a transmission management circuit to transmit the first operation plan to the main distributed power supply through the communication circuit in the autonomous operation, and transmit the second operation plan to each of the distributed power supplies through the communication circuit in the autonomous operation, wherein in the autonomous operation, the first operation plan is updated in each a first cycle set to be equal to or greater than an information collection cycle by the information collection circuit and transmitted to the main distributed power supply, and the second operation plan is updated in each a second cycle longer than the first cycle and transmitted to each of the distributed power supplies, the main distributed power supply includes a first controller to change an AC voltage frequency output from the main distributed power supply to the first distribution system in accordance with an excess or a shortage of electric power with respect to a power trade balance that follows the first operation plan in the main distributed power supply, and each of the distributed power supplies includes a second controller to control an output from each of the distributed power supplies in accordance with a control target value obtained by adding, to the second operation plan, a modification value according to an AC voltage frequency of the second distribution system.

2. The power management system according to claim 1, wherein the second cycle is set at an integral multiple of the first cycle, the power management system further comprises an output suppression determination circuit to determine, based on the status information and the power consumption actual result that are collected by the information collection unit, whether the electric power generated by the energy creation device is suppressed or not, and the operation plan creation circuit creates the first operation plan in each the second cycle, and in a time period until the second cycle passes, changes the first operation plan in each the first cycle to suppress electric power output from the main distributed power supply or to increase stored energy in an energy storage device included in the main distributed power supply when the output suppression determination circuit determines that the electric power generated by the energy creation device is suppressed.

3. The power management system according to claim 2, wherein when the output suppression determination circuit determines that the electric power generated by the energy creation device is suppressed, the operation plan creation circuit modifies the first operation plan to, according to a suppression amount estimation value of the electric power generated, suppress electric power output from the main distributed power supply, or increase stored energy in the energy storage device included in the main distributed power supply.

4. The power management system according to claim 2, wherein a control mode of the energy creation device includes a first control mode in which an operation is performed at a maximum operation point of generated electric power, and a second control mode in which the generated electric power is controlled, and the output suppression determination circuit determines whether the electric power generated by the energy creation device is suppressed or not, using the control mode of the energy creation device.

5. The power management system according to claim 2, wherein the distributed power supplies further include an energy storage device connected to the energy creation device through the second distribution system, and the output suppression determination circuit determines whether the electric power generated by the energy creation device is suppressed or not, using charge power of the energy storage device included in the distributed power supplies.

6. The power management system according to claim 1, wherein a first drooping characteristic that defines the AC voltage frequency based on the excess or the shortage of electric power is transmitted from the operation plan creation circuit to the main distributed power supply in each the first cycle, and a second drooping characteristic that defines the modification value from the AC voltage frequency in each of the distributed power supplies is transmitted from the operation plan creation circuit to the distributed power supplies in each the second cycle.

7. The power management system according to claim 6, wherein the distributed power supplies further include an energy storage device connected to the energy creation device through the second distribution system, and the second drooping characteristic is set separately between the energy creation device and the energy storage device.

8. The power management system according to claim 7, wherein the second drooping characteristic of the energy storage device is created such that a frequency change amount for causing the modification value so as to increase discharge power from the energy storage device is smaller in the energy storage device with much stored energy than in the energy storage device with less stored energy, and such that a frequency change amount for causing the modification value so as to increase charge power of the stored energy is smaller in the energy storage device with less stored energy than in the energy storage device with much stored energy.

9. The power management system according to claim 6, wherein the control target value includes a trading power target value from the energy creation device to the second distribution system, and a trading power target value from the energy storage device to the second distribution system, and the control target value before the modification value is added is set in the energy creation device at a value on a power selling side with respect to the energy storage device included in the distributed power supplies.

10. The power management system according to claim 1, wherein each of the distributed power supplies, the load, and the second distribution system are disposed in each of consumers in the management section, and the second operation plan defines trading electric power from each of the distributed power supplies in each of the consumers to the second distribution system.

11. The power management system according to claim 1, wherein the distributed power supplies further include an energy storage device connected to the energy creation device through the second distribution system, the control target value includes a trading power target value from the energy creation device to the second distribution system, and a trading power target value from the energy storage device to the second distribution system, and the control target value before the modification value is added is set in the energy creation device at a value on a power selling side with respect to the energy storage device included in the distributed power supplies.

12. The power management system according to claim 1, wherein the second cycle is set at an integral multiple of the first cycle.

13. A power management system for a management section equipped with a main distributed power supply to supply an AC voltage to a first distribution system during a power failure, and a plurality of distributed power supplies including an energy creation device, the power management system comprising:

an information collection circuit to collect electric power consumed by a load electrically connected to each of the distributed power supplies through a second distribution system that is connected to the first distribution system, and status information about each of the main distributed power supply and the distributed power supplies;

a power generation prediction circuit to predict electric power generated by the energy creation device in the distributed power supplies;

a power consumption prediction circuit to predict the electric power consumed by the load during a power failure; and an operation plan creation circuit to create a first operation plan for controlling the main distributed power supply and a second operation plan for controlling the distributed power supplies, the first operation plan and the second operation plan being applied in an autonomous operation for addressing a power failure, and being created based on a power generation prediction result by the power generation prediction circuit, a power consumption prediction result by the power consumption prediction circuit, the status information, and a power consumption actual result of the load that are collected by the information collection circuit, wherein in the autonomous operation, the first operation plan is updated in each a first cycle set to be equal to or greater than an information collection cycle by the information collection circuit, and transmitted to the main distributed power supply, and the second operation plan is updated in each a second cycle longer than the first cycle and transmitted to each of the distributed power supplies, the main distributed power supply includes a first controller to change an AC voltage frequency output from the main distributed power supply to the first distribution system in accordance with an excess or a shortage of electric power with respect to a power trade balance that follows the first operation plan in the main distributed power supply, and each of the distributed power supplies includes a second controller to control an output from each of the distributed power supplies in accordance with a control target value obtained by adding, to the second operation plan, a modification value according to an AC voltage frequency of the second distribution system.

14. The power management system according to claim 13, wherein the second cycle is set at an integral multiple of the first cycle, the power management system further comprises an output suppression determination circuit to determine, based on the status information and the power consumption actual result that are collected by the information collection circuit, whether the electric power generated by the energy creation device is suppressed or not, and the operation plan creation circuit creates the first operation plan in each the second cycle, and in a time period until the second cycle passes, changes the first operation plan in each the first cycle to suppress electric power output from the main distributed power supply or to increase stored energy in an energy storage device included in the main distributed power supply when the output suppression determination circuit determines that the electric power generated by the energy creation device is suppressed.

15. The power management system according to claim 13, wherein a first drooping characteristic that defines the AC voltage frequency based on the excess or the shortage of electric power is transmitted from the operation plan creation circuit to the main distributed power supply in each the first cycle, and a second drooping characteristic that defines the modification value from the AC voltage frequency in each of the distributed power supplies is transmitted from the operation plan creation circuit to the distributed power supplies in each the second cycle.

16. The power management system according claim 13, wherein each of the distributed power supplies, the load, and the second distribution system are disposed in each of consumers in the management section, and the second operation plan defines trading electric power from each of the distributed power supplies in each of the consumers to the second distribution system.

17. The power management system according to claim 13, wherein the distributed power supplies further include an energy storage device connected to the energy creation device through the second distribution system, the control target value includes a trading power target value from the energy creation device to the second distribution system, and a trading power target value from the energy storage device to the second distribution system, and the control target value before the modification value is added is set in the energy creation device at a value on a power selling side with respect to the energy storage device included in the distributed power supplies.

18. The power management system according to claim 13, wherein the second cycle is set at an integral multiple of the first cycle.

* * * * *